US009411138B2

(12) United States Patent
Ryu

(10) Patent No.: US 9,411,138 B2
(45) Date of Patent: Aug. 9, 2016

(54) TELEPHOTO ZOOM LENS SYSTEM AND ELECTRONIC APPARATUS INCLUDING THE SAME

(71) Applicant: SAMSUNG ELECTRONICS CO., LTD., Suwon-si, Gyeonggi-do (KR)

(72) Inventor: Jae-myung Ryu, Seongnam (KR)

(73) Assignee: Samsung Electronics Co., Ltd., Suwon-si (KR)

(*) Notice: Subject to any disclaimer, the term of this patent is extended or adjusted under 35 U.S.C. 154(b) by 130 days.

(21) Appl. No.: 14/162,098

(22) Filed: Jan. 23, 2014

(65) Prior Publication Data

US 2014/0268340 A1    Sep. 18, 2014

(30) Foreign Application Priority Data

Mar. 12, 2013  (KR) .................. 10-2013-0026308

(51) Int. Cl.
*G02B 15/15*    (2006.01)
*G02B 13/02*    (2006.01)
*G02B 15/17*    (2006.01)

(52) U.S. Cl.
CPC ............. *G02B 15/15* (2013.01); *G02B 13/02* (2013.01); *G02B 15/17* (2013.01)

(58) Field of Classification Search
CPC ......... G02B 15/15; G02B 13/02; G02B 15/17
USPC ................................ 359/676–685
See application file for complete search history.

(56) References Cited

U.S. PATENT DOCUMENTS

| | | | |
|---|---|---|---|
| 6,646,804 B2 * | 11/2003 | Harada | G02B 15/173 359/554 |
| 7,535,657 B2 | 5/2009 | Kuroda et al. | |
| 8,405,906 B2 | 3/2013 | Mizuguchi et al. | |
| 8,416,506 B2 | 4/2013 | Ito | |
| 8,441,739 B2 | 5/2013 | Yamaguchi | |
| 8,654,450 B2 | 2/2014 | Yoo | |

(Continued)

FOREIGN PATENT DOCUMENTS

EP    2 309 300 A1    4/2011
JP    06-300967 A    10/1994

(Continued)

OTHER PUBLICATIONS

Copy of PCT Search Report and Written Opinion issued for PCT/KR2014/000552 (May 13, 2014).

(Continued)

*Primary Examiner* — Bumsuk Won
*Assistant Examiner* — Grant Gagnon
(74) *Attorney, Agent, or Firm* — Drinker Biddle & Reath LLP

(57) ABSTRACT

Provided are a telephoto zoom lens system and an electronic apparatus including the telephoto zoom lens system. The telephoto zoom lens system includes a first lens group having a positive refractive power and is fixed when zooming and focusing, a second lens group having a negative refractive power, a third lens group having a negative refractive power and performs focusing, a fourth lens group having a positive refractive power, and a rear lens group comprising one or more lens groups located between the fourth lens group and an image side. At least one lens group of the rear lens group is fixed while zooming, and a focal length thereof is unchanged while zooming.

21 Claims, 51 Drawing Sheets

(56) References Cited

U.S. PATENT DOCUMENTS

| | | | |
|---|---|---|---|
| 8,699,152 B2 | 4/2014 | Amano | |
| 8,941,926 B2* | 1/2015 | Mihara | 359/683 |
| 2011/0085249 A1 | 4/2011 | Seo | |
| 2011/0134266 A1 | 6/2011 | Mihara | |
| 2011/0228160 A1 | 9/2011 | Imaoka et al. | |
| 2013/0021674 A1 | 1/2013 | Fujikura | |
| 2013/0188155 A1* | 7/2013 | Masui | G02B 13/16 353/31 |
| 2013/0201565 A1* | 8/2013 | Yamanaka | G02B 15/17 359/684 |

FOREIGN PATENT DOCUMENTS

| | | |
|---|---|---|
| JP | 07-325272 A | 12/1995 |
| JP | 2002-162564 A | 6/2002 |
| JP | 2006-201524 A | 8/2006 |
| JP | 2009-086535 A | 4/2009 |
| JP | 2009-086537 A | 4/2009 |
| JP | 2009-156893 A | 7/2009 |
| JP | 2010-191334 A | 9/2010 |
| JP | 2010-191335 A | 9/2010 |
| JP | 2010-191336 A | 9/2010 |
| JP | 2011-090080 A | 5/2011 |
| JP | 2011-158599 A | 8/2011 |
| JP | 2011-197302 A | 10/2011 |
| KR | 10-2007-0108886 A | 11/2007 |
| KR | 10-2011-0007627 A | 1/2011 |
| KR | 10-2011-0040245 A | 4/2011 |
| WO | 2012-114756 A1 | 8/2012 |

OTHER PUBLICATIONS

Copy of Search Report issued for EP 14156266.0 (May 14, 2014).
Copy of Extended European Search Report issued for EP 14156266.0 (Oct. 1, 2014).

* cited by examiner

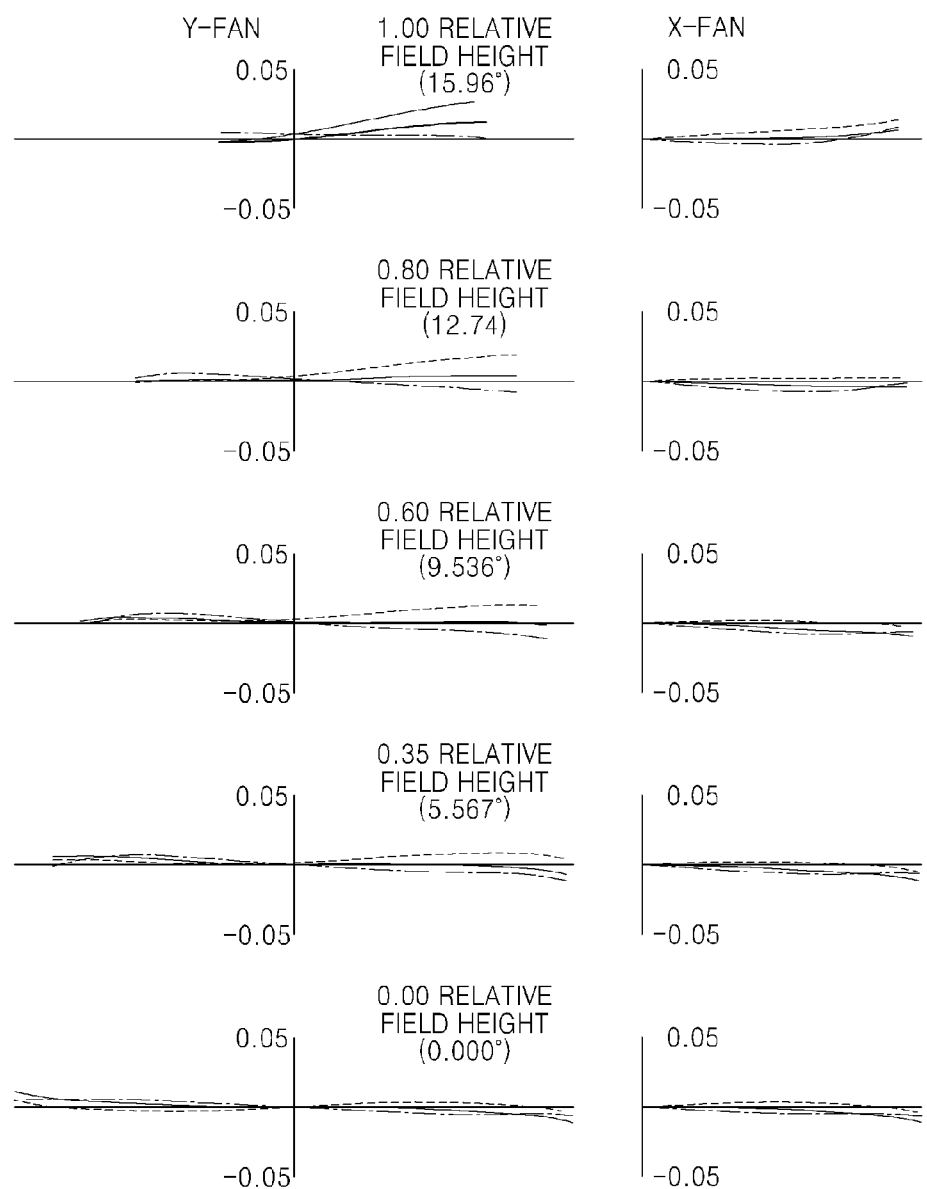

TELEPHOTO ZOOM LENS SYSTEM AND ELECTRONIC APPARATUS INCLUDING THE SAME

RELATED APPLICATIONS

This application claims the priority benefit of Korean Patent Application No. 10-2013-0026308, filed on Mar. 12, 2013, in the Korean Intellectual Property Office, the disclosure of which is incorporated herein in its entirety by reference.

BACKGROUND

1. Field

One or more embodiments of the invention relate to a telephoto zoom lens system capable of quickly focusing by reducing the weight of a focusing lens group and an electronic apparatus including the zoom lens system.

2. Description of the Related Art

In the case of photographing apparatuses using solid state imaging devices, such as digital cameras, interchangeable lens systems, and video cameras, there is user demand for high resolution and high magnification. Also, since photographing apparatuses using solid imaging devices are suitable for being miniaturized, they have recently been applied to small information terminals as well as to cellular phones. Also, users now possess more specialized knowledge with respect to photographing apparatuses, and large-aperture telephoto zoom lens systems have been increasingly developed based on such market demands. Large-aperture telephoto zoom lens systems generally use a lens group located immediately after a first lens group as a focusing lens group. However, since an aperture of a first lens is large, a rear lens group of the first lens group also has a large aperture, such that a weight of the focusing lens group increases. When the weight of the focusing lens group is heavy, rapid movement of the focusing lens may be impeded.

SUMMARY

One or more embodiments of the invention include a telephoto zoom lens system capable of quickly focusing by reducing the weight of a focusing lens group.

One or more embodiments of the invention include an electronic apparatus including a telephoto zoom lens system capable of quickly focusing by reducing the weight of a focusing lens group.

Additional aspects will be set forth in the description which follows and, will become apparent from the description, or may be learned by practice of the presented embodiments.

According to one or more embodiments, a telephoto zoom lens system includes a first lens group having a positive refractive power and is fixed while zooming and focusing, a second lens group having a negative refractive power, a third lens group having a negative refractive power and performs focusing, a fourth lens group having a positive refractive power, and a rear lens group including one or more lens groups located between the fourth lens group and an image side. At least one lens group of the rear lens group is fixed while zooming, and a focal length thereof is unchanged while zooming.

One of the lens groups included in the rear lens group may include an aperture stop.

A size of an aperture of the aperture stop may be maintained to be uniform while zooming.

A distance between the second lens group and the third lens group may be unchanged while zooming.

The third lens group may include a lens that satisfies the following Equation:

$$-5.0 \leq \frac{R_{rear}}{R_{front}} \leq 0.0,$$

wherein $R_{front}$ denotes the radius of curvature of an object side surface of the lens of the third lens group, $R_{rear}$ denotes the radius of curvature of an image side surface of the lens of the third lens group.

The third lens group may satisfy the following Equation:

$$1.4 \leq (1 - m_{focus,W}^2) \cdot m_{rear,W}^2 \leq 2.5,$$

wherein $m_{focus,W}^2$ denotes a magnification of the third lens group at a wide-angle position, and rear $m_{rear,W}^2$ denotes a total magnification of lens groups located at the image side of the third lens group at the wide-angle position.

The third lens group may satisfy the following Equation:

$$0.7 \leq \frac{(1 - m_{focus,T}^2) \cdot m_{rear,T}^2}{(1 - m_{focus,W}^2) \cdot m_{rear,W}^2} \leq 1.2,$$

wherein $m_{focus,W}^2$ denotes a magnification of the third lens group at the wide-angle position, $m_{rear,W}^2$ denotes a total magnification of the lens groups located at the image side of the third lens group at the wide-angle position, $m_{focus,T}^2$ denotes a magnification of the third lens group at a telephoto position, and $m_{rear,T}^2$ denotes a total magnification of the lens groups located at the image side of the third lens group at the telephoto position.

The rear lens group may include a lens group for image stabilization.

The lens group for image stabilization may have a negative refractive power.

The rear lens group may have a positive refractive power and may include a fifth lens group that is fixed while zooming.

The second lens group, the third lens group, and the fourth lens group may move while zooming.

While zooming, the second lens group, the third lens group, and the fourth lens group may move from an object side to the image side with no inflection point.

The rear lens group may include a fifth lens group having a positive refractive power and moves while zooming, and a sixth lens group provided between the fifth lens group and the image side and includes a first sub lens group having a negative refractive power and a second sub lens group having a positive refractive power.

The second lens group, the third lens group, the fourth lens group, and the fifth lens group may move while zooming.

While zooming, the second lens group, the third lens group, the fourth lens group, and the fifth lens group may move from the object side to the image side with no inflection point.

The first sub lens group may perform image stabilization.

The third lens group may include one lens.

The third lens group may include a lens selected from the group consisting of a biconcave lens or a plano-concave lens.

According to one or more embodiments, an electronic apparatus includes a telephoto zoom lens system and an imaging device that receives light from the telephoto zoom lens system. In this case, the telephoto zoom lens system includes a first lens group having a positive refractive power and is fixed while zooming and focusing, a second lens group having a negative refractive power, a third lens group having a negative refractive power and performs focusing, a fourth lens group having a positive refractive power, and a rear lens group including one or more lens groups located between the fourth lens group and an image side. At least one lens group of the rear lens group is fixed while zooming, and a focal length thereof is unchanged while zooming.

BRIEF DESCRIPTION OF THE DRAWINGS

These and/or other aspects will become apparent and more readily appreciated from the following description of the embodiments, taken in conjunction with the accompanying drawings of which:

FIG. 6B is a diagram illustrating lateral aberration of the zoom lens system of FIG. 5 at the wide-angle position, in which the image stabilization lens group is located on the optical axis;

DETAILED DESCRIPTION

Figure 1:
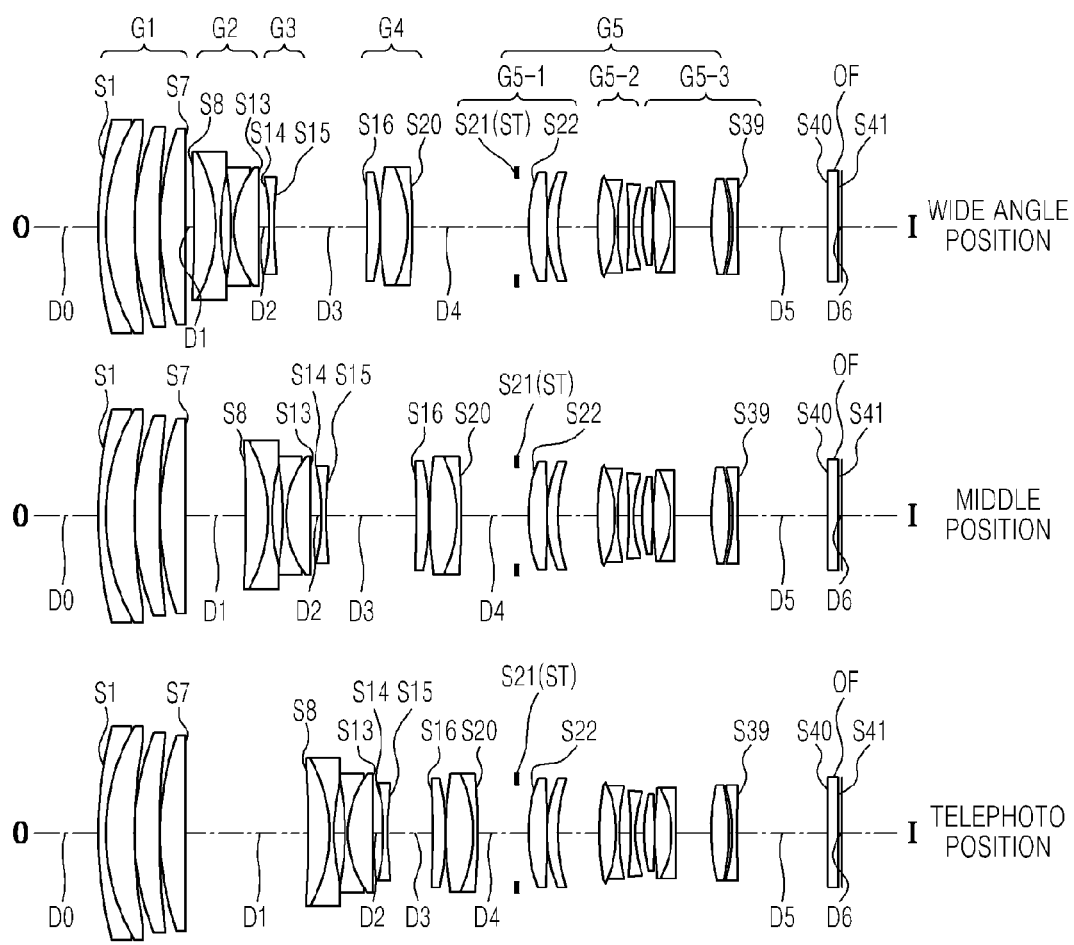
FIG. 1 is a diagram illustrating a telephoto zoom lens system at a wide-angle position, a middle position, and a telephoto position, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the term "and/or" includes any and all combinations of one or more of the associated listed items.

Hereinafter, exemplary embodiments of the invention will now be described in detail with reference to the attached drawings.

FIG. 1 is a diagram illustrating a telephoto zoom lens system 100-1, according to an embodiment. The telephoto zoom lens system 100-1 may include a first lens group G1 having a positive refractive power, a second lens group G2 having a negative refractive power, a third lens group G3 having a negative refractive power, a fourth lens group G4 having a positive refractive power, and a rear lens group including one or more lens groups located at an image side I of the fourth lens group G4, which are sequentially arranged from an object side O to the image side I.

The first lens group G1 may be fixed while zooming and focusing. Accordingly, in the case of the telephoto zoom lens system 100-1, while zooming, a distance between an object side surface of a lens closest to the object side O of the first lens group G1 and an image plane (in other words, a full length thereof), is not changed. In this case, the image plane may designate an imaging device or a photographing plane.

The third lens group G3 may perform focusing. The third lens group G3 may include, for example, two lenses or less so as to be more light-weight. As described above, the third lens group for focusing is lightened, thereby facilitating quick focusing. Also, a focusing lens group may be arranged at a location where a lens aperture is small. When the first lens group G1 has a positive refractive power, a lens group near the second lens group G2 would have a relatively small aperture, e.g., the third lens group G3 as a focusing lens group. Since an aperture of the third lens group G3 is small, it is possible to lighten a weight of the focusing lens group. The third lens group G3, which is the focusing lens group, is lightened, thereby reducing a weight of a driving unit driving the third lens group G3. For example, the third lens group G3 may include, for example, one lens so as to be more light-weight. The third lens group G3 may include one of a biconcave lens and a plano-concave lens.

One or more lens groups of the rear lens group may be fixed while zooming. Also, since performance of the telephoto zoom lens system 100-1 greatly varies with hand shake, the telephoto zoom lens system 100-1 may include an image stabilization lens group. For example, the rear lens group may include a lens group for image stabilization. The lens group for image stabilization may be fixed and not move while zooming and/or focusing. Accordingly, a configuration of a driver for moving the lens group for image stabilization may be simplified, and an electronic apparatus having capability for capturing images and photographing (e.g., a photographing apparatus) may be miniaturized due to the simplified configuration of the driver. Also, a driving load on an image stabilization lens group is reduced in such a way that power consumption may be reduced, and a degree of freedom may increase when employing a driving source.

On the other hand, when zooming, the first lens group G1 is fixed and the second lens group G2, the third lens group G3, and the fourth lens group G4 may move. For example, while zooming, a distance between the second lens group G2 and the third lens group G3 may be uniform. When the distance between the third lens group G3 and the second lens group G2 is maintained to be uniform while zooming, this condition may be favorable when configuring a driving unit for zooming.

On the other hand, some groups of the rear lens group may move while zooming. However, the image stabilization lens group included in the rear lens group may be fixed while zooming.

The fourth lens group G4 may correct field curvature.

An example of a configuration of the rear lens group will now be described. Referring to FIGS. 1, 5, 9, and 13, the rear lens group may include a fifth lens group G5 having a positive refractive power. The fifth lens group G5 may be fixed while zooming. The fifth lens group G5 may include a first sub lens group G5-1, a second sub lens group G5-2 for image stabilization, and a third sub lens group G5-3. For example, the first sub lens group G5-1 may have a positive refractive power, the second sub lens group G5-2 may have a negative refractive power, and the third sub lens group G5-3 may have a positive refractive power. The fifth lens group G5 may include an aperture stop ST at its object side O.

Figure 17:
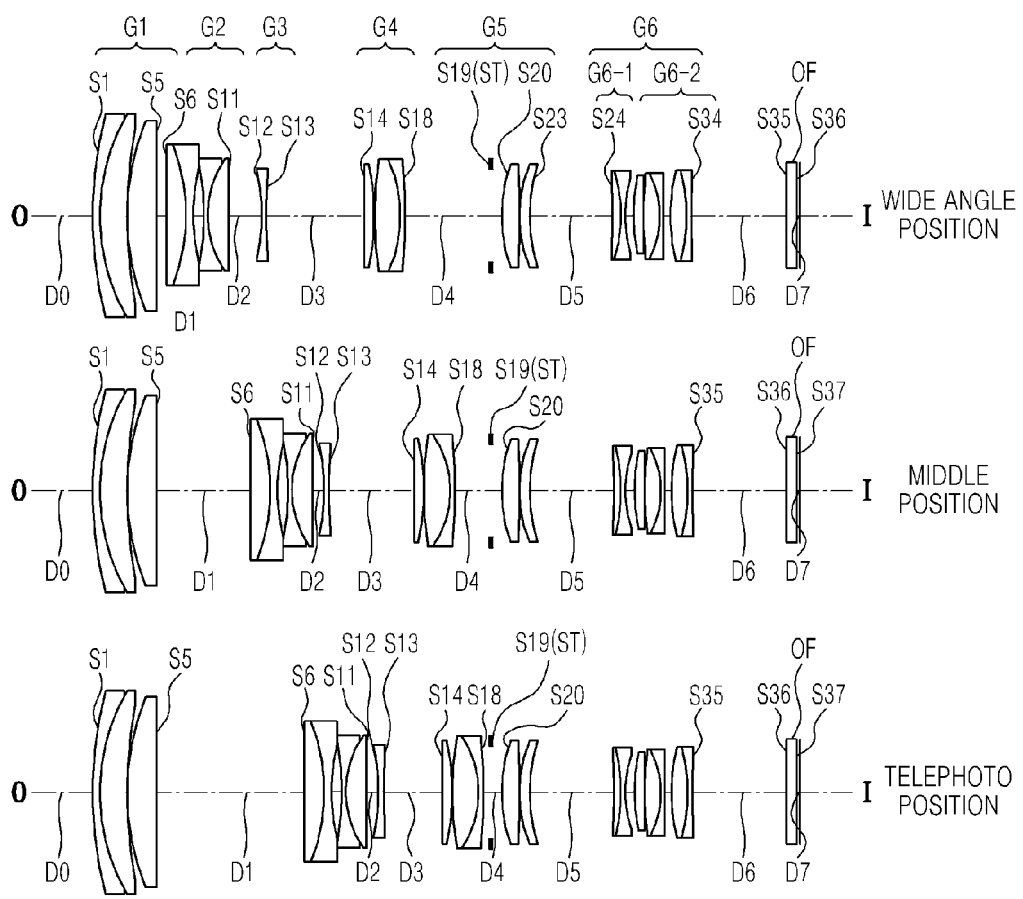
FIG. 17 is a diagram illustrating a telephoto zoom lens system at a wide-angle position, a middle position, and a telephoto position, according to another embodiment.

Referring to FIG. 17, the rear lens group may include the fifth lens group G5, and a sixth lens group G6 including a first sub lens group G6-1 and a second sub lens group G6-2. The first sub lens group G6-1 may perform image stabilization. The fifth lens group G5 may move while zooming, and the sixth lens group G6 may be fixed while zooming. The fifth lens group G5 may include an aperture stop ST at its object side O.

To lighten the weight of the image stabilization lens group, an aperture of the image stabilization lens group may be reduced in size. To reduce the size of the aperture of the image stabilization lens group, for example, a focal length of a lens group located just before the image stabilization lens group may be reduced. When the lens group located just before the image stabilization lens group has a positive refractive power, the aperture becomes smaller, thereby lightening the weight of the image stabilization lens group. For example, in FIGS. 1, 5, 9, and 13, the first sub lens group G5-1, which is located just before the second sub lens group G5-2 (the image stabilization lens group), may have a positive refractive power. In FIG. 17, the fifth lens group G5, which is located just before the first sub lens group G6-1 (the image stabilization lens group), may have a positive refractive power.

The telephoto zoom lens system according to the present embodiment may not change the aperture while zooming. That is, the telephoto zoom lens system is a bright zoom lens whose F number Fno is fixed while zooming.

On the other hand, in the case of the telephoto zoom lens system according to the present embodiment, while zooming from the wide-angle position to the telephoto position, the second lens group G2 and the third lens group G3 may monotonically move from the object side O to the image side I. That is, the second group G2 and the third lens group G3 may simply move with no inflection point while zooming. The fourth lens group G4 may simply move from the object side O to the image side I while zooming. Otherwise, the fourth lens group G4 may move from the object side O toward the image side I while zooming from the wide-angle position to a random middle position, and may move further toward the image side I while zooming to the telephoto position. That is, the fourth lens group G4 may have an inflection point while zooming. When a lens group, which moves while zooming, has a trajectory that simply increases or simply decreases with no inflection point, it is convenient to control zooming. When there is an inflection point, it is convenient to correct optical performance. For example, all lens groups that move while zooming move from the object side O to the image side I, and since zooming is easily performed, it is possible to increase added values of the products.

The third lens group G3 may satisfy the following equation.

$$-5.0 \leq \frac{R_{rear}}{R_{front}} \leq 0.0 \qquad \text{Equation (1)}$$

In this case, $R_{front}$ denotes the radius of curvature of a lens surface in the third lens group G3 closest to the object side O, and $R_{rear}$ denotes the radius of curvature of a lens surface in the third lens group G3 closest to the image side I.

Equation 1 defines shapes of lenses included in the third lens group G3. For example, the third lens group G3 may include one of a biconcave lens and a plano-concave lens. Since the second lens group G2 has a negative refractive power, a light ray diverges from the second lens group G2. When the third lens group G3 includes a biconcave lens or a plano-concave lens, it is easy to correct aberrations and it is possible to properly arrange refractive powers of lenses included in the second lens group G2.

Also, the third lens group G3 may satisfy the following equation.

$$1.4 \leq (1 - m_{focus,W}^2) \cdot m_{rear,W}^2 \leq 2.5 \qquad \text{Equation (2)}$$

In this case, $m_{focus,W}$ denotes a magnification of the third lens group G3 at the wide-angle position, and $m_{rear,W}$ denotes a total magnification of lens groups located after the third lens group G3 (i.e., located on the image side of the third lens group G3) at the wide-angle position.

Equation 2 defines a change of a back focal length according to a unit movement of the third lens group G3 in a longitudinal direction, which may show longitudinal sensitivity of the third lens group G3. When the longitudinal sensitivity is excessively high, since the back focal length is greatly changed according to a position of the third lens group G3, a variance of optical performances according thereto also increases. On the contrary, when the longitudinal sensitivity is excessively low, it is difficult to provide the shortest photographic distance. When satisfying Equation 2, it is possible to provide the appropriate shortest photographic distance and to reduce a variance in performance according to the position of the third lens group G3, which is the focusing lens group.

The third lens group G3 may satisfy the following equation.

$$0.7 \leq \frac{(1 - m_{focus,T}^2) \cdot m_{rear,T}^2}{(1 - m_{focus,W}^2) \cdot m_{rear,W}^2} \leq 1.2 \quad \text{Equation (3)}$$

In this case, $m_{focus,W}$ denotes a magnification of the third lens group G3 at the wide-angle position, $m_{rear,W}$ denotes a total magnification of the lens groups located after the third lens group G3 (i.e., located on the image side of the third lens group 3) at the wide-angle position, $m_{focus,T}$ denotes a magnification of the third lens group G3 at the telephoto position, and $m_{rear,T}$ denotes a total magnification of the lens groups located after the third lens group G3 at the telephoto position.

Equation 3 shows a longitudinal sensitivity ratio of the third lens group G3 at the wide-angle position and the telephoto position. When the longitudinal sensitivity ratio of the third lens group G3 satisfies Equation 3, a variance amount of the back focal length according to the movement of the third lens group G3 decreases regardless of zooming, and thus it is possible to easily control auto focusing.

Hereinafter, design data of the telephoto zoom lens system according to the present embodiment will be described. Hereinafter, f is an overall focal length of the zoom lens system and uses mm as a unit, Fno denotes an F number, 2ω is an angle of view and uses degree as a unit, R denotes the radius of curvature, Dn denotes a distance between lenses or a thickness of a lens, Nd denotes a refractive index, vd denotes an Abbe number, ST denotes an aperture stop, obj denotes an object plane, and img denotes an image plane or an imaging plane, respectively. In the drawings illustrating the respective embodiments, one or more filters OF may be provided at the position closest to the image side I.

[Embodiment 1]

FIG. 1 illustrates the telephoto zoom lens system 100-1 at the wide-angle position, the middle position, and the telephoto position, respectively, according to an embodiment. Design data thereof will now be described as follows. In FIG. 1, reference numerals of respective lenses are partially shown. In the drawings hereafter, only some reference numerals of lenses are shown.

TABLE 1

| Surface of lenses | R | Dn | Nd | vd | Note |
|---|---|---|---|---|---|
| obj | infinity | D0 | | | |
| S1 | 112.733 | 1.780 | 1.71736 | 29.50 | First lens |
| S2 | 52.989 | 7.590 | 1.49700 | 81.61 | group G1 |
| S3 | 222.246 | 0.100 | | | |
| S4 | 73.725 | 6.000 | 1.49700 | 81.61 | |
| S5 | 333.378 | 0.100 | | | |
| S6 | 75.334 | 6.230 | 1.49700 | 81.61 | |
| S7 | 9864.610 | D1 | | | |
| S8 | −531.978 | 4.670 | 1.90366 | 31.31 | Second |
| S9 | −43.272 | 1.500 | 1.74330 | 49.22 | lens group |
| S10 | 49.089 | 3.001 | | | G2 |
| S11 | −112.269 | 0.820 | 1.77250 | 49.62 | |
| S12 | 26.284 | 4.760 | 1.84666 | 23.78 | |
| S13 | 313.408 | D2 | | | |
| S14 | −40.499 | 1.000 | 1.77250 | 49.62 | Third lens |
| S15 | 136.530 | D3 | | | group G3 |
| S16 | −932.828 | 3.210 | 1.77250 | 49.62 | Fourth lens |
| S17 | −68.569 | 0.100 | | | group G4 |
| S18 | 83.254 | 7.240 | 1.63854 | 55.45 | |
| S19 | −35.194 | 1.000 | 1.84666 | 23.78 | |
| S20 | −133.659 | D4 | | | |
| S21(ST) | infinity | 0.650 | | | |
| S22 | 40.626 | 4.560 | 1.49700 | 81.61 | First sub |
| S23 | −155.230 | 0.100 | | | lens group |
| S24 | 35.283 | 2.590 | 1.77250 | 49.62 | G5-1 |
| S25 | 42.485 | 10.505 | | | |
| S26 | 96.288 | 3.930 | 1.80518 | 25.46 | Second |
| S27 | −38.516 | 0.800 | 1.63980 | 34.57 | sub lens |
| S28 | 66.551 | 3.000 | | | group G5-2 |
| S29 | −79.947 | 0.800 | 1.70154 | 41.15 | |
| S30 | 30.400 | 2.249 | | | |
| S31 | 55.309 | 2.920 | 1.54814 | 45.82 | Third sub |
| S32 | −110.948 | 0.100 | | | lens group |
| S33 | 83.313 | 4.270 | 1.49700 | 81.61 | G5-3 |
| S34 | −21.470 | 1.000 | 1.84666 | 23.78 | |
| S35 | −470.282 | 7.799 | | | |
| S36 | 56.262 | 4.080 | 1.84666 | 23.78 | |
| S37 | −57.712 | 0.570 | | | |
| S38 | −44.037 | 1.280 | 1.77250 | 49.62 | |
| S39 | 500.000 | D5 | | | |
| S40 | infinity | 2.000 | 1.51680 | 64.20 | Filter OF |
| S41 | infinity | D6 | | | |
| img | infinity | 0.000 | | | |

In the present embodiment, when zooming, variable distances Dn, focal lengths, angles of view, F numbers, and overall lengths with respect to infinite object distances (infinity) and object distances of 821 mm at the wide-angle position, the middle position, and the telephoto position are shown, respectively, as follows.

TABLE 2

| Config | Wide-angle position | Middle position | Telephoto position | Wide-angle position | Middle position | Telephoto position |
|---|---|---|---|---|---|---|
| D0 | infinity | infinity | infinity | 821 | 821 | 821 |
| D1 | 2.256913 | 17.177705 | 32.098497 | 2.256913 | 17.177705 | 32.098497 |
| D2 | 6.345383 | 7.014698 | 12.305472 | 4.783924 | 4.011814 | 3.696073 |
| D3 | 18.108398 | 14.265386 | 3.603668 | 19.669858 | 17.268270 | 12.213066 |
| D4 | 23.644306 | 11.897212 | 2.347364 | 23.644306 | 11.897212 | 2.347364 |
| D5 | 25.341000 | 25.341000 | 25.341000 | 25.341000 | 25.341000 | 25.341000 |
| D6 | 1 | 1 | 1 | 1 | 1 | 1 |
| f | 51.497 | 75.598 | 145.410 | 0.058 | 0.078 | 0.120 |
| 2w | 15.99 | 10.77 | 5.52 | 16.11 | 11.13 | 6.53 |
| Fno | 2.89 | 2.89 | 2.89 | 2.89 | 2.89 | 2.89 |
| Overall length | 179 | 179 | 179 | 179 | 179 | 179 |

Figure 2A:
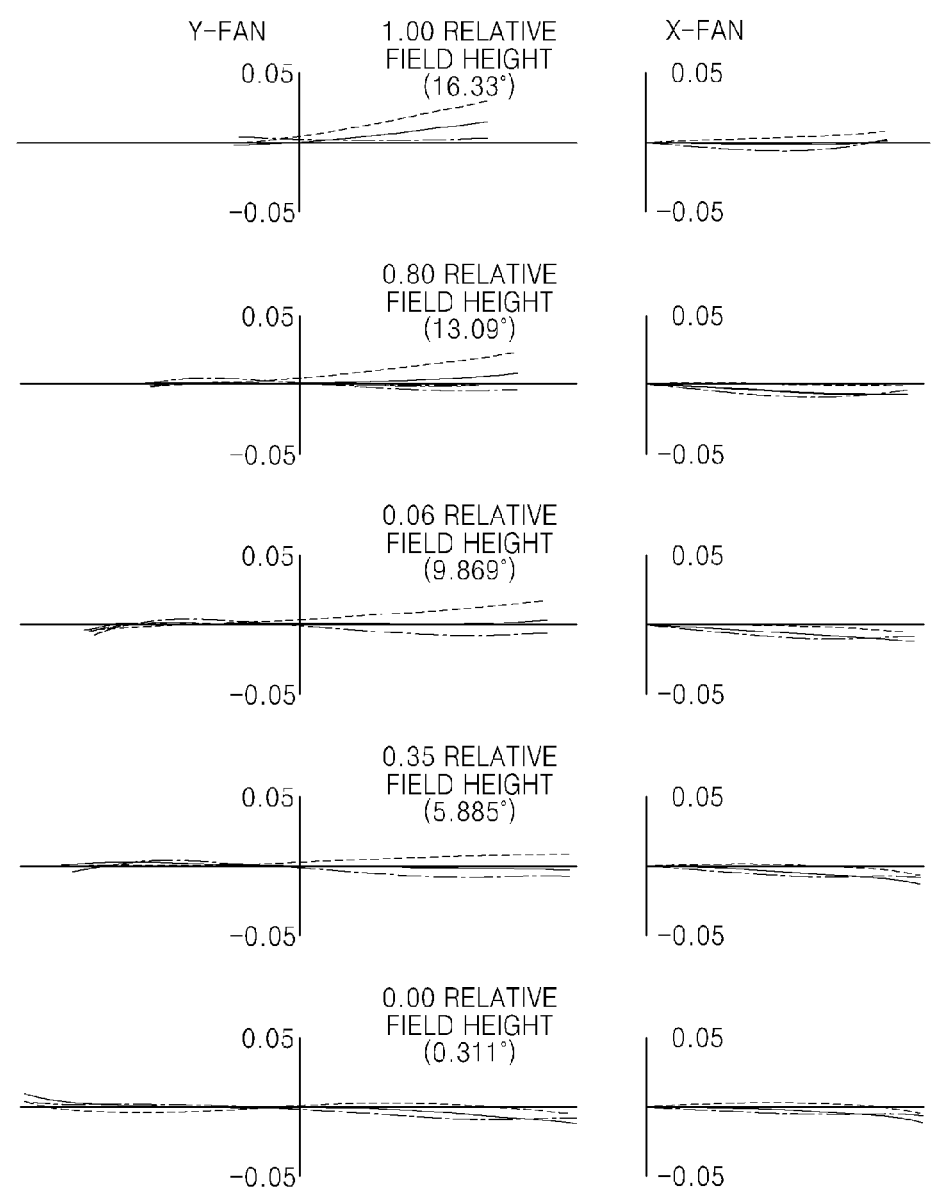
FIG. 2A is a diagram illustrating lateral aberration of the zoom lens system of FIG. 1 at the wide-angle position, in which an image stabilization lens group moves vertically upward with respect to an optical axis.
Figure 2B:
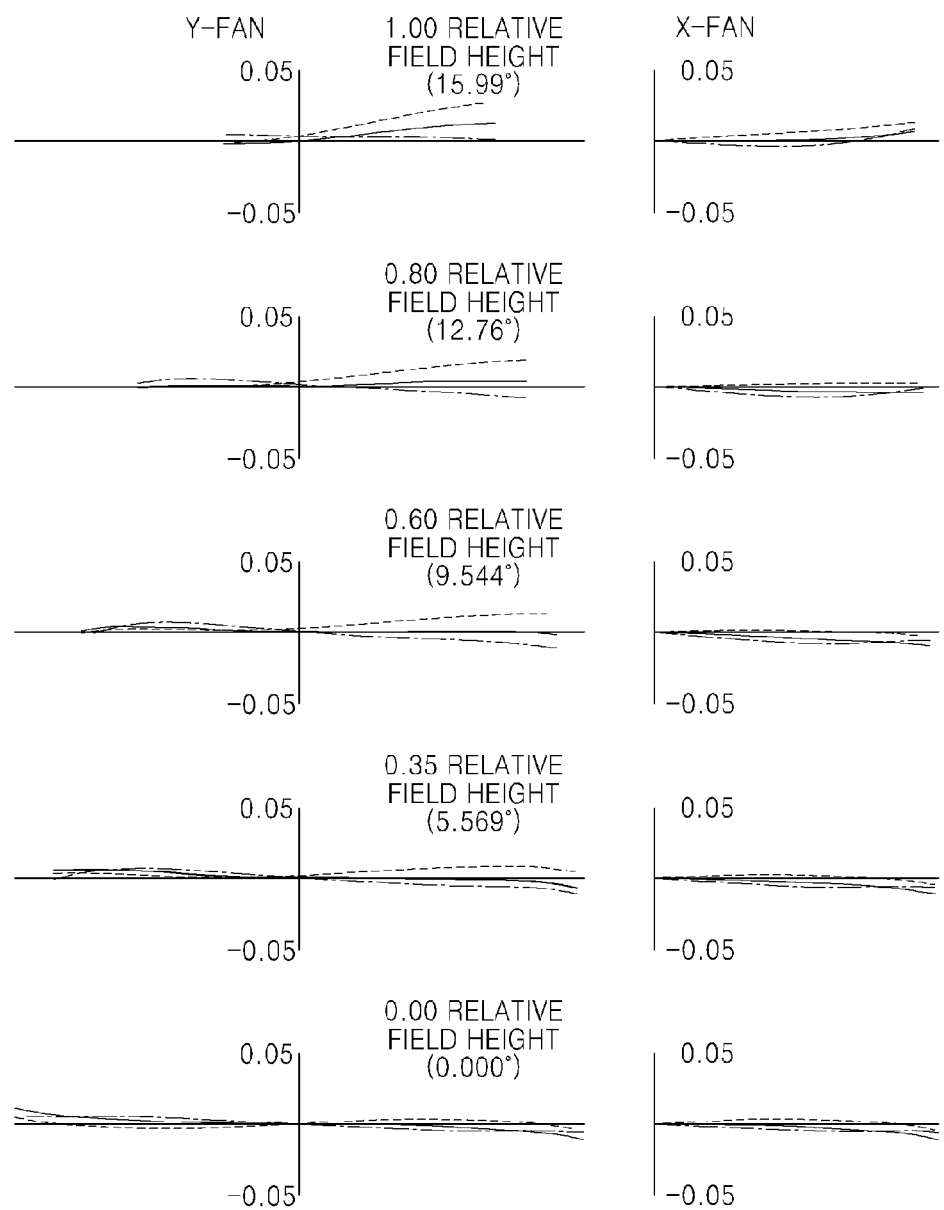
FIG. 2B is a diagram illustrating lateral aberration of the zoom lens system of FIG. 1 at the wide-angle position, in which the image stabilization lens group is located on the optical axis.
Figure 2C:
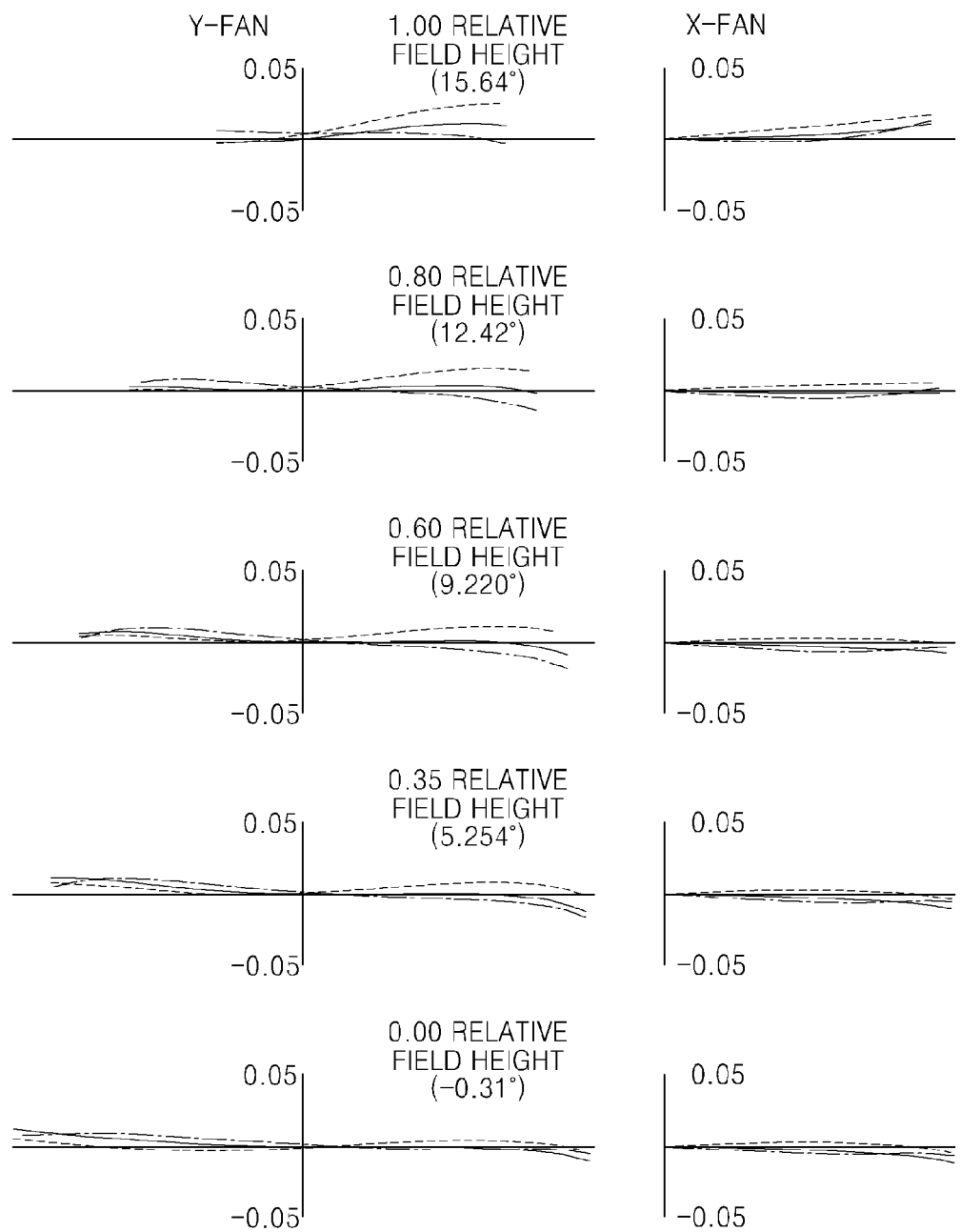
FIG. 2C is a diagram illustrating lateral aberration of the zoom lens system of FIG. 1 at the wide-angle position, in which the image stabilization lens group moves vertically downward with respect to the optical axis.

FIGS. 2A to 2C are diagrams illustrating lateral aberration of the telephoto zoom lens system 100-1 at the wide-angle position. FIG. 2A illustrates a case in which second sub lens group G5-2, which is an image stabilization lens group, moves vertically upward by 0.24 mm with respect to an optical axis. FIG. 2B illustrates a case in which the second sub lens group G5-2 is located on the optical axis. FIG. 2C illustrates a case in which the second sub lens group G5-2 moves vertically downward by 0.24 mm with respect to the optical axis.

Figure 3A:
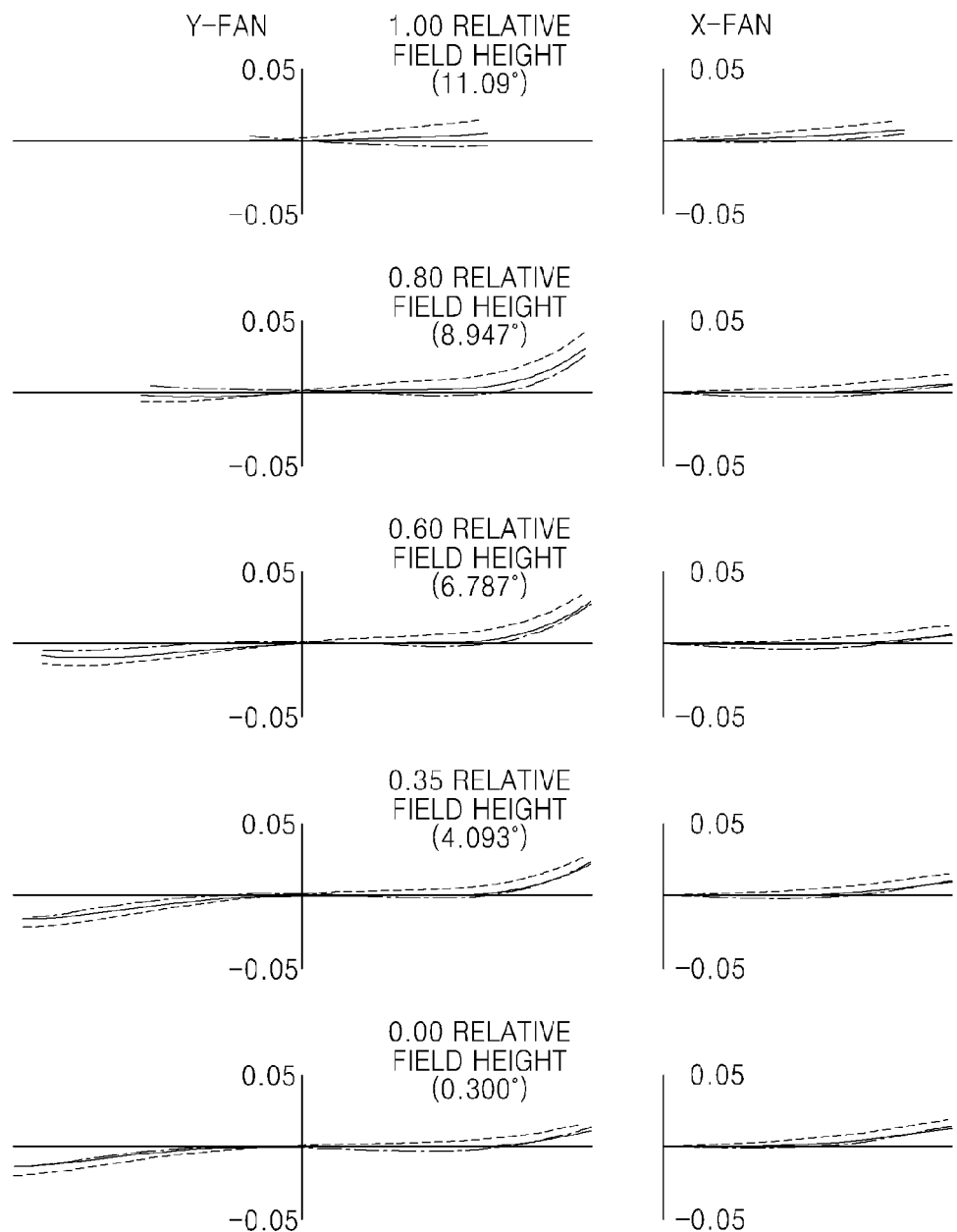
FIG. 3A is a diagram illustrating lateral aberration of the zoom lens system of FIG. 1 at the middle position, in which an image stabilization lens group moves vertically upward with respect to an optical axis.
Figure 3B:
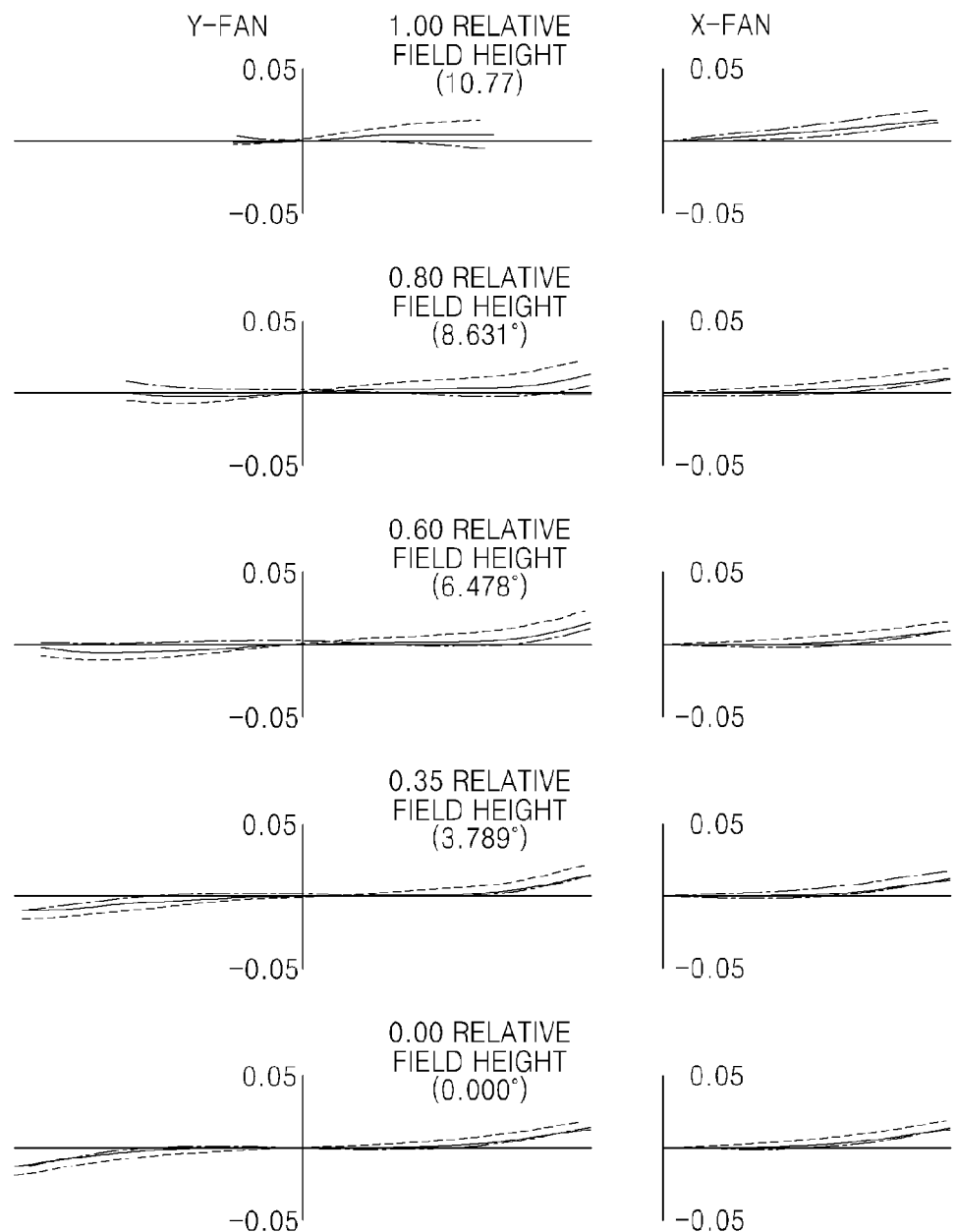
FIG. 3B is a diagram illustrating lateral aberration of the zoom lens system of FIG. 1 at the middle position, in which the image stabilization lens group is located on the optical axis.
Figure 3C:
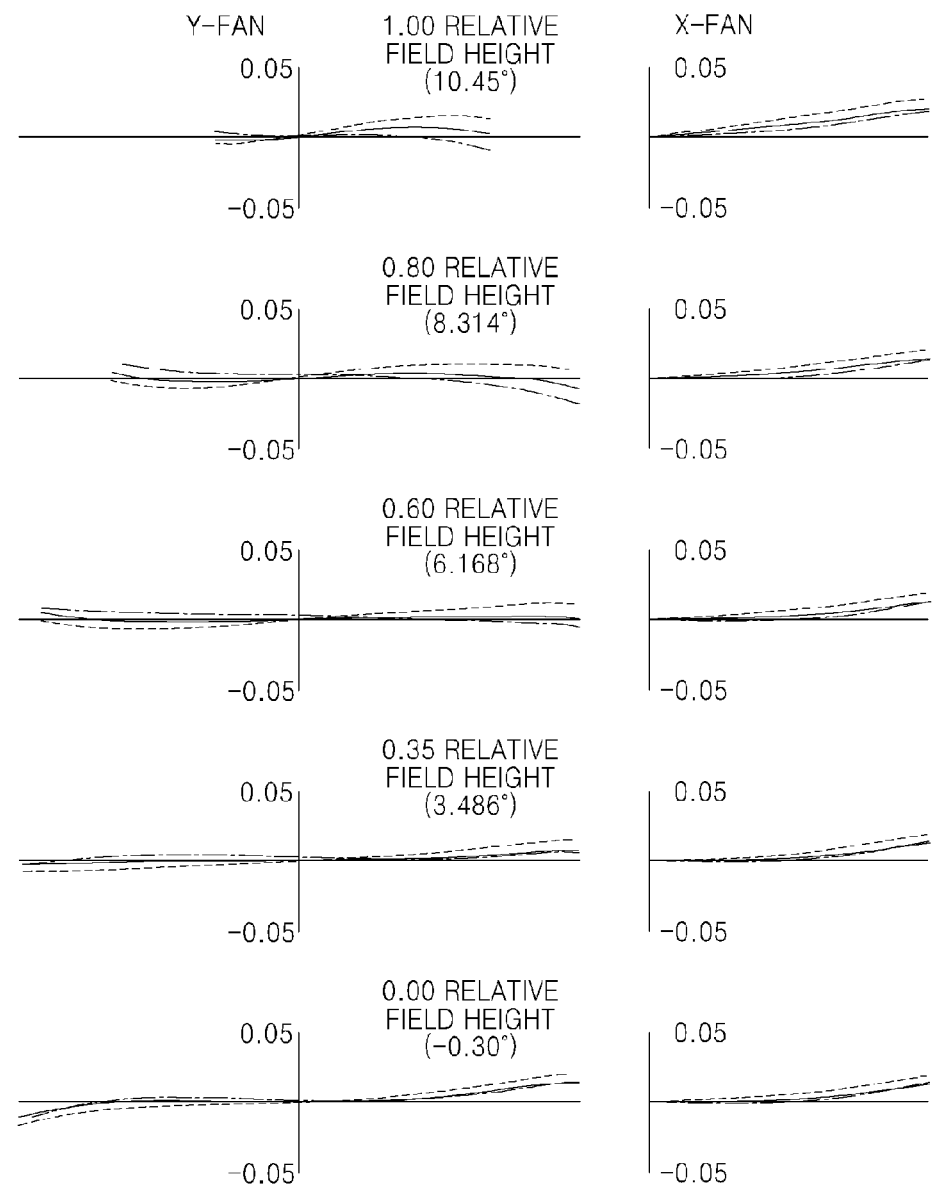
FIG. 3C is a diagram illustrating lateral aberration of the zoom lens system of FIG. 1 at the middle position, in which the image stabilization lens group moves vertically downward with respect to the optical axis.

FIGS. 3A to 3C are diagrams illustrating lateral aberration of the telephoto zoom lens system 100-1 at the middle position. FIG. 3A illustrates a case in which the second sub lens group G5-2 moves vertically upward by 0.34 mm with respect to the optical axis. FIG. 3B illustrates a case in which the second sub lens group G5-2 is located on the optical axis. FIG. 3C illustrates a case in which the second sub lens group G5-2 moves vertically downward by 0.34 mm with respect to the optical axis.

Figure 4A:
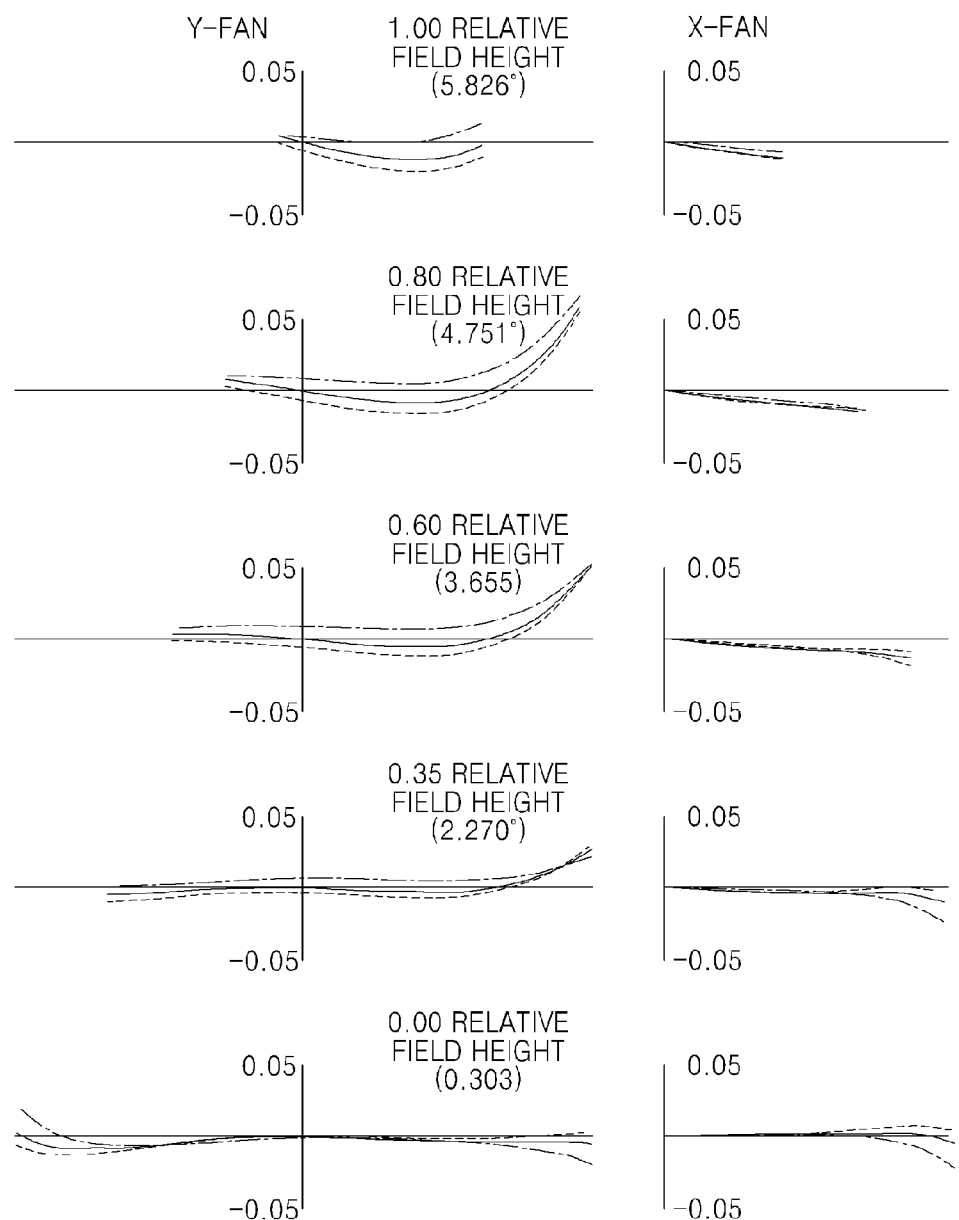
FIG. 4A is a diagram illustrating lateral aberration of the zoom lens system of FIG. 1 at the telephoto position, in which an image stabilization lens group moves vertically upward with respect to an optical axis.
Figure 4B:
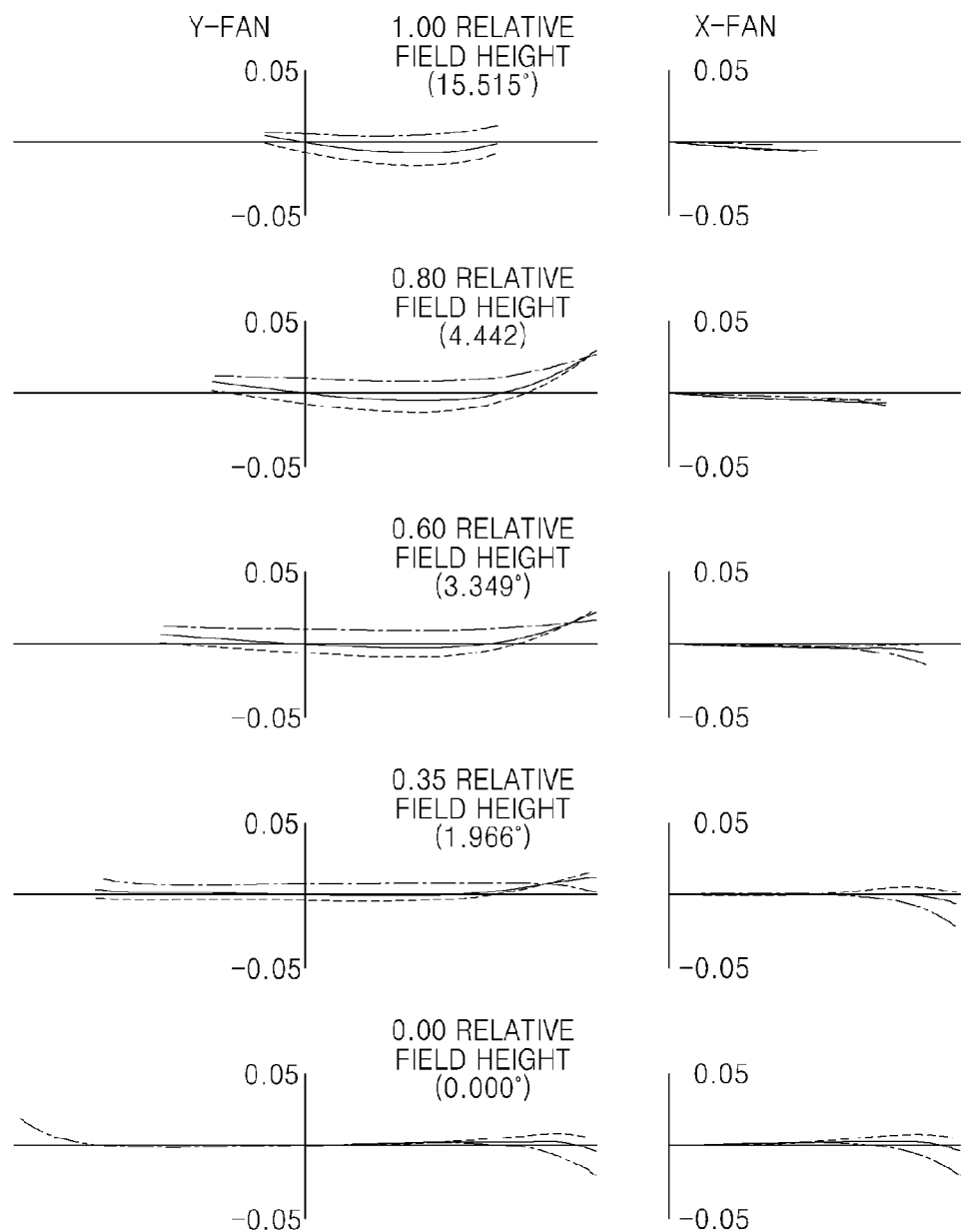
FIG. 4B is a diagram illustrating lateral aberration of the zoom lens system of FIG. 1 at the telephoto position, in which the image stabilization lens group is located on the optical axis.
Figure 4C:
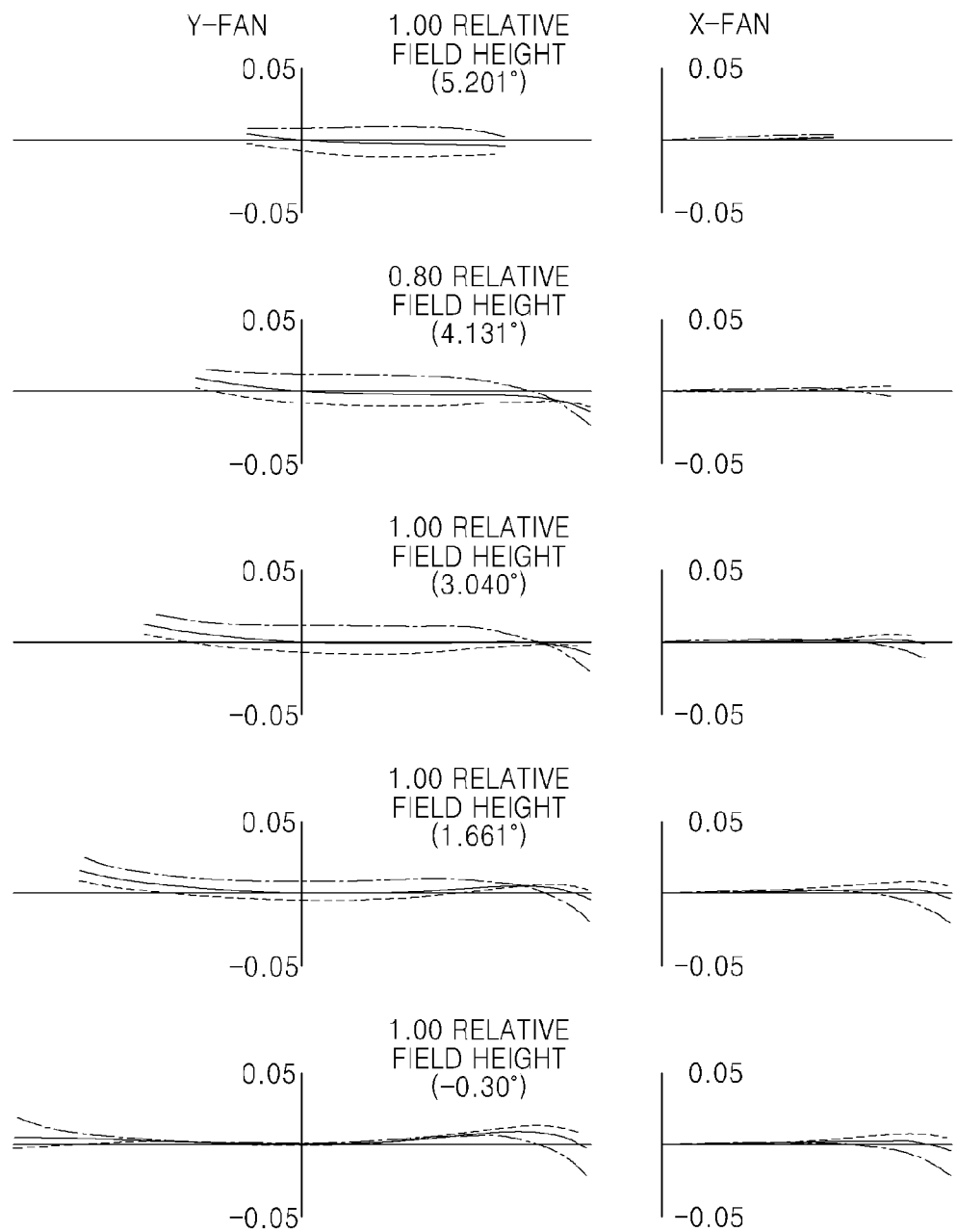
FIG. 4C is a diagram illustrating lateral aberration of the zoom lens system of FIG. 1 at the telephoto position, in which the image stabilization lens group moves vertically downward with respect to the optical axis.

FIGS. 4A to 4C are diagrams illustrating lateral aberration of the telephoto zoom lens system 100-1 at the telephoto position. FIG. 4A illustrates a case in which the second sub lens group G5-2 moves vertically upward by 0.66 mm with respect to the optical axis. FIG. 4B illustrates a case in which the second sub lens group G5-2 is located on the optical axis. FIG. 4C illustrates a case in which the second sub lens group G5-2 moves vertically downward by 0.66 mm with respect to the optical axis, respectively.

[Embodiment 2]

Figure 5:
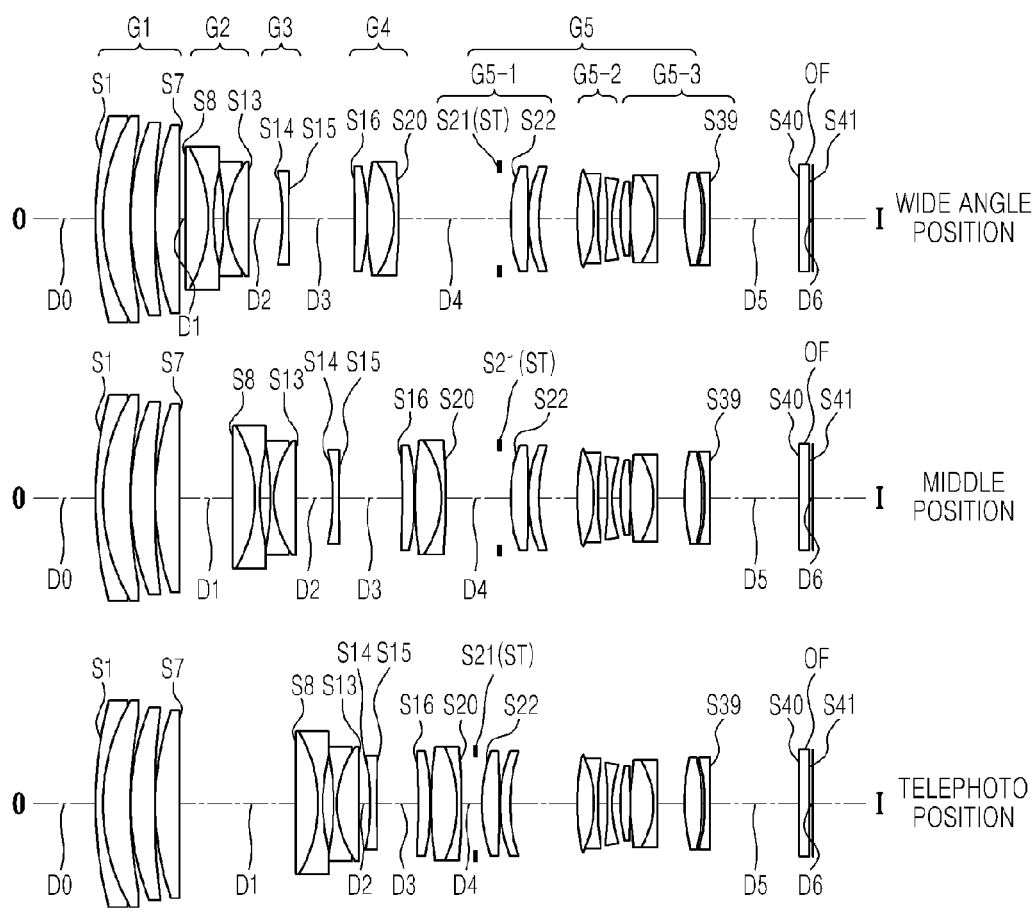
FIG. 5 is a diagram illustrating a telephoto zoom lens system at a wide-angle position, a middle position, and a telephoto position, according to another embodiment.

FIG. 5 illustrates a telephoto zoom lens system 100-2 at a wide-angle position, a middle position, and a telephoto position, respectively, according to another embodiment. Design data thereof will now be described as follows.

TABLE 3

| Surface of lens | R | Dn | Nd | vd | Note |
|---|---|---|---|---|---|
| obj | infinity | D0 | | | |
| S1 | 134.781 | 1.780 | 1.71736 | 29.50 | First lens |
| S2 | 57.207 | 6.670 | 1.49700 | 81.61 | group G1 |
| S3 | 239.388 | 0.100 | | | |
| S4 | 76.561 | 6.000 | 1.49700 | 81.61 | |
| S5 | 736.955 | 0.100 | | | |
| S6 | 76.561 | 5.830 | 1.49700 | 81.61 | |
| S7 | 1000.000 | D1 | | | |
| S8 | −390.304 | 4.500 | 1.90366 | 31.31 | Second |
| S9 | −45.198 | 1.500 | 1.74330 | 49.22 | lens group |
| S10 | 49.382 | 2.920 | | | G2 |
| S11 | −126.339 | 1.000 | 1.77250 | 49.62 | |
| S12 | 28.731 | 4.590 | 1.84666 | 23.78 | |
| S13 | 1000.000 | D2 | | | |
| S14 | −43.961 | 1.000 | 1.77250 | 49.62 | Third lens |
| S15 | 155.003 | D3 | | | group G3 |
| S16 | infinity | 3.000 | 1.77250 | 49.62 | Fourth lens |
| S17 | −89.460 | 0.100 | | | group G4 |
| S18 | 94.944 | 6.010 | 1.63854 | 55.45 | |
| S19 | −34.288 | 1.000 | 1.84666 | 23.78 | |
| S20 | −106.292 | D4 | | | |
| S21(ST) | infinity | 2.000 | | | First sub |
| S22 | 35.472 | 4.740 | 1.49700 | 81.61 | lens group |
| S23 | −272.939 | 0.100 | | | G5-1 |
| S24 | 41.304 | 3.500 | 1.77250 | 49.62 | |
| S25 | 55.141 | 5.419 | | | |
| S26 | 101.310 | 4.190 | 1.80518 | 25.46 | Second |
| S27 | −43.463 | 0.800 | 1.63980 | 34.57 | sub lens |
| S28 | 54.237 | 3.000 | | | group G5-2 |
| S29 | −97.589 | 0.800 | 1.70154 | 41.15 | |
| S30 | 33.044 | 3.189 | | | |
| S31 | 73.896 | 3.170 | 1.54814 | 45.82 | Third sub |
| S32 | −73.896 | 0.100 | | | lens group |
| S33 | 151.117 | 5.800 | 1.49700 | 81.61 | G5-3 |
| S34 | −21.941 | 1.000 | 1.84666 | 23.78 | |
| S35 | −223.019 | 5.213 | | | |
| S36 | 58.302 | 4.280 | 1.84666 | 23.78 | |
| S37 | −58.302 | 0.840 | | | |
| S38 | −39.223 | 1.280 | 1.77250 | 49.62 | |
| S39 | 500.000 | D5 | | | |
| S40 | infinity | 2.000 | 1.51680 | 64.20 | Filter OF |
| S41 | infinity | D6 | | | |
| img | infinity | 0.000 | | | |

In the present embodiment, when zooming, variable distances Dn, focal lengths, angles of view, F numbers, and overall lengths with respect to infinite object distances (infinity) and object distances of 820 mm at the wide-angle position, the middle position, and the telephoto position are shown, respectively, as follows.

TABLE 4

| Config | Wide-angle position | Middle position | Telephoto position | Wide-angle position | Middle position | Telephoto position |
|---|---|---|---|---|---|---|
| D0 | infinity | infinity | infinity | 820 | 820 | 820 |
| D1 | 2.490146 | 18.310982 | 34.131818 | 2.490146 | 18.310982 | 34.131818 |
| D2 | 6.583462 | 6.826902 | 13.651683 | 4.746719 | 3.283118 | 3.423386 |
| D3 | 20.275034 | 15.860953 | 3.466547 | 22.111777 | 19.404737 | 13.694841 |
| D4 | 22.905358 | 11.255163 | 1.003952 | 22.905358 | 11.255163 | 1.003952 |
| D5 | 29.225000 | 29.225000 | 29.225000 | 29.225000 | 29.225000 | 29.225000 |
| D6 | 1 | 1 | 1 | 1 | 1 | 1 |
| F | 51.500 | 75.341 | 145.545 | 0.058 | 0.078 | 0.119 |
| 2w | 15.96 | 10.80 | 5.51 | 16.13 | 11.23 | 6.69 |
| Fno | 2.82 | 2.81 | 2.81 | 2.82 | 2.81 | 2.81 |
| Overall length | 180 | 180 | 180 | 180 | 180 | 180 |

Figure 6A:
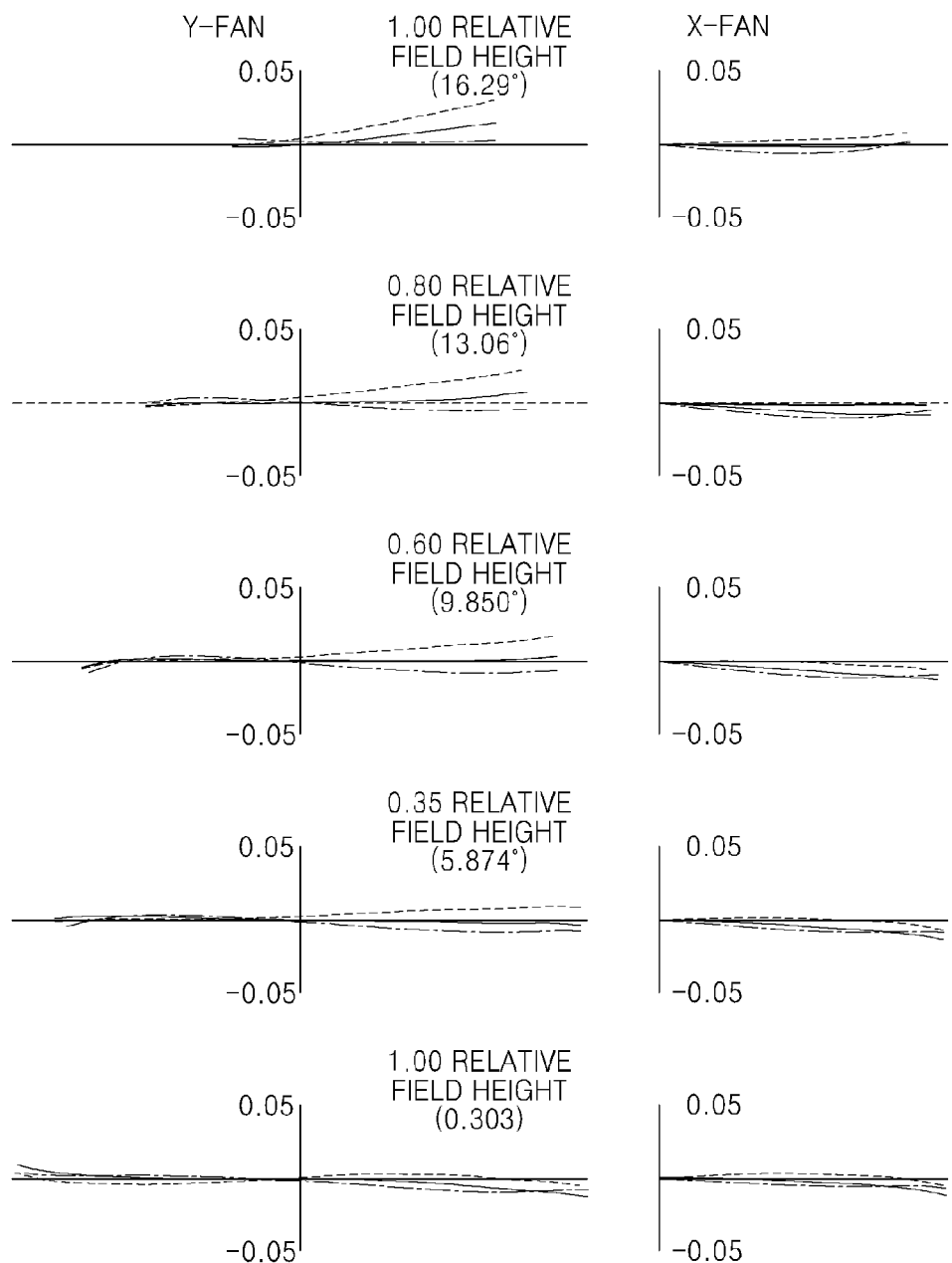
FIG. 6A is a diagram illustrating lateral aberration of the zoom lens system of FIG. 5 at the wide-angle position, in which an image stabilization lens group moves vertically upward with respect to an optical axis.
Figure 6C:
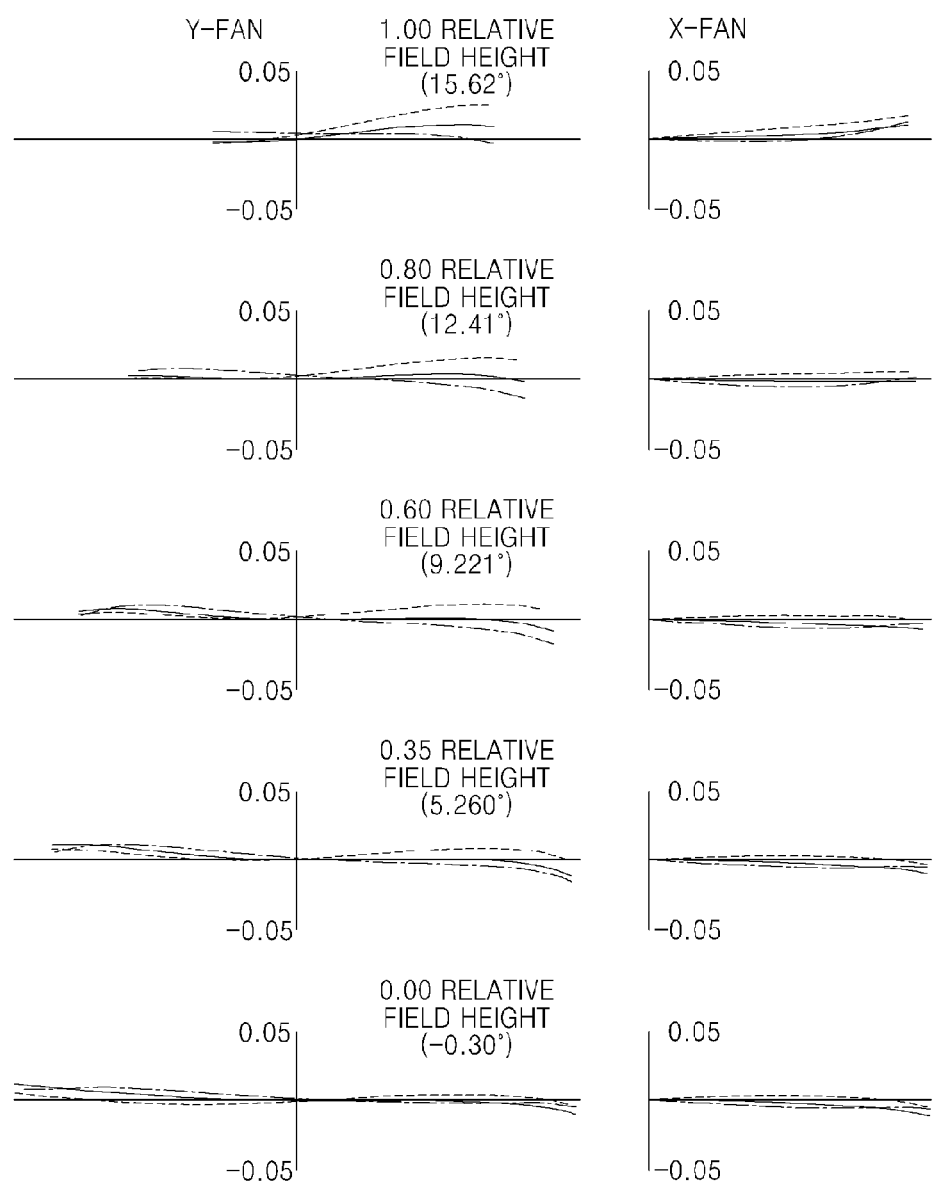
FIG. 6C is a diagram illustrating lateral aberration of the zoom lens system of FIG. 5 at the wide-angle position, in which the image stabilization lens group moves vertically downward with respect to the optical axis.

FIGS. 6A to 6C are diagrams illustrating lateral aberration of the telephoto zoom lens system 100-2 at the wide-angle position. FIG. 6A illustrates a case in which a second sub lens group G5-2, which is an image stabilization lens group, moves vertically upward by 0.21 mm with respect to an optical axis. FIG. 6B illustrates a case in which the second sub lens group G5-2 is located on the optical axis. FIG. 6C illustrates a case in which the second sub lens group G5-2 moves vertically downward by 0.21 mm with respect to the optical axis.

Figure 7A:
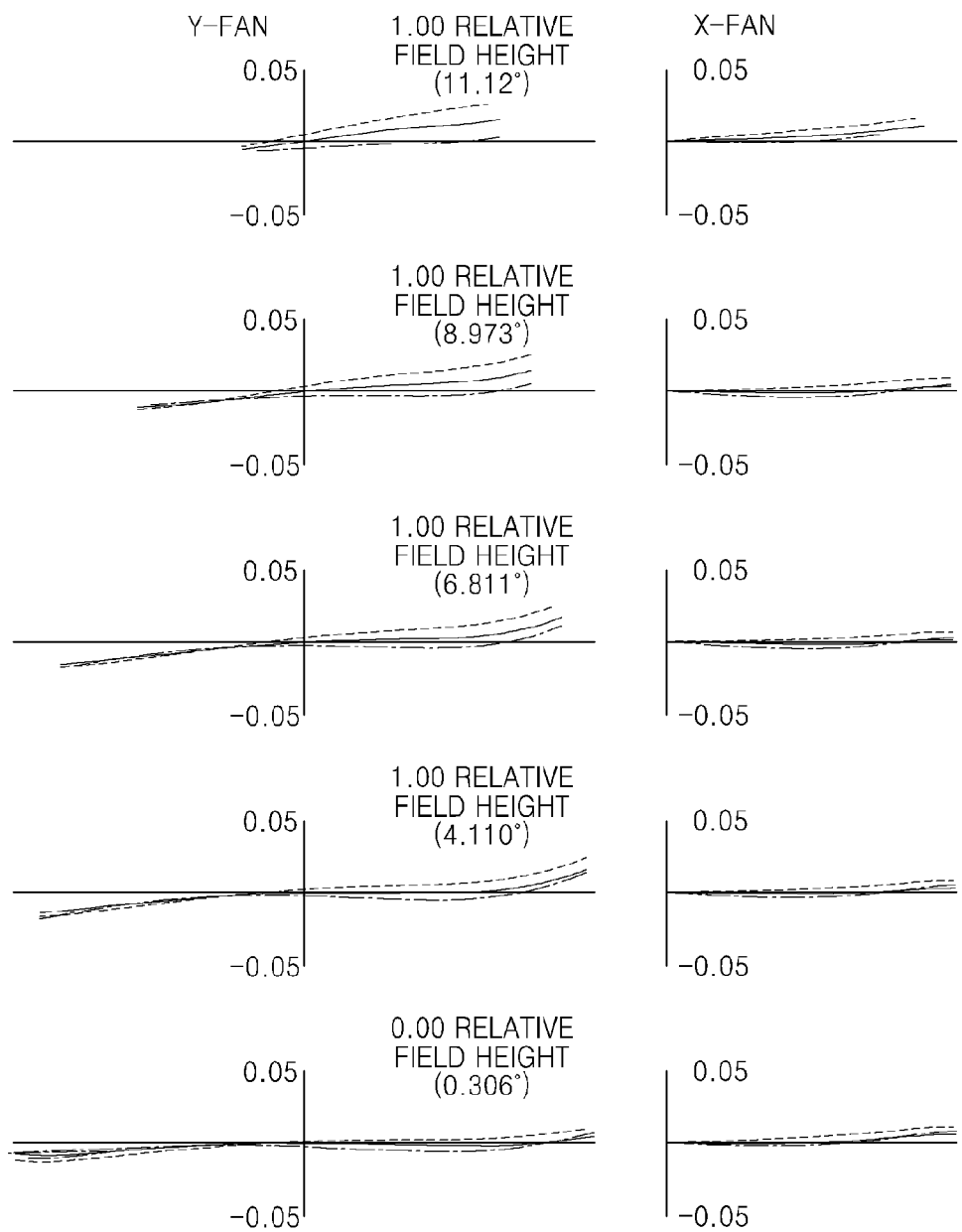
FIG. 7A is a diagram illustrating lateral aberration of the zoom lens system of FIG. 5 at the middle position, in which an image stabilization lens group moves vertically upward with respect to an optical axis.
Figure 7B:
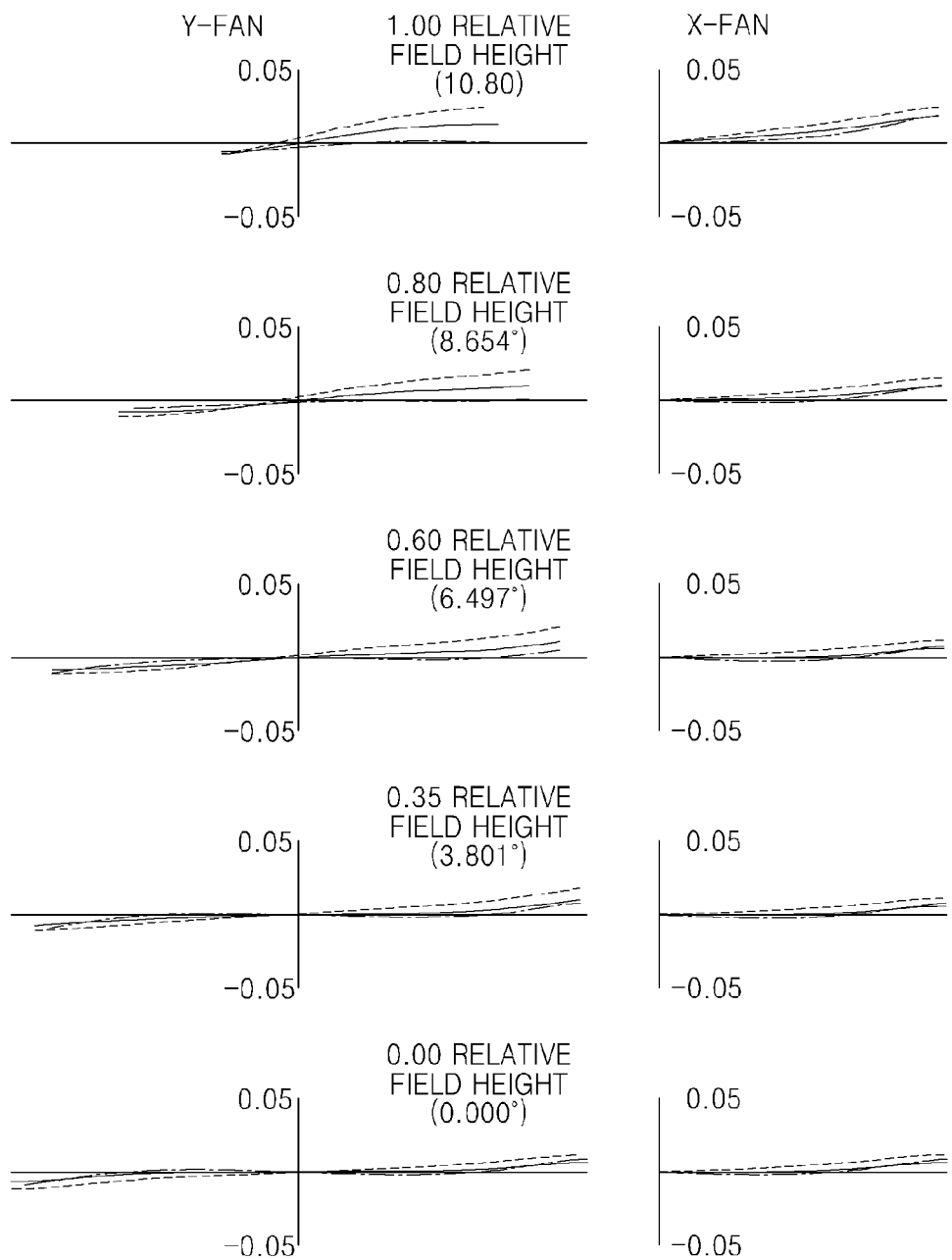
FIG. 7B is a diagram illustrating lateral aberration of the zoom lens system of FIG. 5 at the middle position, in which the image stabilization lens group is located on the optical axis.
Figure 7C:
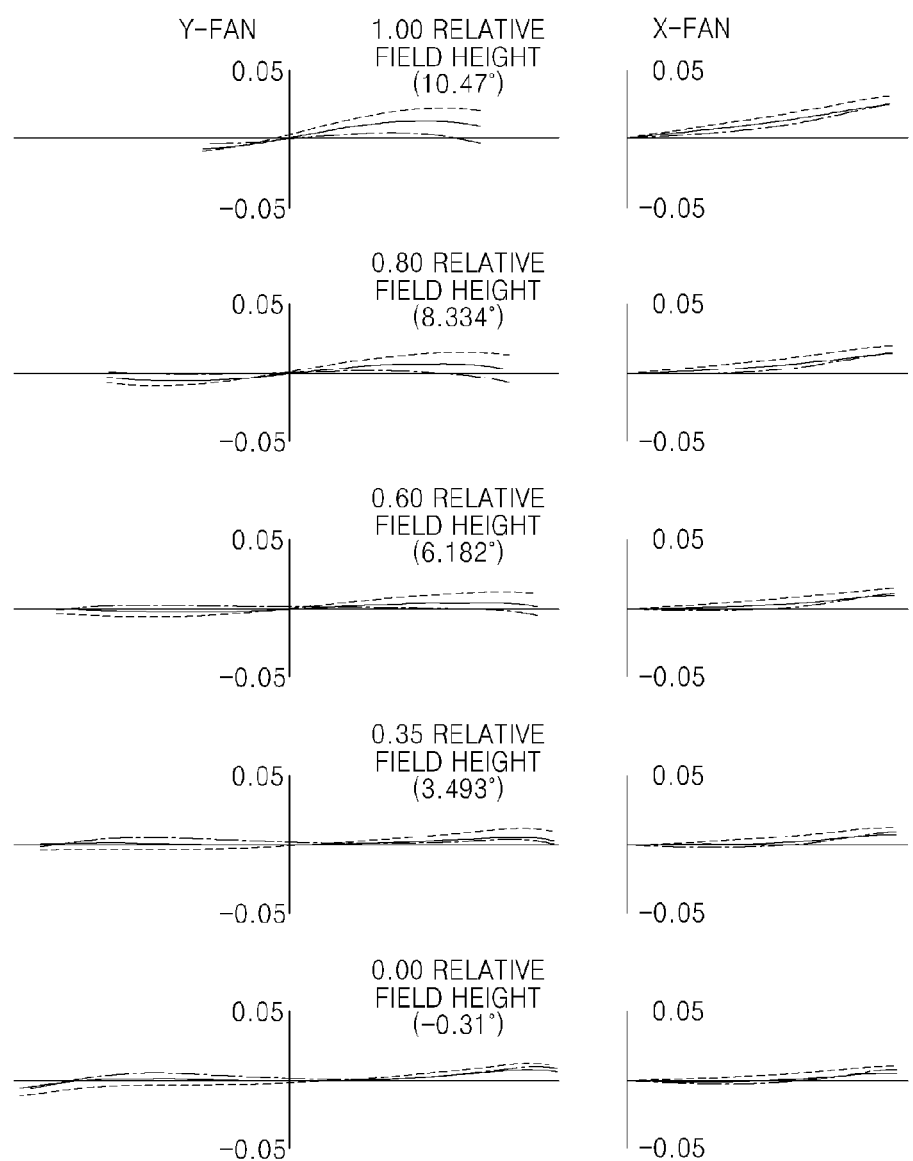
FIG. 7C is a diagram illustrating lateral aberration of the zoom lens system of FIG. 5 at the middle position, in which the image stabilization lens group moves vertically downward with respect to the optical axis.

FIGS. 7A to 7C are diagrams illustrating lateral aberration of the telephoto zoom lens system 100-2 at the middle position. FIG. 7A illustrates a case in which the second sub lens group G5-2 moves vertically upward by 0.31 mm with respect to the optical axis. FIG. 7B illustrates a case in which the second sub lens group G5-2 is located on the optical axis. FIG. 7C illustrates a case in which the second sub lens group G5-2 moves vertically downward by 0.31 mm with respect to the optical axis.

Figure 8A:
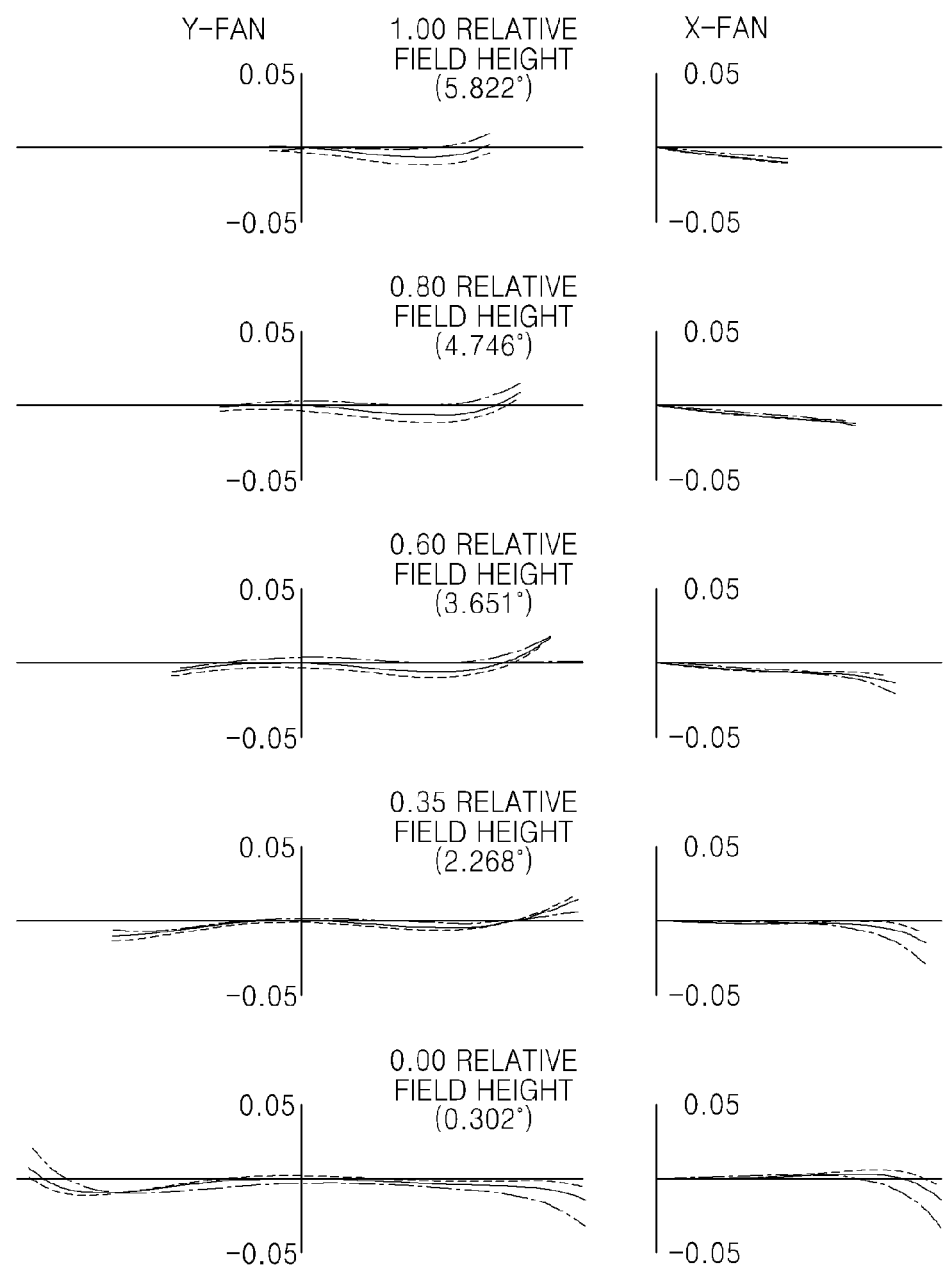
FIG. 8A is a diagram illustrating lateral aberration of the zoom lens system of FIG. 5 at the telephoto position, in which an image stabilization lens group moves vertically upward with respect to an optical axis.
Figure 8B:
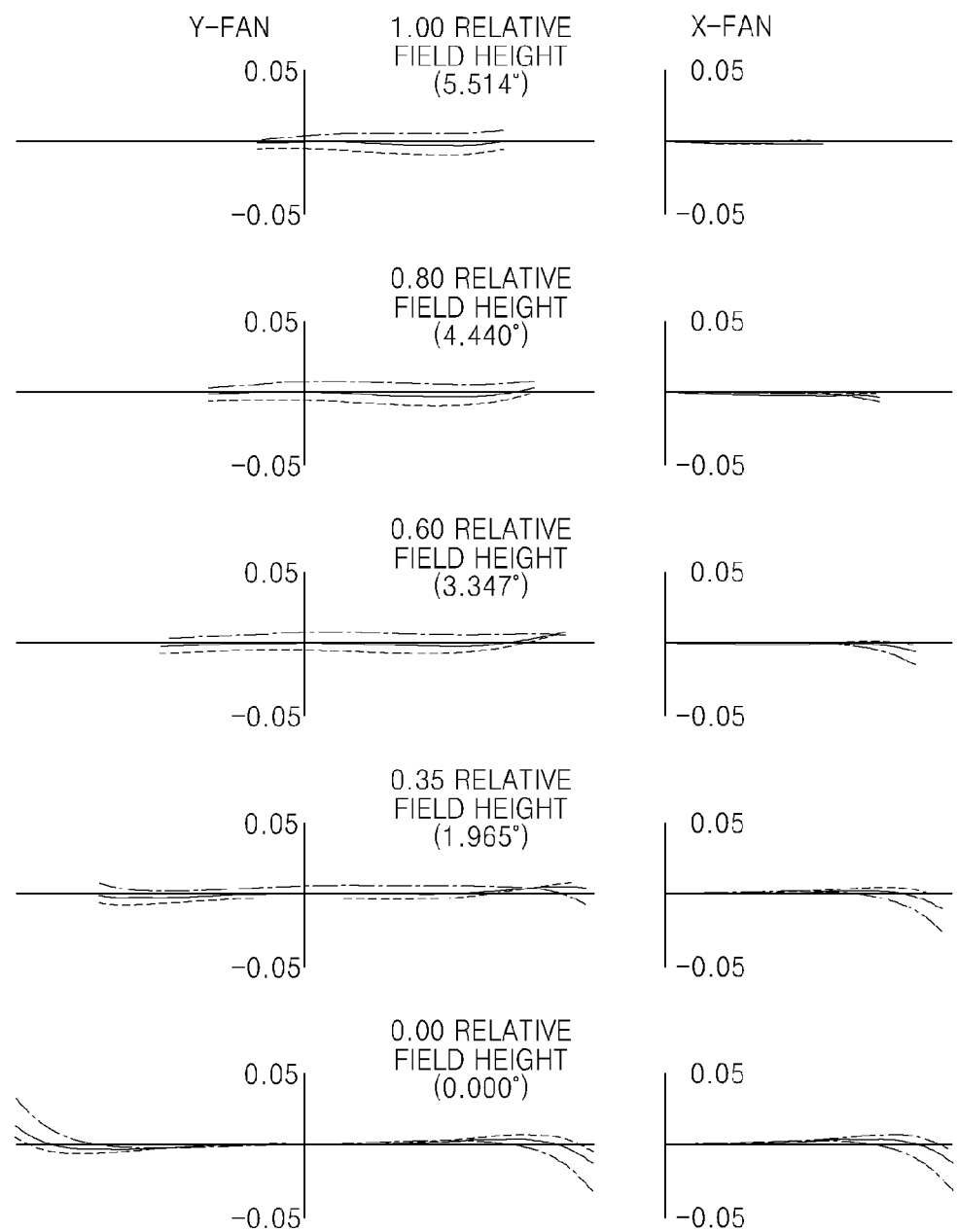
FIG. 8B is a diagram illustrating lateral aberration of the zoom lens system of FIG. 5 at the telephoto position, in which the image stabilization lens group is located on the optical axis.
Figure 8C:
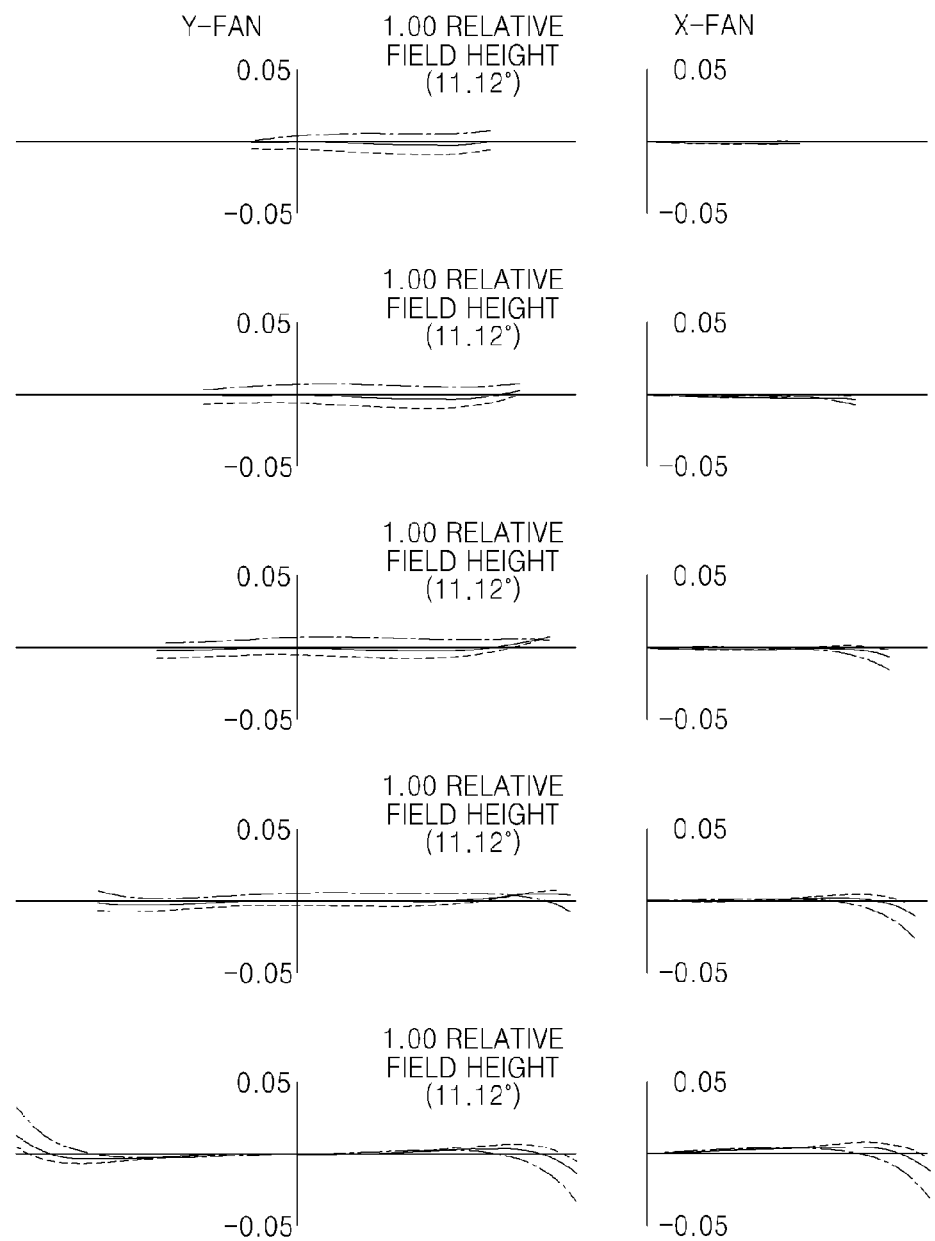
FIG. 8C is a diagram illustrating lateral aberration of the zoom lens system of FIG. 5 at the telephoto position, in which the image stabilization lens group moves vertically downward with respect to the optical axis.

FIGS. 8A to 8C are diagrams illustrating lateral aberration of the telephoto zoom lens system 100-2 at the telephoto position. FIG. 8A illustrates a case in which the second sub lens group G5-2 moves vertically upward by 0.59 mm with respect to the optical axis. FIG. 8B illustrates a case in which the second sub lens group G5-2 is located on the optical axis. FIG. 8C illustrates a case in which the second sub lens group G5-2 moves vertically downward by 0.59 mm with respect to the optical axis.

[Embodiment 3]

Figure 9:
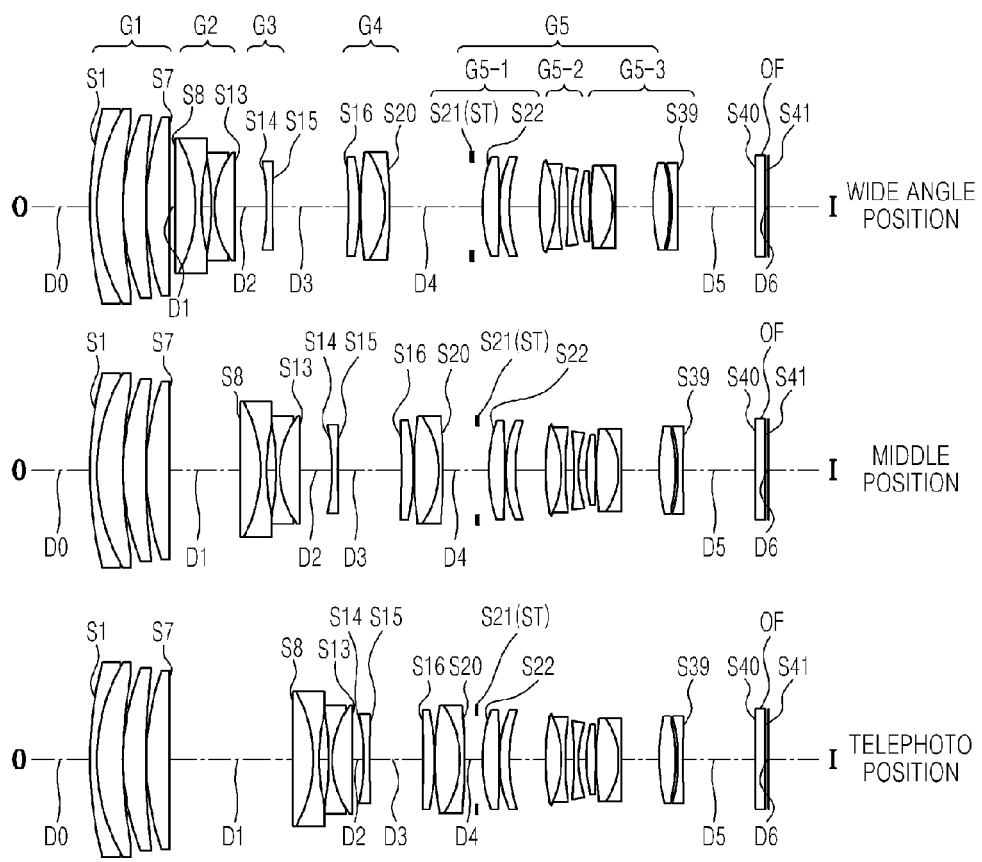
FIG. 9 is a diagram illustrating a telephoto zoom lens system at a wide-angle position, a middle position, and a telephoto position, according to another embodiment.

FIG. 9 illustrates a telephoto zoom lens system 100-3 at a wide-angle position, a middle position, and a telephoto position, respectively, according to another embodiment. Design data thereof will now be described as follows.

TABLE 5

| Surface of lens | R | Dn | Nd | vd | Note |
|---|---|---|---|---|---|
| obj | infinity | D0 | | | |
| S1 | 119.206 | 1.780 | 1.71736 | 29.50 | First lens |
| S2 | 58.280 | 6.040 | 1.49700 | 81.61 | group G1 |
| S3 | 178.942 | 0.100 | | | |

TABLE 5-continued

| Surface of lens | R | Dn | Nd | vd | Note |
|---|---|---|---|---|---|
| S4 | 76.083 | 6.000 | 1.49700 | 81.61 | |
| S5 | 888.184 | 0.100 | | | |
| S6 | 76.083 | 5.700 | 1.49700 | 81.61 | |
| S7 | 784.100 | D1 | | | |
| S8 | −345.084 | 4.090 | 1.90366 | 31.31 | Second |
| S9 | −45.819 | 1.500 | 1.74330 | 49.22 | lens group |
| S10 | 48.413 | 2.484 | | | G2 |
| S11 | −180.950 | 0.820 | 1.77250 | 49.62 | |
| S12 | 28.716 | 4.150 | 1.84666 | 23.78 | |
| S13 | 235.518 | D2 | | | |
| S14 | −37.308 | 1.000 | 1.77250 | 49.62 | Third lens |
| S15 | 221.879 | D3 | | | group G3 |
| S16 | −255.488 | 3.000 | 1.77250 | 49.62 | Fourth lens |
| S17 | −64.046 | 0.100 | | | group G4 |
| S18 | 88.466 | 6.070 | 1.63854 | 55.45 | |
| S19 | −34.873 | 1.000 | 1.84666 | 23.78 | |
| S20 | −99.602 | D4 | | | |
| S21(ST) | infinity | 0.650 | | | First sub |
| S22 | 36.311 | 4.710 | 1.49700 | 81.61 | lens group |
| S23 | −390.307 | 0.100 | | | G5-1 |
| S24 | 47.574 | 3.500 | 1.77250 | 49.62 | |
| S25 | 67.601 | 9.212 | | | |
| S26 | 92.107 | 4.130 | 1.80518 | 25.46 | Second |
| S27 | −39.626 | 0.800 | 1.63980 | 34.57 | sub lens |
| S28 | 59.936 | 2.924 | | | group G5-2 |
| S29 | −78.496 | 0.800 | 1.70154 | 41.15 | |
| S30 | 31.743 | 2.526 | | | |
| S31 | 77.225 | 2.980 | 1.54814 | 45.82 | Third sub |
| S32 | −77.225 | 0.100 | | | lens group |
| S33 | 135.508 | 5.800 | 1.49700 | 81.61 | G5-3 |
| S34 | −19.159 | 1.000 | 1.84666 | 23.78 | |
| S35 | −226.873 | 9.493 | | | |
| S36 | 53.142 | 4.560 | 1.84666 | 23.78 | |
| S37 | −53.142 | 0.540 | | | |
| S38 | −43.007 | 1.280 | 1.77250 | 49.62 | |
| S39 | 500.000 | D5 | | | |
| S40 | infinity | 2.000 | 1.51680 | 64.20 | Filter OF |
| S41 | infinity | D6 | | | |
| img | infinity | 0.000 | | | |

In the present embodiment, when zooming, variable distances Dn, focal lengths, angles of view, F numbers, and overall lengths with respect to infinite object distances (infinity) and object distances of 820 mm at the wide-angle position, the middle position, and the telephoto position are shown, respectively, as follows.

TABLE 6

| Config | Wide-angle position | Middle position | Telephoto position | Wide-angle position | Middle position | Telephoto position |
|---|---|---|---|---|---|---|
| D0 | infinity | infinity | infinity | 820 | 820 | 820 |
| D1 | 2.503731 | 18.441625 | 34.379519 | 2.503731 | 18.441625 | 34.379519 |
| D2 | 11.951491 | 11.951491 | 11.951491 | 10.525984 | 9.160559 | 3.903565 |
| D3 | 17.058820 | 13.549924 | 3.670568 | 18.484327 | 16.340856 | 11.718493 |
| D4 | 20.836236 | 8.407237 | 2.348699 | 20.836236 | 8.407237 | 2.348699 |
| D5 | 25.610723 | 25.610723 | 25.610723 | 25.610723 | 25.610723 | 25.610723 |
| D6 | 1 | 1 | 1 | 1 | 1 | 1 |
| f | 51.503 | 76.155 | 145.403 | 0.058 | 0.079 | 0.123 |
| 2w | 15.97 | 10.68 | 5.52 | 16.11 | 11.05 | 6.43 |
| Fno | 2.90 | 2.90 | 2.90 | 2.90 | 2.89 | 2.89 |
| Overall length | 180 | 180 | 180 | 180 | 180 | 180 |

Figure 10A:
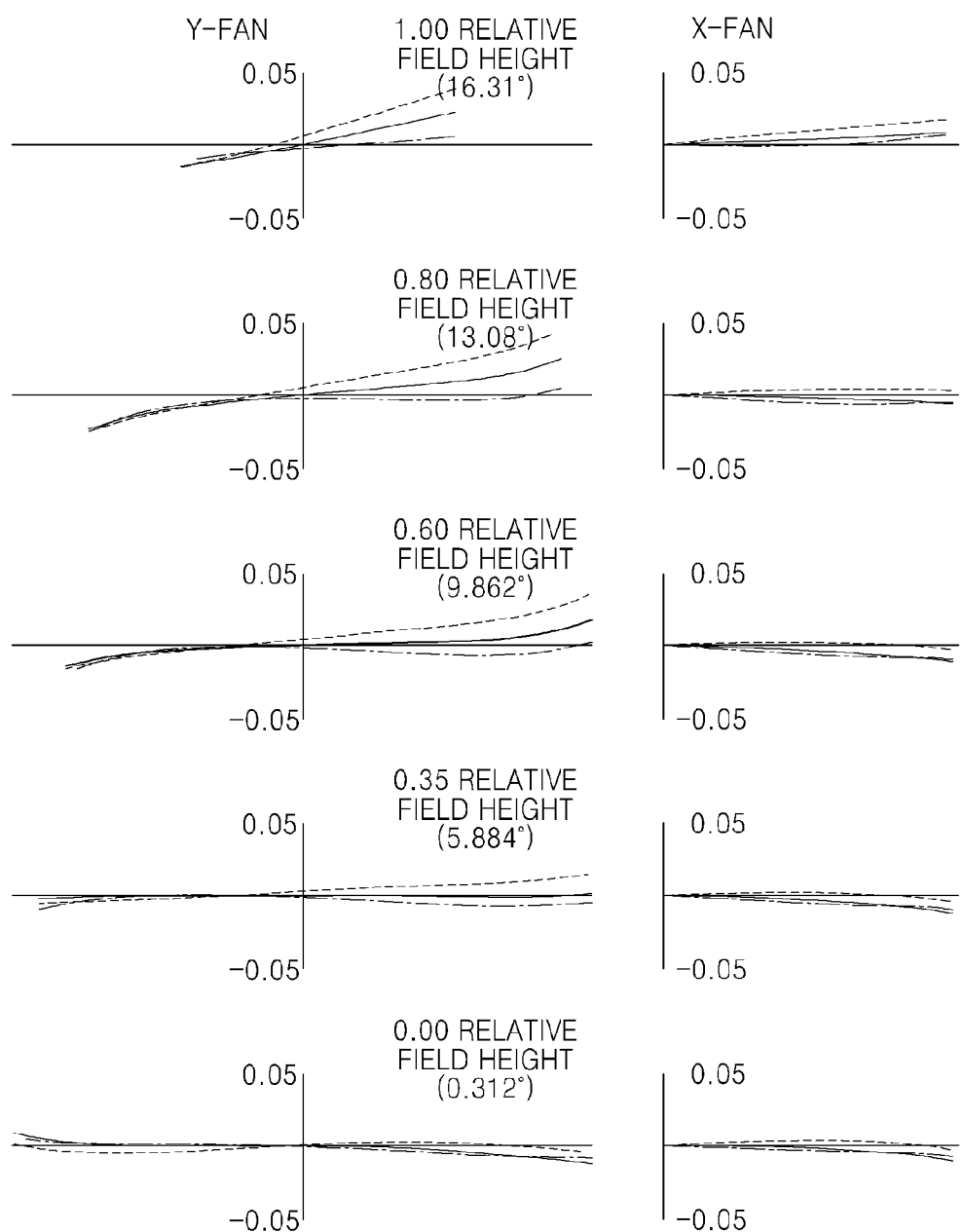
FIG. 10A is a diagram illustrating lateral aberration of the zoom lens system of FIG. 9 at the wide-angle position, in which an image stabilization lens group moves vertically upward with respect to an optical axis.
Figure 10B:
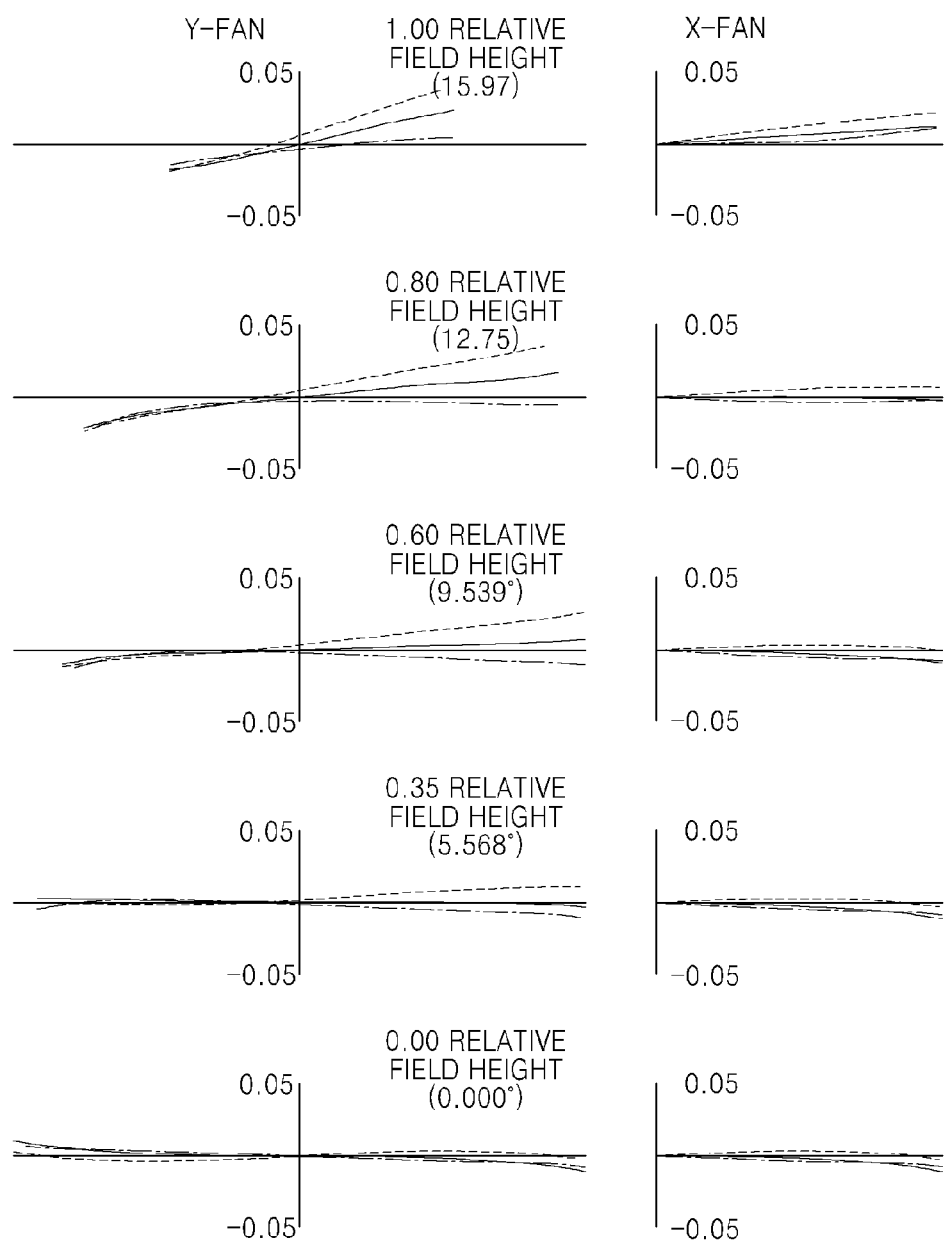
FIG. 10B is a diagram illustrating lateral aberration of the zoom lens system of FIG. 9 at the wide-angle position, in which the image stabilization lens group is located on the optical axis.
Figure 10C:
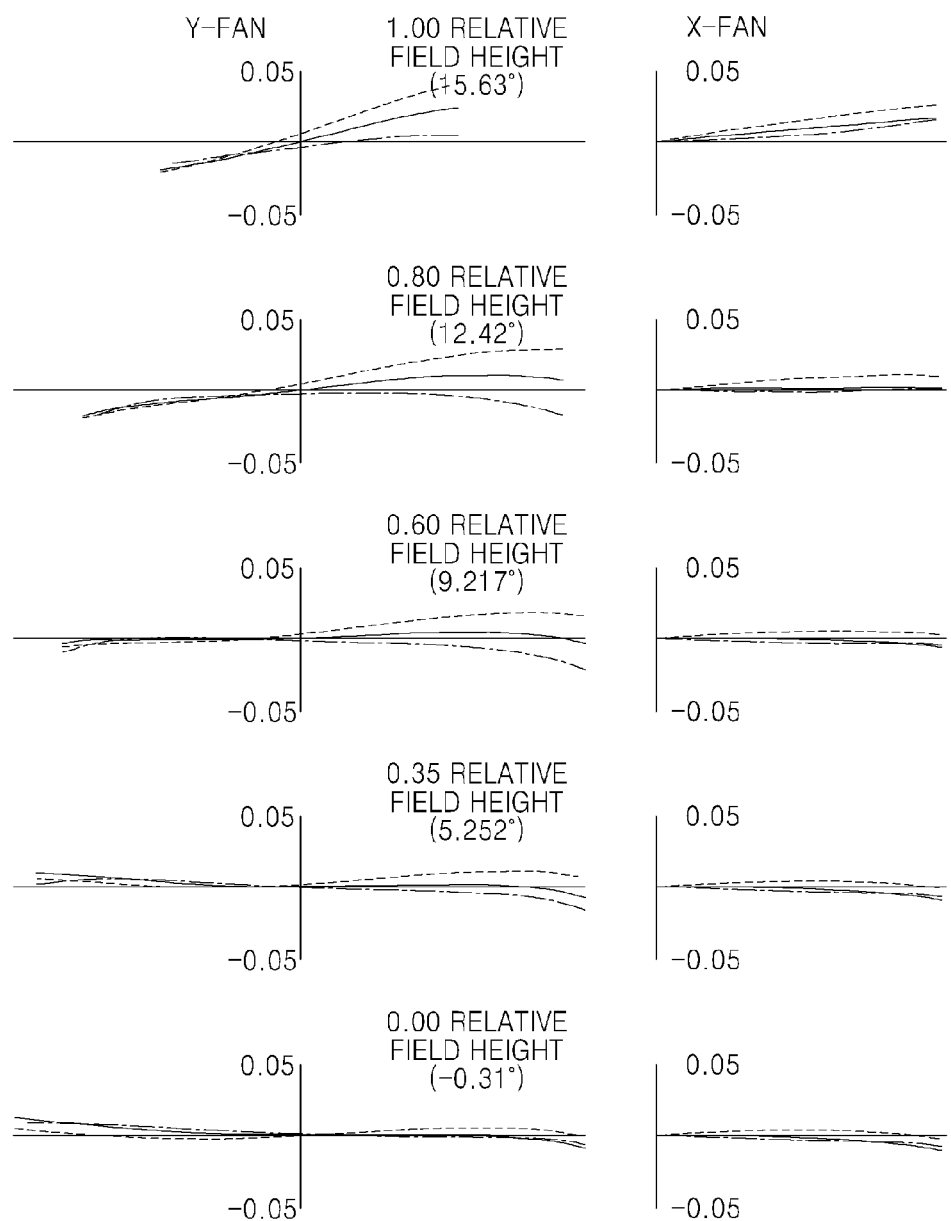
FIG. 10C is a diagram illustrating lateral aberration of the zoom lens system of FIG. 9 at the wide-angle position, in which the image stabilization lens group moves vertically downward with respect to the optical axis.

FIGS. 10A to 10C are diagrams illustrating lateral aberration of the telephoto zoom lens system 100-3 at the wide-angle position. FIG. 10A illustrates a case in which a second sub lens group G5-2, which is an image stabilization lens group, moves vertically upward by 0.23 mm with respect to an optical axis. FIG. 10B illustrates a case in which the second sub lens group G5-2 is located on the optical axis. FIG. 10C illustrates a case in which the second sub lens group G5-2 moves vertically downward by 0.23 mm with respect to the optical axis.

Figure 11A:
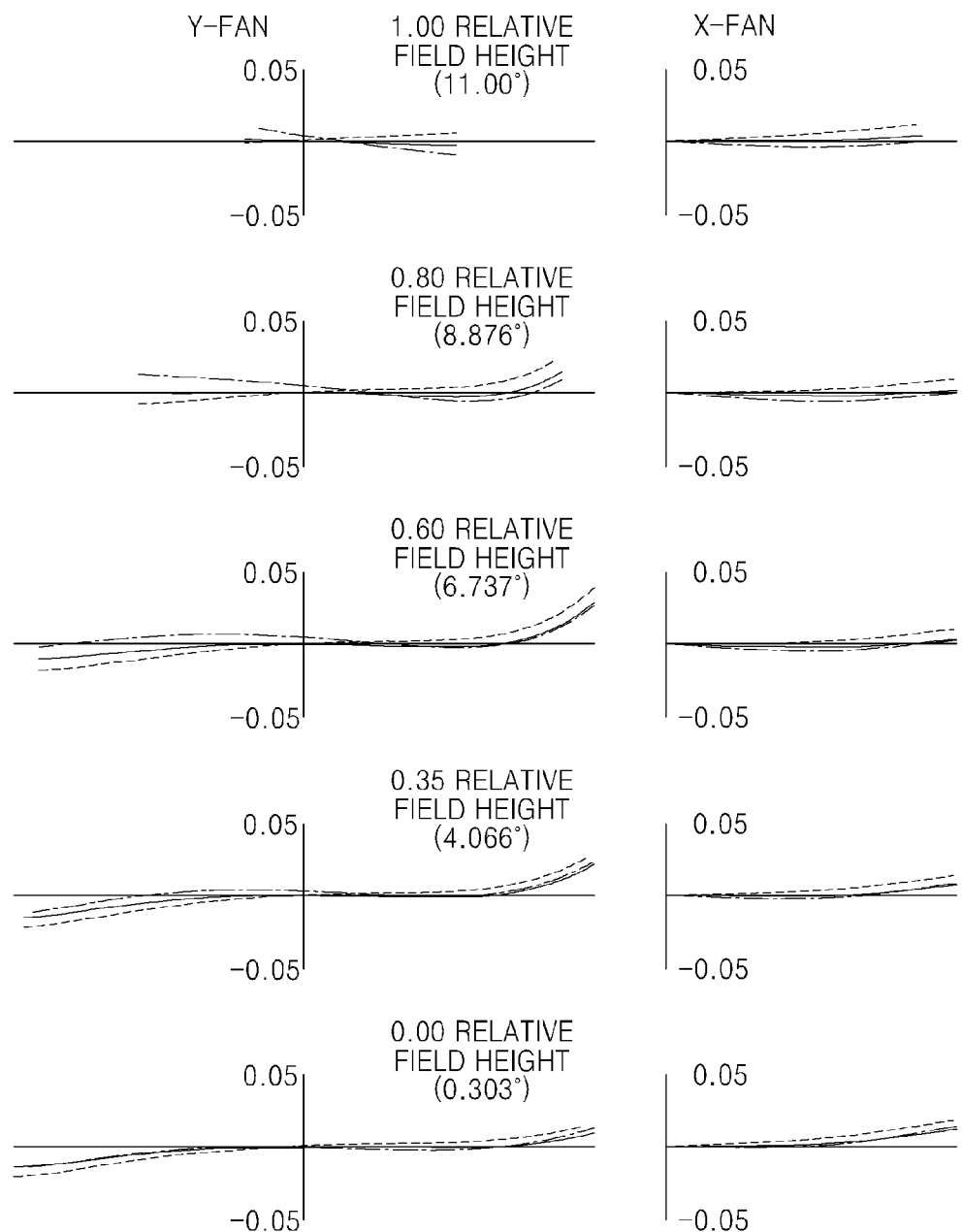
FIG. 11A is a diagram illustrating lateral aberration of the zoom lens system of FIG. 9 at the middle position, in which an image stabilization lens group moves vertically upward with respect to an optical axis.
Figure 11B:
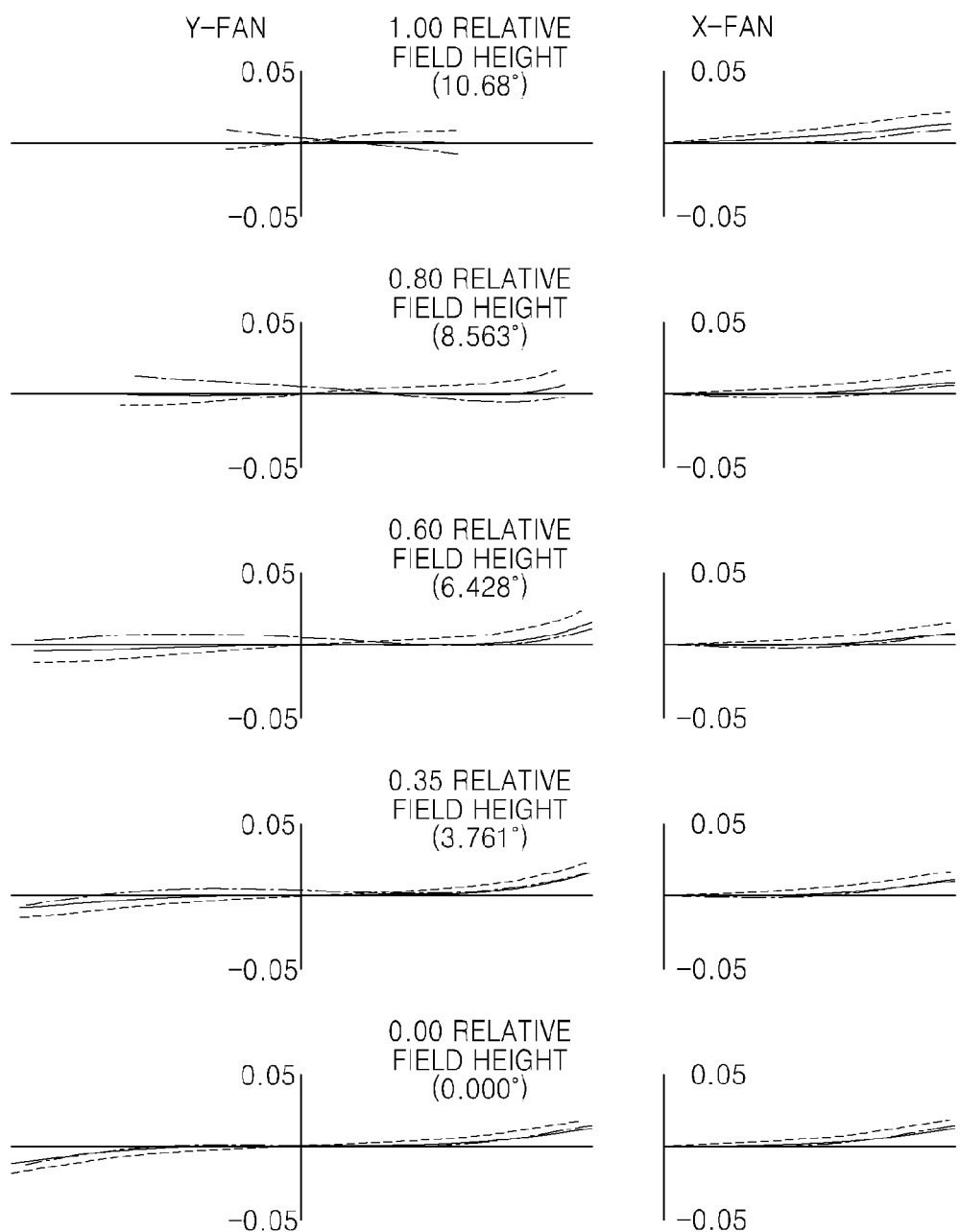
FIG. 11B is a diagram illustrating lateral aberration of the zoom lens system of FIG. 9 at the middle position, in which the image stabilization lens group is located on the optical axis.
Figure 11C:
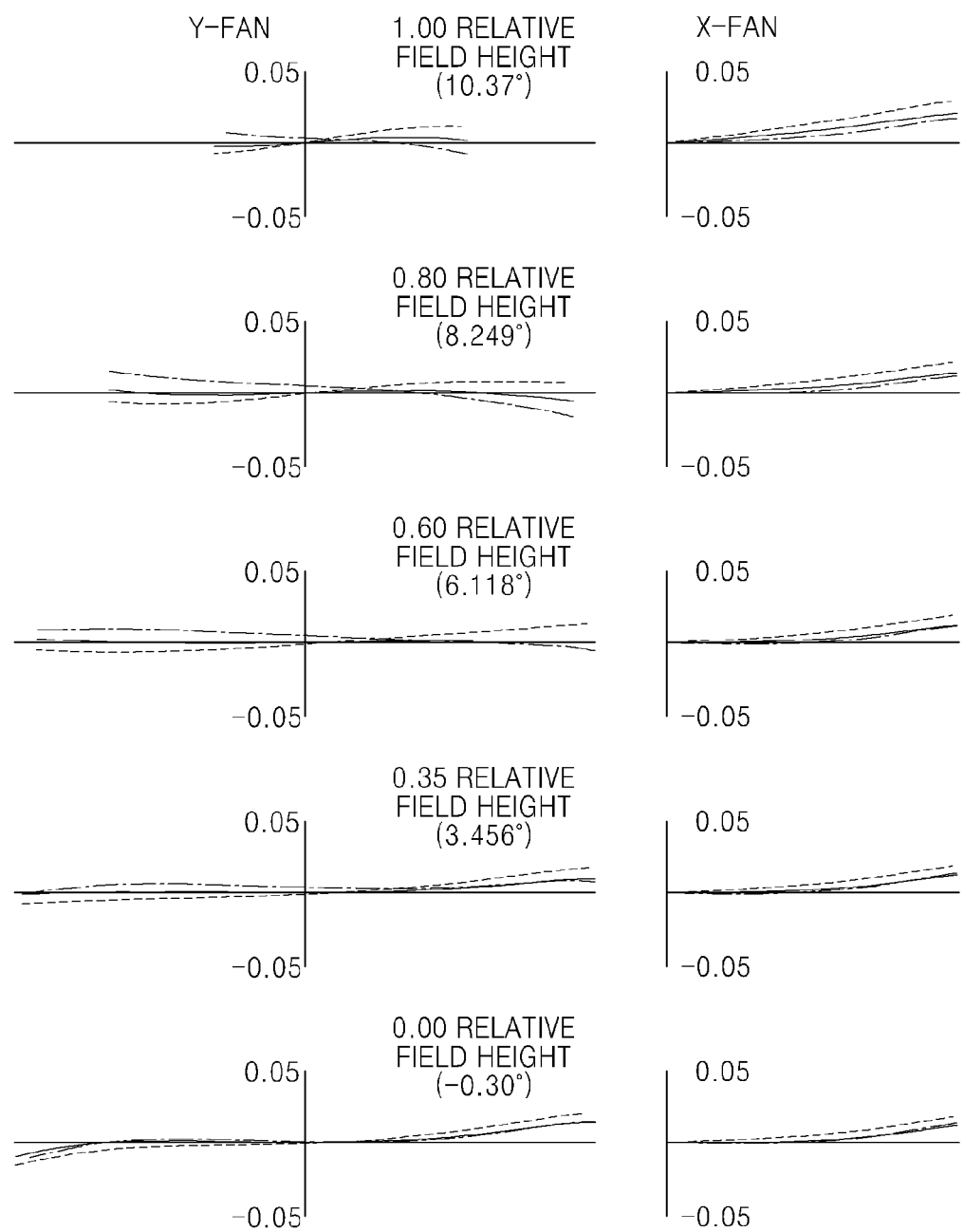
FIG. 11C is a diagram illustrating lateral aberration of the zoom lens system of FIG. 9 at the middle position, in which the image stabilization lens group moves vertically downward with respect to the optical axis.

FIGS. 11A to 11C are diagrams illustrating lateral aberration of the telephoto zoom lens system 100-3 at the middle position. FIG. 11A illustrates a case in which the second sub lens group G5-2 moves vertically upward by 0.33 mm with respect to the optical axis. FIG. 11B illustrates a case in which the second sub lens group G5-2 is located on the optical axis. FIG. 11C illustrates a case in which the second sub lens group G5-2 moves vertically downward by 0.33 mm with respect to the optical axis.

Figure 12A:
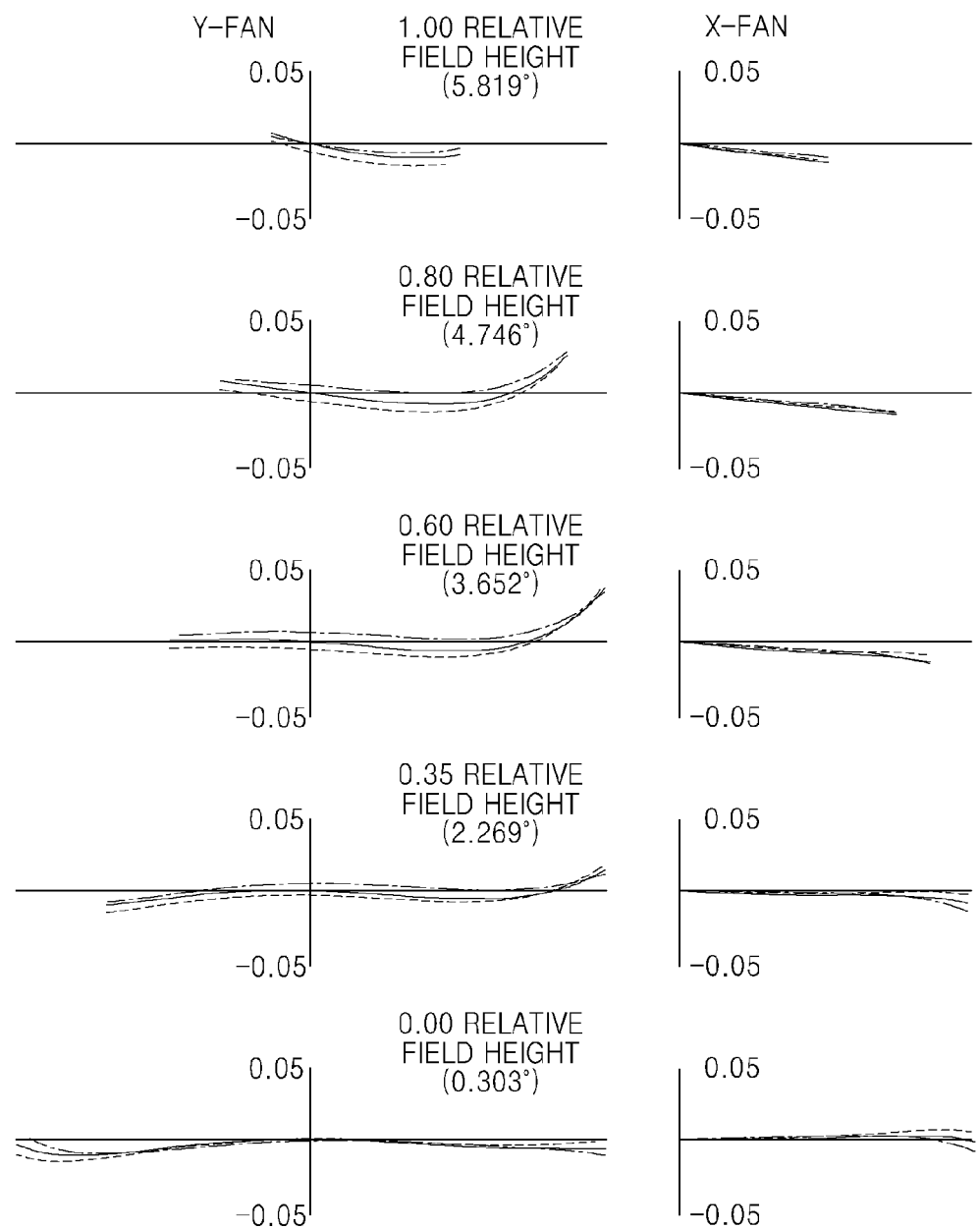
FIG. 12A is a diagram illustrating lateral aberration of the zoom lens system of FIG. 9 at the telephoto position, in which an image stabilization lens group moves vertically upward with respect to an optical axis.
Figure 12B:
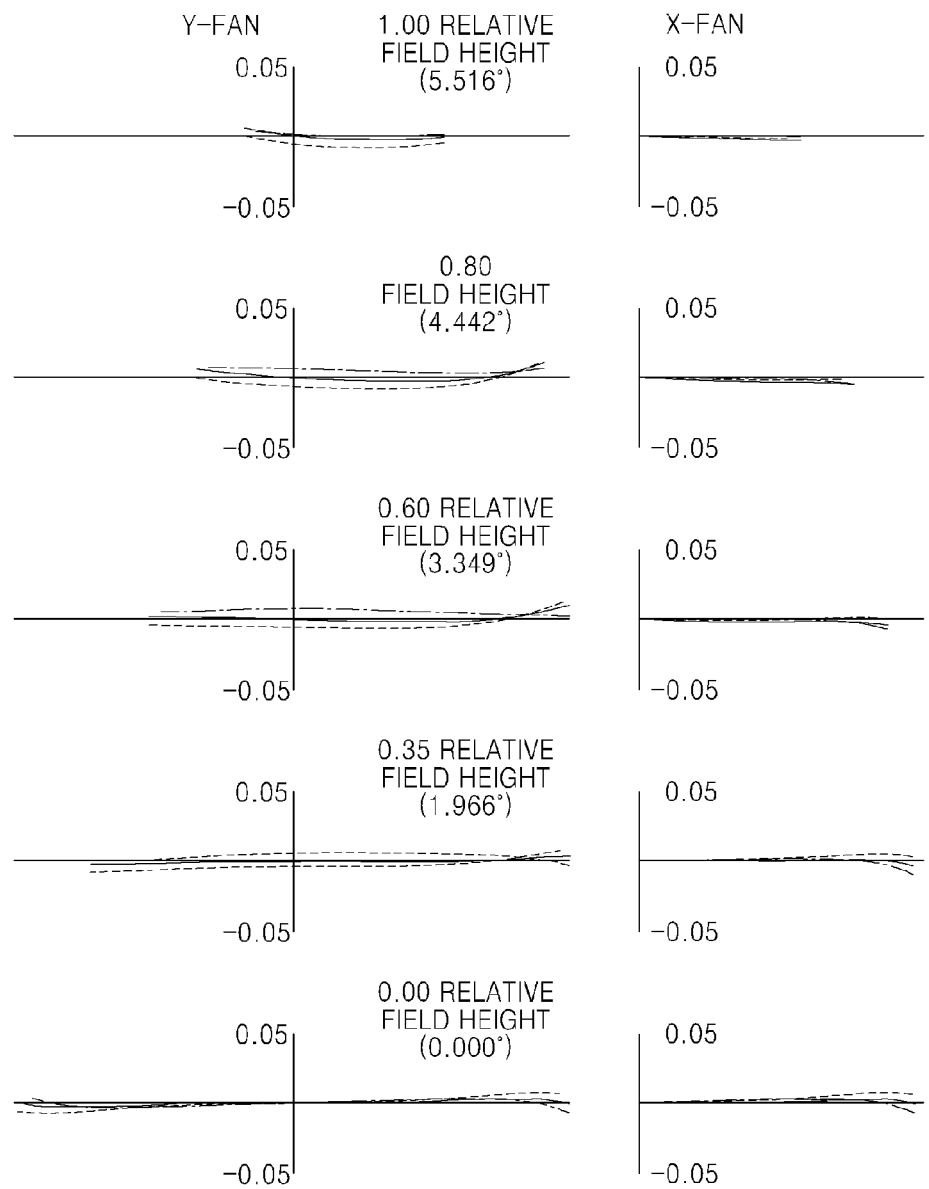
FIG. 12B is a diagram illustrating lateral aberration of the zoom lens system of FIG. 9 at the telephoto position, in which the image stabilization lens group is located on the optical axis.
Figure 12C:
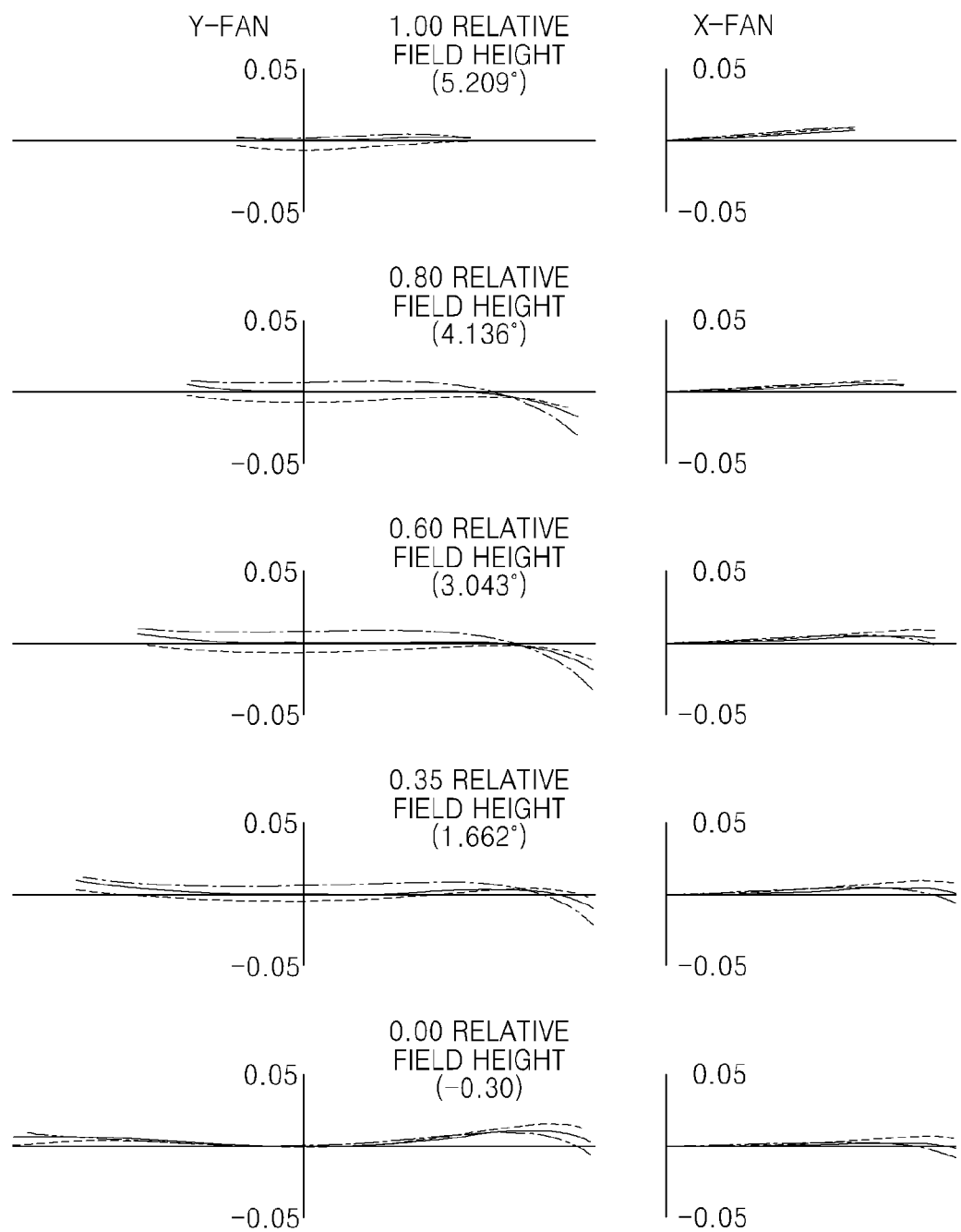
FIG. 12C is a diagram illustrating lateral aberration of the zoom lens system of FIG. 9 at the telephoto position, in which the image stabilization lens group moves vertically downward with respect to the optical axis.

FIGS. 12A to 12C are diagrams illustrating lateral aberration of the telephoto zoom lens system 100-3 at the telephoto position. FIG. 12A illustrates a case in which the second sub lens group G5-2 moves vertically upward by 0.63 mm with respect to the optical axis. FIG. 12B illustrates a case in which the second sub lens group G5-2 is located on the optical axis. FIG. 12C illustrates a case in which the second sub lens group G5-2 moves vertically downward by 0.63 mm with respect to the optical axis.

[Embodiment 4]

Figure 13:
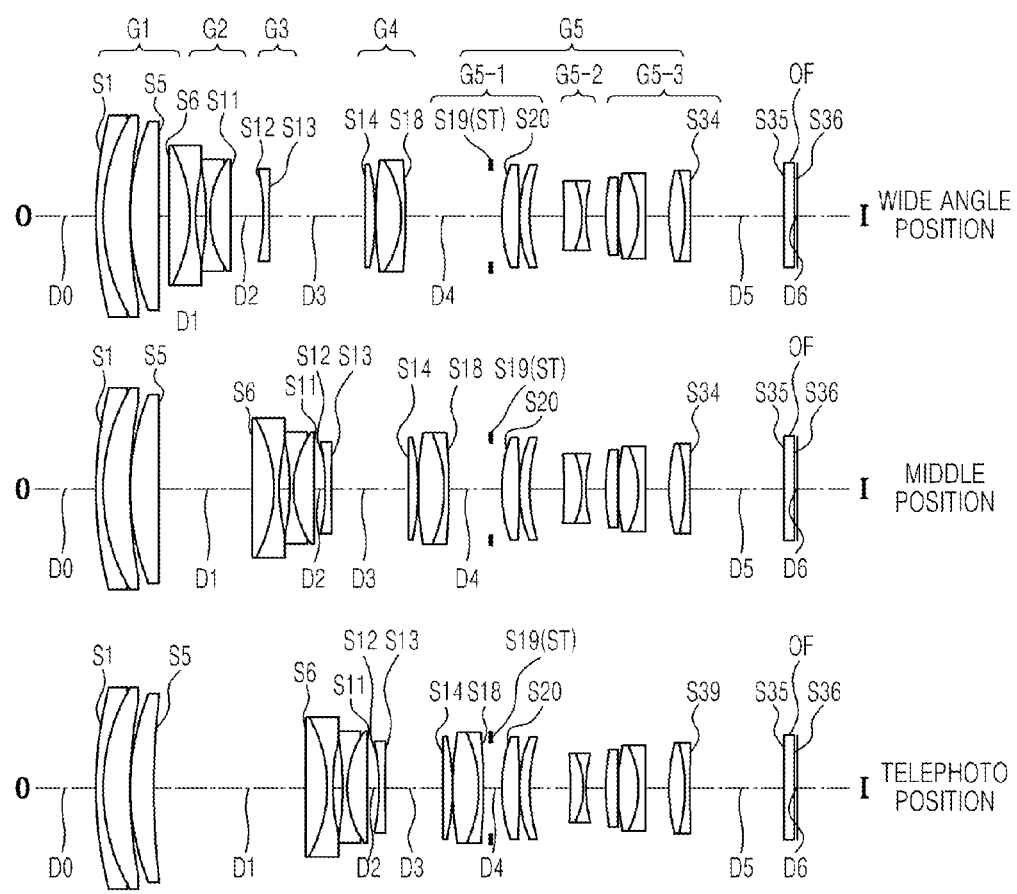
FIG. 13 is a diagram illustrating a telephoto zoom lens system at a wide-angle position, a middle position, and a telephoto position, according to another embodiment.

FIG. 13 illustrates a telephoto zoom lens system 100-4 at a wide-angle position, a middle position, and a telephoto position, respectively, according to another embodiment. Design data thereof will now be described as follows.

TABLE 7

| Surface of lens | R | Dn | Nd | vd | Note |
|---|---|---|---|---|---|
| obj | infinity | D0 | | | |
| S1 | 82.909 | 1.790 | 1.80518 | 25.46 | First lens group G1 |
| S2 | 52.181 | 8.180 | 1.49700 | 81.61 | |
| S3 | 791.130 | 0.100 | | | |
| S4 | 64.878 | 6.930 | 1.49700 | 81.61 | |
| S5 | infinity | D1 | | | |
| S6 | −1000.000 | 4.170 | 1.90366 | 31.31 | Second lens group |
| S7 | −41.887 | 1.500 | 1.74330 | 49.22 | |

TABLE 7-continued

| Surface of lens | R | Dn | Nd | vd | Note |
|---|---|---|---|---|---|
| S8 | 48.379 | 2.768 | | | G2 |
| S9 | −78.419 | 1.000 | 1.77250 | 49.62 | |
| S10 | 27.710 | 4.790 | 1.84666 | 23.78 | |
| S11 | 1000.000 | D2 | | | |
| S12 | −40.087 | 1.000 | 1.69680 | 55.46 | Third lens group G3 |
| S13 | 132.285 | D3 | | | |
| S14 | infinity | 3.000 | 1.77250 | 49.62 | Fourth lens group G4 |
| S15 | −54.560 | 0.100 | | | |
| S16 | 62.811 | 5.780 | 1.58913 | 61.25 | |
| S17 | −40.221 | 1.000 | 1.84666 | 23.78 | |
| S18 | −689.578 | D4 | | | |
| S19(ST) | infinity | 2.000 | | | First sub lens group G5-1 |
| S20 | 44.256 | 4.780 | 1.49700 | 81.61 | |
| S21 | −118.533 | 0.100 | | | |
| S22 | 35.481 | 3.500 | 1.77250 | 49.62 | |
| S23 | 44.458 | 15.232 | | | |
| S24 | −131.440 | 3.880 | 1.84666 | 23.78 | Second sub lens group G5-2 |
| S25 | −27.805 | 0.840 | 1.72342 | 37.99 | |
| S26 | 28.592 | 4.062 | | | |
| S27 | 56.267 | 3.290 | 1.76182 | 26.61 | Third sub lens group G5-3 |
| S28 | infinity | 0.100 | | | |
| S29 | 89.591 | 5.800 | 1.49700 | 81.61 | |
| S30 | −20.179 | 1.000 | 1.84666 | 23.78 | |
| S31 | infinity | 3.688 | | | |
| S32 | 58.620 | 4.200 | 1.84666 | 23.78 | |
| S33 | −58.620 | 1.280 | 1.77250 | 49.62 | |
| S34 | 496.812 | D5 | | | |
| S35 | infinity | 2.000 | 1.51680 | 64.20 | Filter OF |
| S36 | infinity | D6 | | | |
| img | infinity | 0.000 | | | |

In the present embodiment, when zooming, variable distances Dn, focal lengths, angles of view, F numbers, and overall lengths with respect to infinite object distances (infinity) and object distances of 822 mm at the wide-angle position, the middle position, and the telephoto position are shown, respectively, as follows.

TABLE 8

| Config | Wide-angle position | Middle position | Telephoto position | Wide-angle position | Middle position | Telephoto position |
|---|---|---|---|---|---|---|
| D0 | infinity | infinity | infinity | 822 | 822 | 822 |
| D1 | 2.000000 | 19.210424 | 36.420848 | 2.000000 | 19.210424 | 36.420848 |
| D2 | 7.480990 | 6.540927 | 11.821750 | 5.974155 | 3.600731 | 3.714281 |
| D3 | 17.035759 | 13.495115 | 3.574652 | 18.542594 | 16.435310 | 11.682121 |
| D4 | 26.300251 | 13.570535 | 0.999750 | 26.300251 | 13.570535 | 0.999750 |
| D5 | 26.323000 | 26.323000 | 26.323000 | 26.323000 | 26.323000 | 26.323000 |
| D6 | 1 | 1 | 1 | 1 | 1 | 1 |
| f | 51.460 | 76.488 | 145.498 | 0.058 | 0.080 | 0.124 |
| 2w | 15.95 | 10.63 | 5.52 | 16.01 | 10.91 | 6.38 |
| Fno | 2.84 | 2.87 | 2.90 | 2.84 | 2.87 | 2.90 |
| Overall length | 178 | 178 | 178 | 178 | 178 | 178 |

Figure 14A:
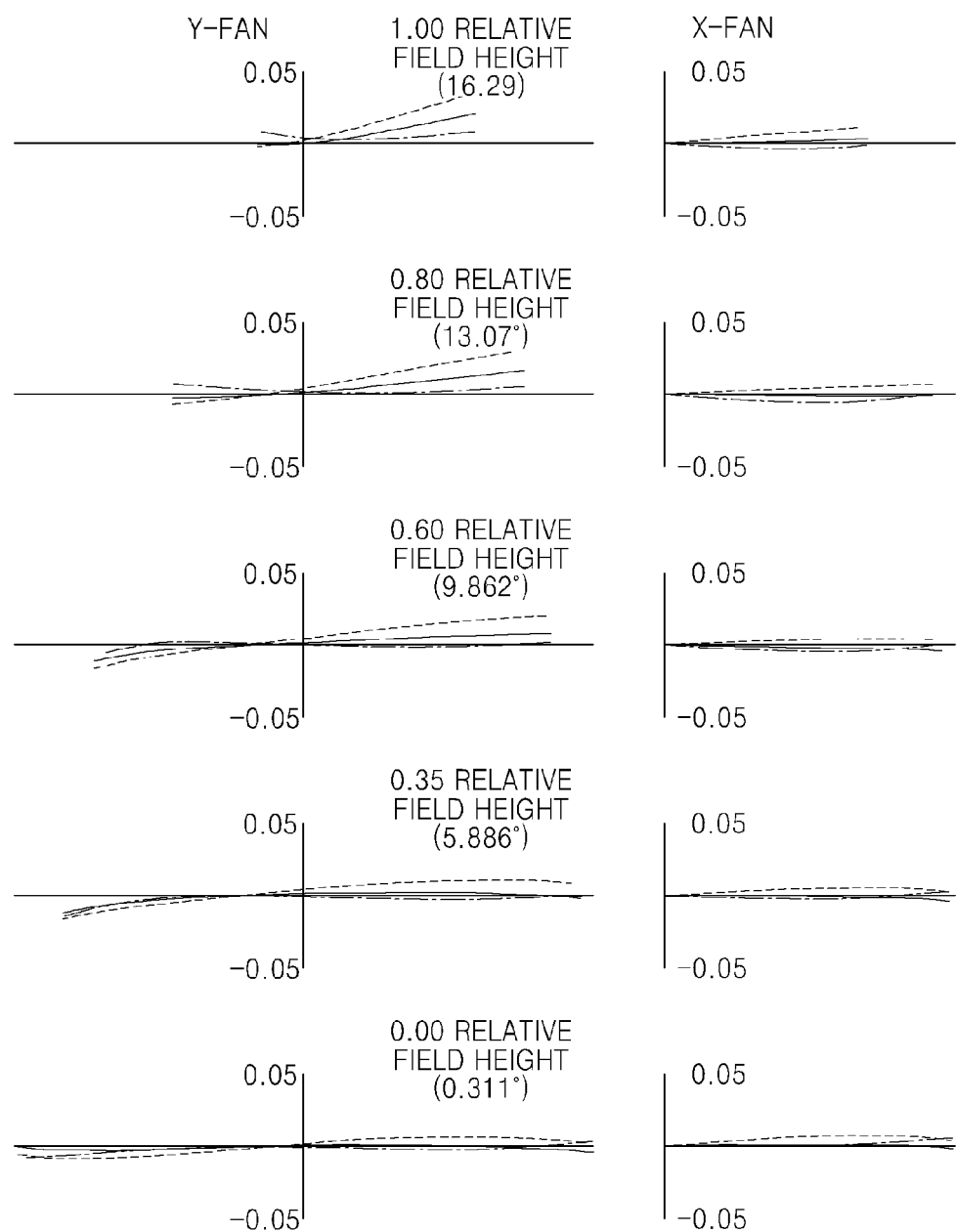
FIG. 14A is a diagram illustrating lateral aberration of the zoom lens system of FIG. 13 at the wide-angle position, in which an image stabilization lens group moves vertically upward with respect to an optical axis.
Figure 14B:
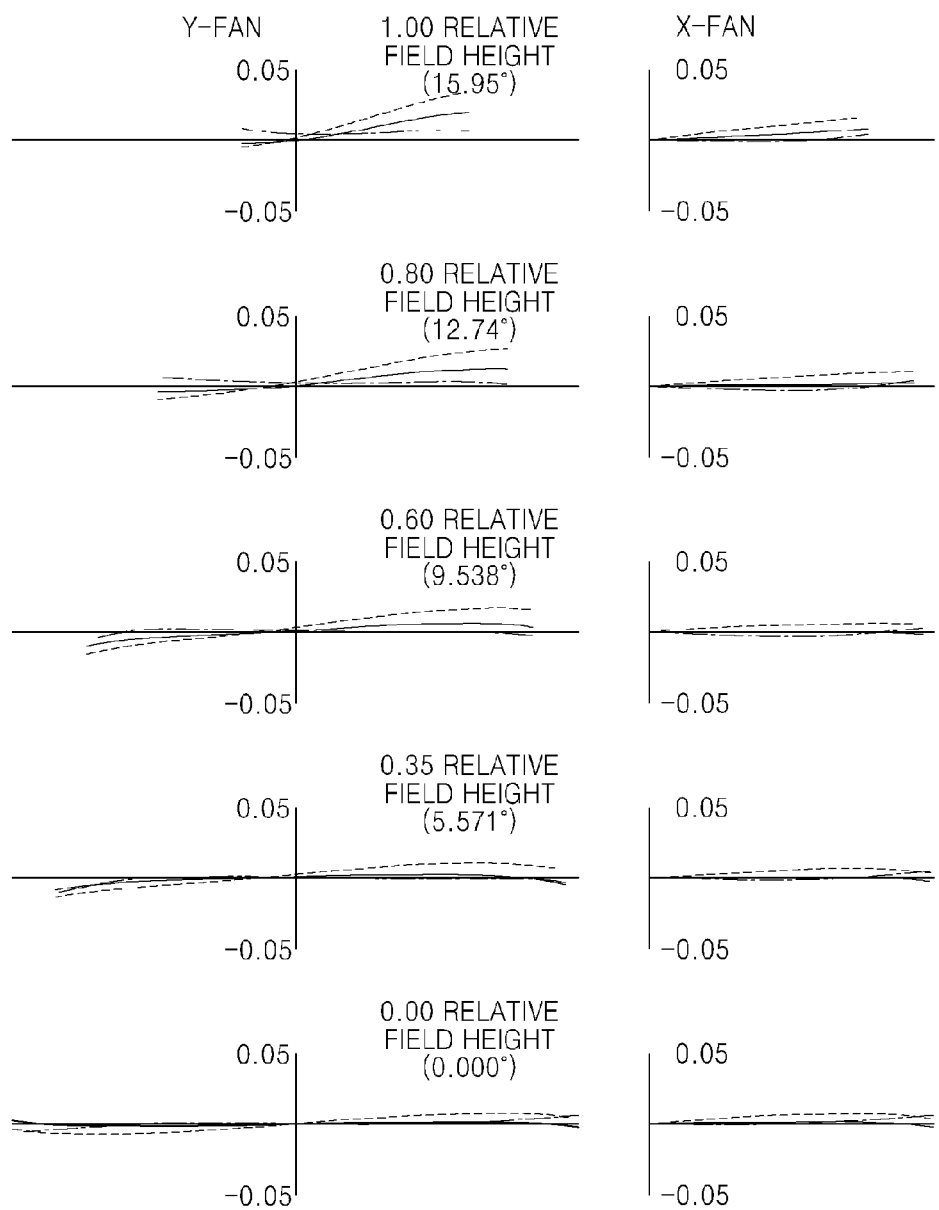
FIG. 14B is a diagram illustrating lateral aberration of the zoom lens system of FIG. 13 at the wide-angle position, in which the image stabilization lens group is located on the optical axis.
Figure 14C:
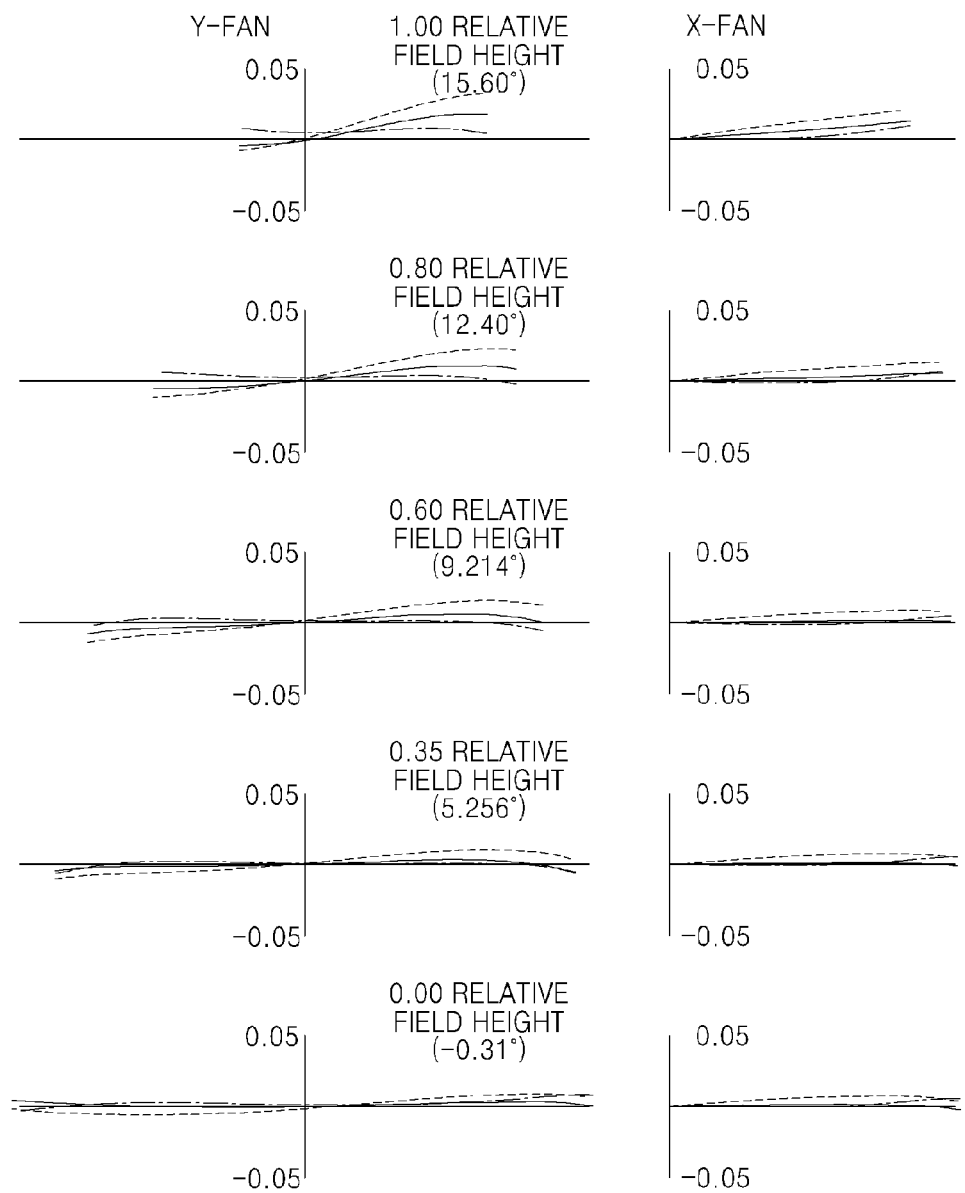
FIG. 14C is a diagram illustrating lateral aberration of the zoom lens system of FIG. 13 at the wide-angle position, in which the image stabilization lens group moves vertically downward with respect to the optical axis.

FIGS. 14A to 14C are diagrams illustrating lateral aberration of the telephoto zoom lens system 100-4 at the wide-angle position. FIG. 14A illustrates a case in which a second sub lens group G5-2, which is an image stabilization lens group, moves vertically upward by 0.24 mm with respect to an optical axis. FIG. 14B illustrates a case in which the second sub lens group G5-2 is located on the optical axis. FIG. 14C illustrates a case in which the second sub lens group G5-2 moves vertically downward by 0.24 mm with respect to the optical axis.

Figure 15A:
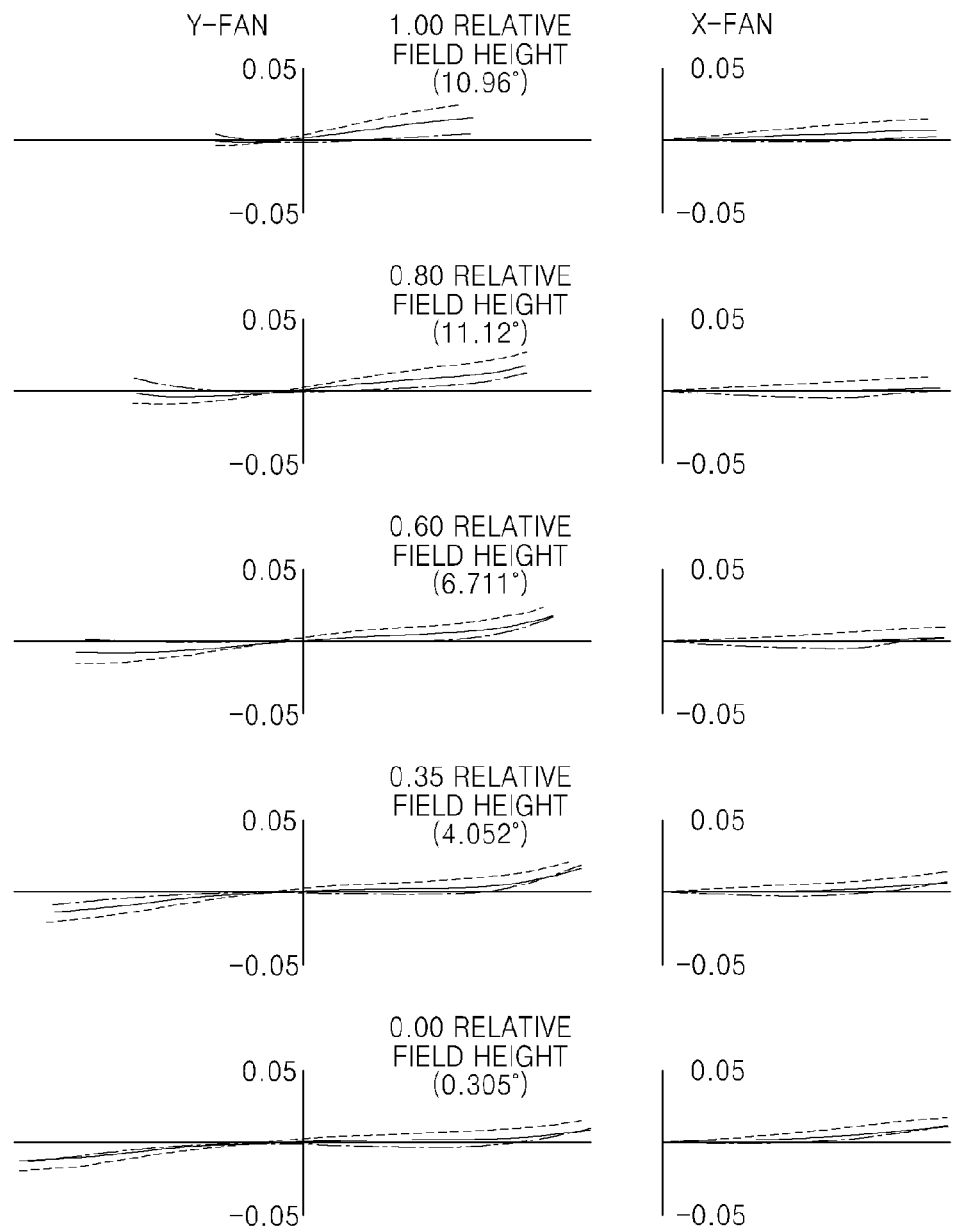
FIG. 15A is a diagram illustrating lateral aberration of the zoom lens system of FIG. 13 at the middle position, in which an image stabilization lens group moves vertically upward with respect to an optical axis.
Figure 15B:
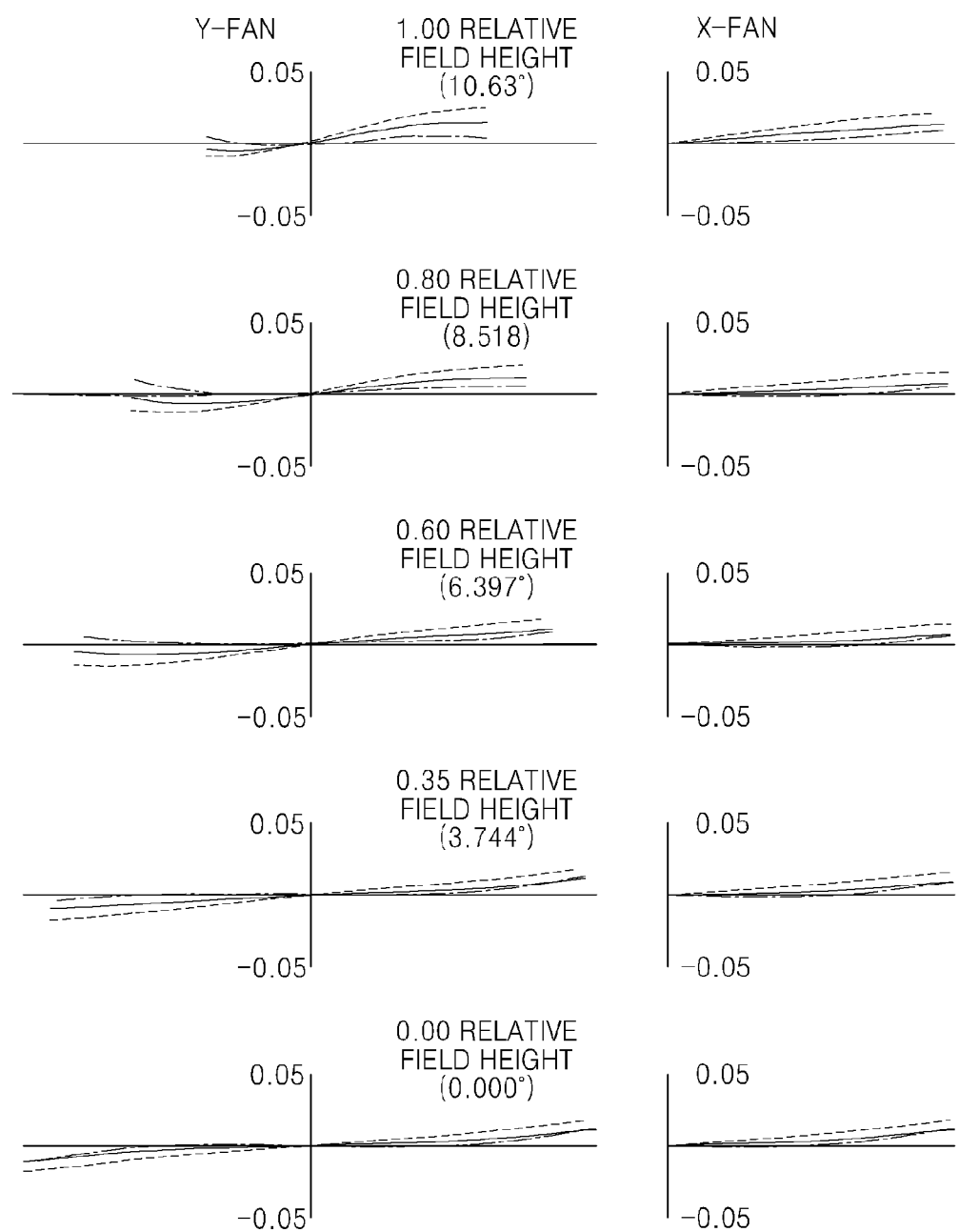
FIG. 15B is a diagram illustrating lateral aberration of the zoom lens system of FIG. 13 at the middle position, in which the image stabilization lens group is located on the optical axis.
Figure 15C:
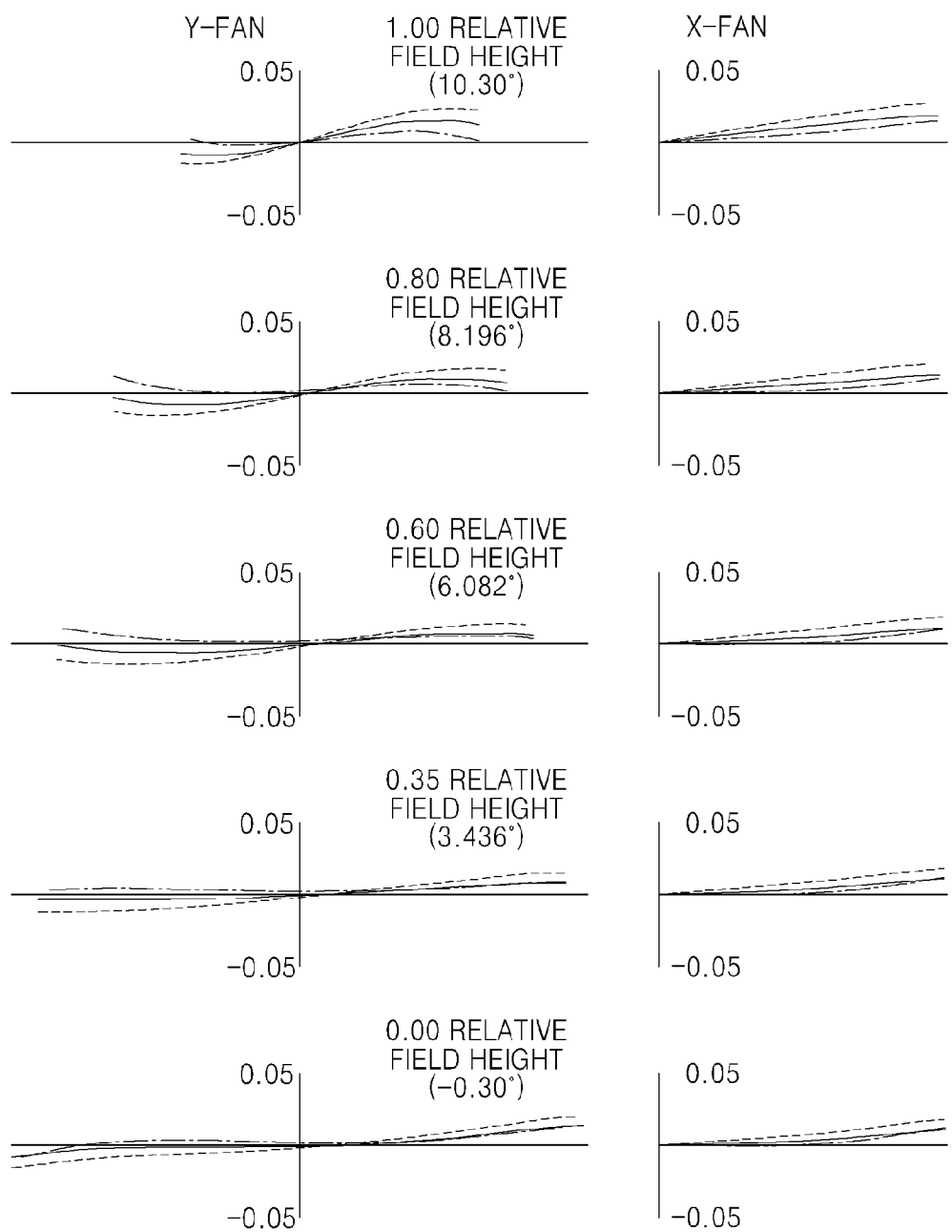
FIG. 15C is a diagram illustrating lateral aberration of the zoom lens system of FIG. 13 at the middle position, in which the image stabilization lens group moves vertically downward with respect to the optical axis.

FIGS. 15A to 15C are diagrams illustrating lateral aberration of the telephoto zoom lens system 100-4 at the middle position. FIG. 15A illustrates a case in which the second sub lens group G5-2 moves vertically upward by 0.35 mm with respect to the optical axis. FIG. 15B illustrates a case in which the second sub lens group G5-2 is located on the optical axis. FIG. 15C illustrates a case in which the second sub lens group G5-2 moves vertically downward by 0.35 mm with respect to the optical axis.

Figure 16A:
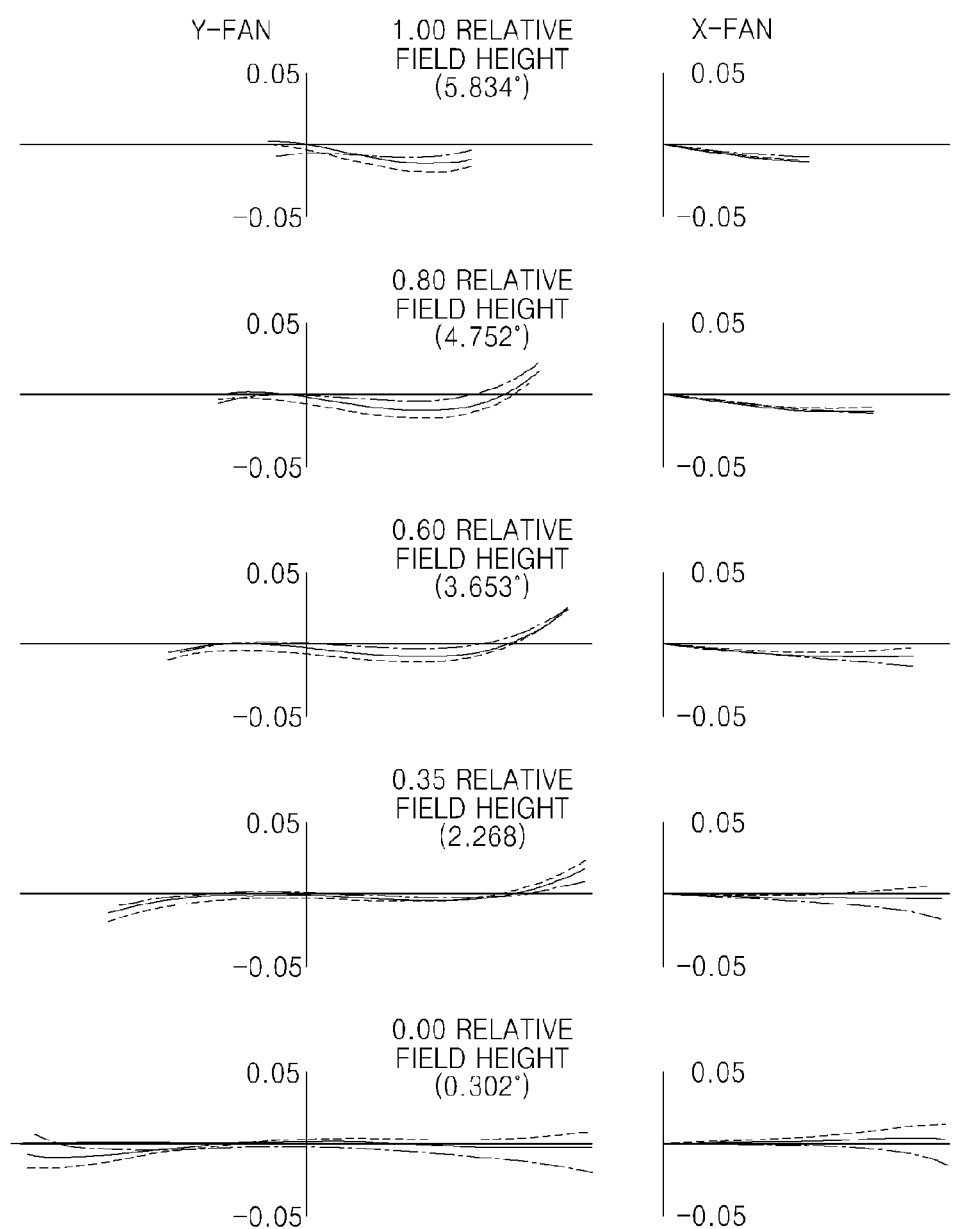
FIG. 16A is a diagram illustrating lateral aberration of the zoom lens system of FIG. 13 at the telephoto position, in which an image stabilization lens group moves vertically upward with respect to an optical axis.
Figure 16B:
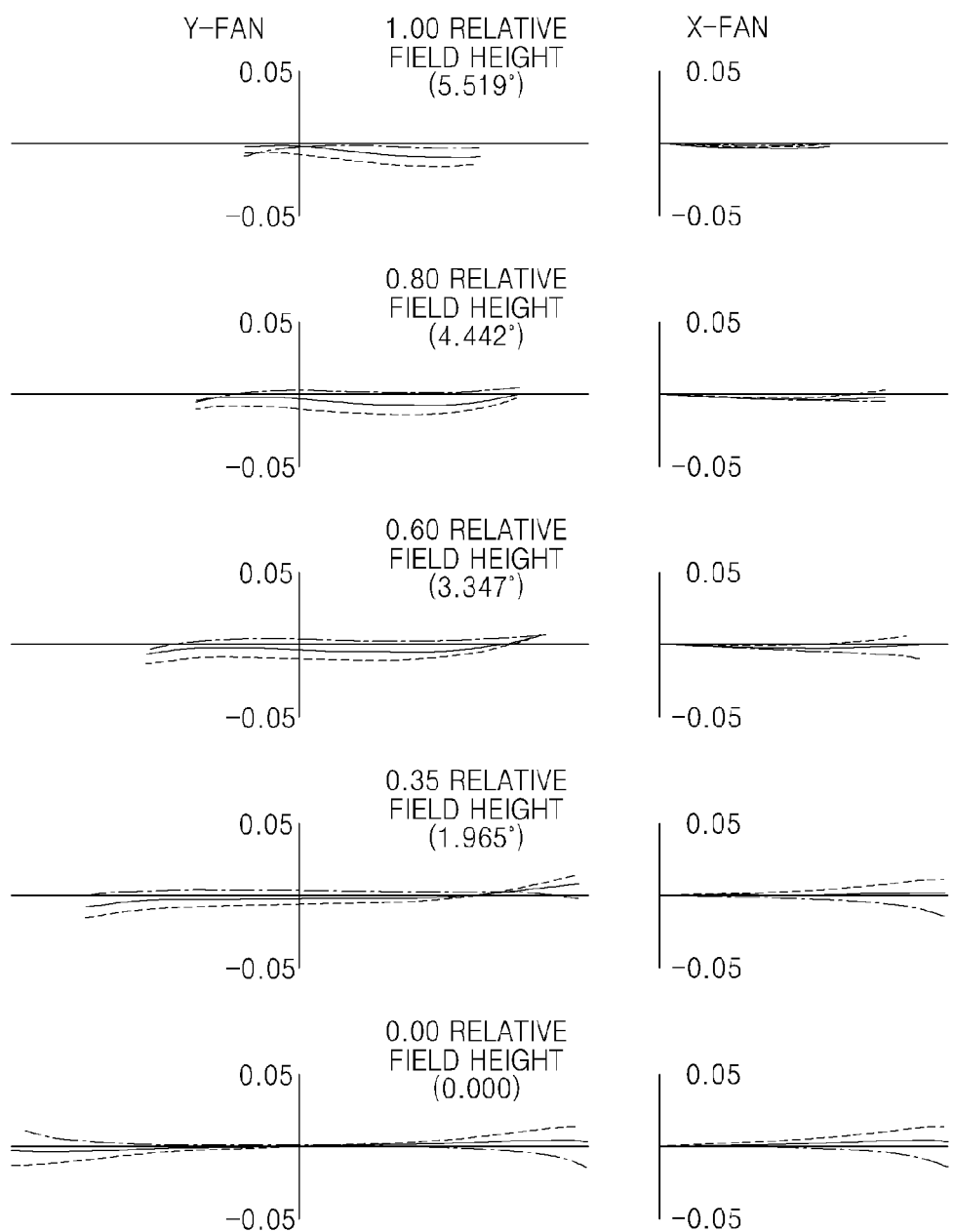
FIG. 16B is a diagram illustrating lateral aberration of the zoom lens system of FIG. 13 at the telephoto position, in which the image stabilization lens group is located on the optical axis.
Figure 16C:
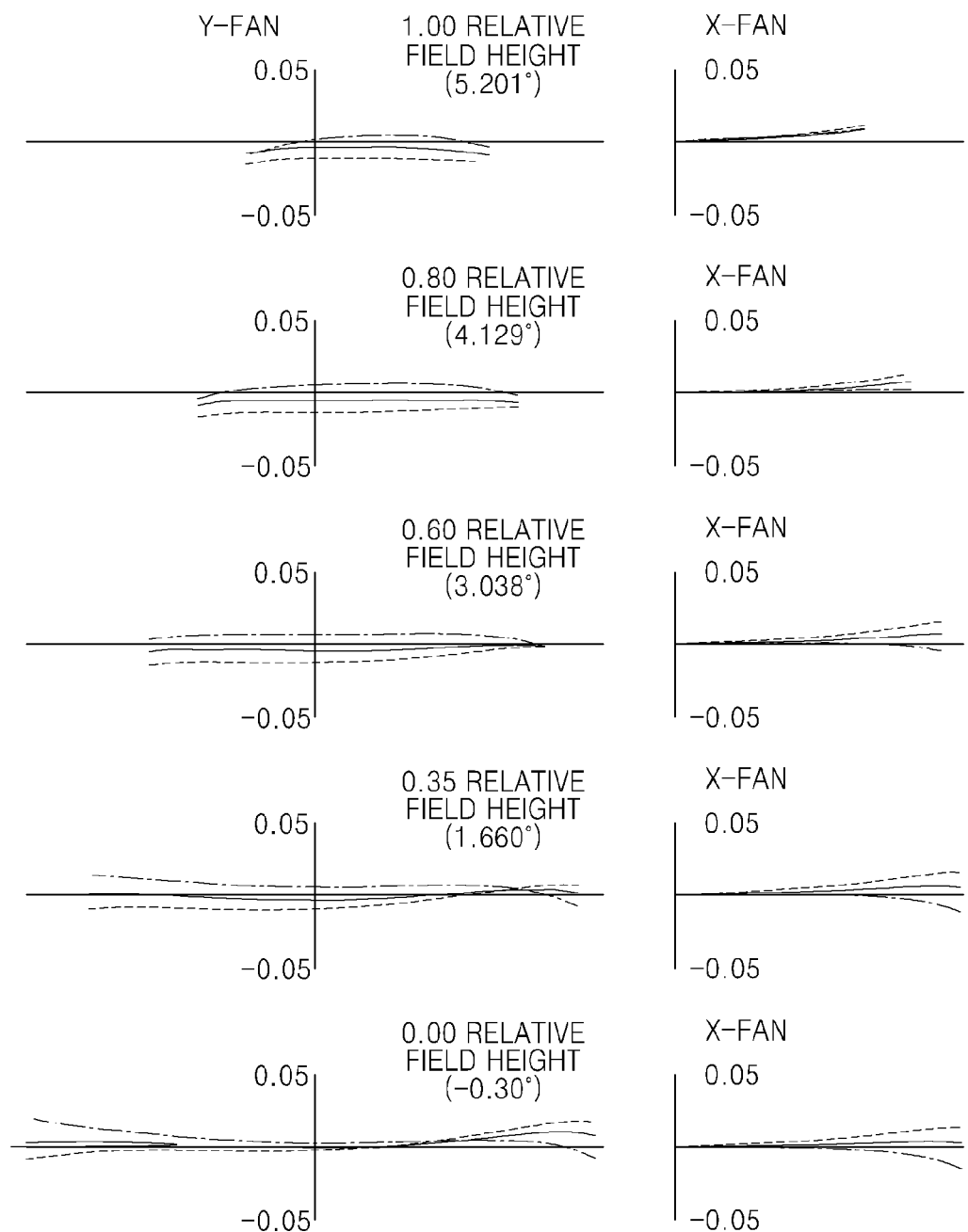
FIG. 16C is a diagram illustrating lateral aberration of the zoom lens system of FIG. 13 at the telephoto position, in which the image stabilization lens group moves vertically downward with respect to the optical axis.

FIGS. 16A to 16C are diagrams illustrating lateral aberration of the telephoto zoom lens system 100-4 at the telephoto position. FIG. 16A illustrates a case in which the second sub lens group G5-2 moves vertically upward by 0.66 mm with respect to the optical axis. FIG. 16B illustrates a case in which the second sub lens group G5-2 is located on the optical axis. FIG. 16C illustrates a case in which the second sub lens group G5-2 moves vertically downward by 0.66 mm with respect to the optical axis.

[Embodiment 5]

FIG. 17 illustrates a telephoto zoom lens system 100-5 at a wide-angle position, a middle position, and a telephoto position, respectively, according to another embodiment. Design data thereof will now be described as follows.

TABLE 9

| Surface of lens | R | Dn | Nd | vd | Note |
|---|---|---|---|---|---|
| obj | infinity | D0 | | | |
| S1 | 99.290 | 1.800 | 1.80518 | 25.46 | First lens |
| S2 | 51.806 | 8.500 | 1.49700 | 81.61 | group G1 |
| S3 | 1000.000 | 0.100 | | | |
| S4 | 61.882 | 7.230 | 1.61800 | 63.39 | |
| S5 | infinity | D1 | | | |
| S6 | −1000.000 | 4.060 | 1.90366 | 31.31 | Second |
| S7 | −43.708 | 1.500 | 1.74330 | 49.22 | lens group |
| S8 | 53.017 | 2.446 | | | G2 |
| S9 | −113.796 | 1.300 | 1.77250 | 49.62 | |
| S10 | 23.696 | 5.000 | 1.84666 | 23.78 | |
| S11 | 141.786 | D2 | | | |
| S12 | −40.000 | 1.000 | 1.69680 | 55.46 | Third lens |
| S13 | 114.513 | D3 | | | group G3 |

TABLE 9-continued

| Surface of lens | R | Dn | Nd | vd | Note |
|---|---|---|---|---|---|
| S14 | infinity | 3.000 | 1.77250 | 49.62 | Fourth lens |
| S15 | −62.941 | 0.100 | | | group G4 |
| S16 | 64.631 | 6.020 | 1.58913 | 61.25 | |
| S17 | −36.408 | 1.300 | 1.84666 | 23.78 | |
| S18 | −196.199 | D4 | | | |
| S19(ST) | infinity | 2.000 | | | |
| S20 | 44.428 | 4.780 | 1.49700 | 81.61 | Fifth lens |
| S21 | −113.060 | 0.100 | | | group G5 |
| S22 | 35.352 | 3.500 | 1.77250 | 49.62 | |
| S23 | 40.790 | D5 | | | |
| S24 | −140.850 | 2.700 | 1.84666 | 23.78 | First sub |
| S25 | −28.045 | 0.800 | 1.72342 | 37.99 | lens group |
| S26 | 28.045 | 3.027 | | | G6-1 |
| S27 | 51.806 | 3.290 | 1.76182 | 26.61 | Second |
| S28 | infinity | 0.100 | | | sub lens |
| S29 | 82.335 | 5.800 | 1.49700 | 81.61 | group G6-2 |
| S30 | −20.505 | 1.000 | 1.84666 | 23.78 | |
| S31 | infinity | 2.021 | | | |
| S32 | 58.168 | 4.200 | 1.84666 | 23.78 | |
| S33 | −58.168 | 1.200 | 1.74400 | 44.90 | |
| S34 | 248.572 | D6 | | | |
| S35 | infinity | 2.000 | 1.51680 | 64.20 | Filter OF |
| S36 | infinity | D7 | | | |
| img | infinity | 0.000 | | | |

In the present embodiment, when zooming, variable distances Dn, focal lengths, angles of view, F numbers, and overall lengths with respect to an infinite object distance and an object distance of 823 mm at the wide-angle position, the middle position, and the telephoto position are shown, respectively, as follows.

TABLE 10

| Config | Wide-angle position | Middle position | Telephoto position | Wide-angle position | Middle position | Telephoto position |
|---|---|---|---|---|---|---|
| D0 | infinity | infinity | infinity | 823 | 823 | 823 |
| D1 | 2.000000 | 17.493831 | 32.987661 | 2.000000 | 17.493831 | 32.987661 |
| D2 | 7.333526 | 6.830669 | 12.843617 | 5.842206 | 3.933658 | 4.750677 |
| D3 | 17.878870 | 14.032617 | 3.670559 | 19.370190 | 16.929629 | 11.763499 |
| D4 | 23.610714 | 12.334585 | 1.124376 | 23.610714 | 12.334585 | 1.124376 |
| D5 | 15.187889 | 15.319298 | 15.384787 | 15.187889 | 15.319298 | 15.384787 |
| D6 | 30.115000 | 30.115000 | 30.115000 | 30.115000 | 30.115000 | 30.115000 |
| D7 | 1 | 1 | 1 | 1 | 1 | 1 |
| f | 51.499 | 76.273 | 145.442 | 0.058 | 0.080 | 0.124 |
| 2w | 15.47 | 10.58 | 5.60 | 15.54 | 10.82 | 6.42 |
| Fno | 2.88 | 2.89 | 2.90 | 2.88 | 2.89 | 2.90 |
| Overall length | 177 | 177 | 177 | 177 | 177 | 177 |

Figure 18A:
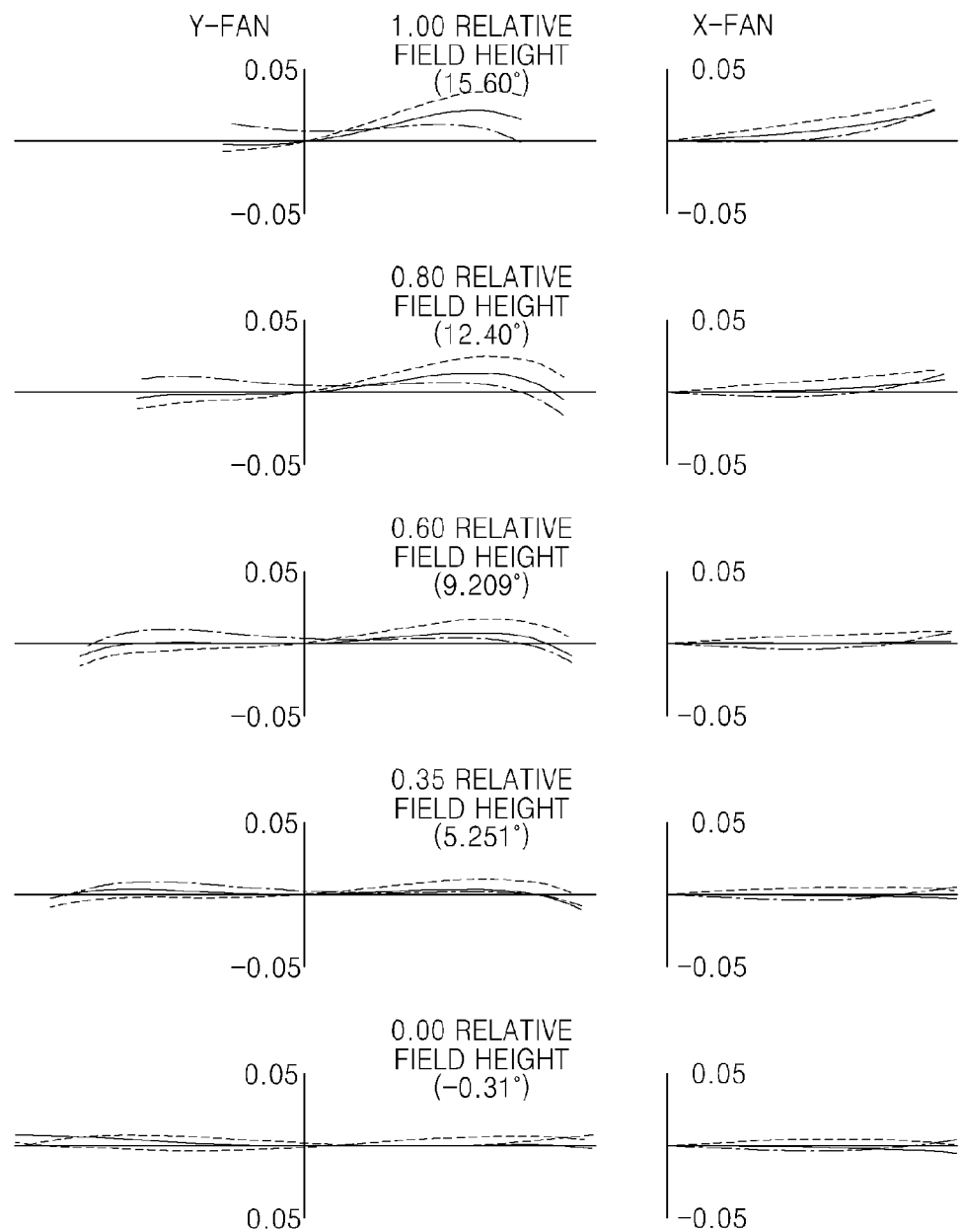
FIG. 18A is a diagram illustrating lateral aberration of the zoom lens system of FIG. 17 at the wide-angle position, in which an image stabilization lens group moves vertically upward with respect to an optical axis.
Figure 18B:
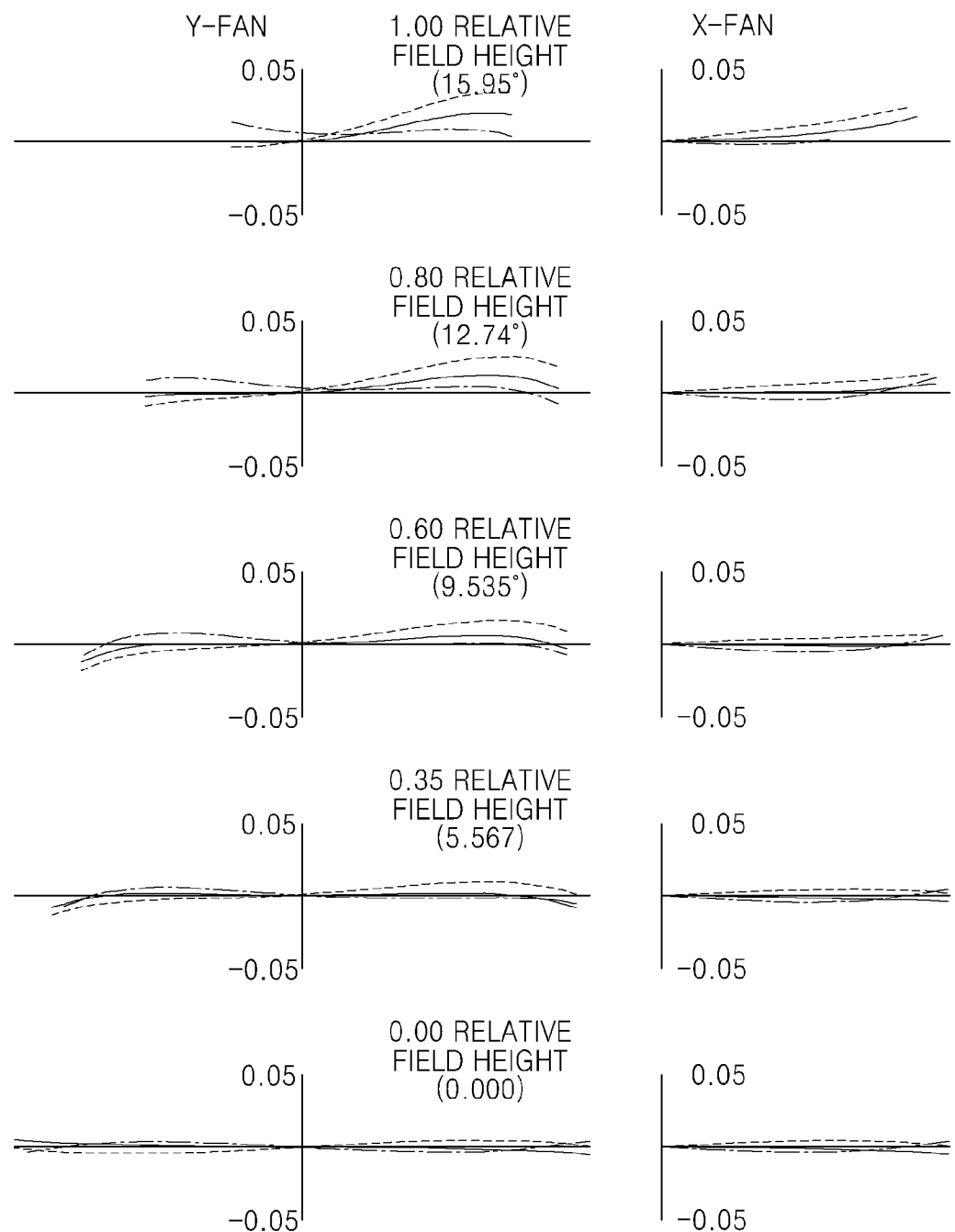
FIG. 18B is a diagram illustrating lateral aberration of the zoom lens system of FIG. 17 at the wide-angle position, in which the image stabilization lens group is located on the optical axis.
Figure 18C:
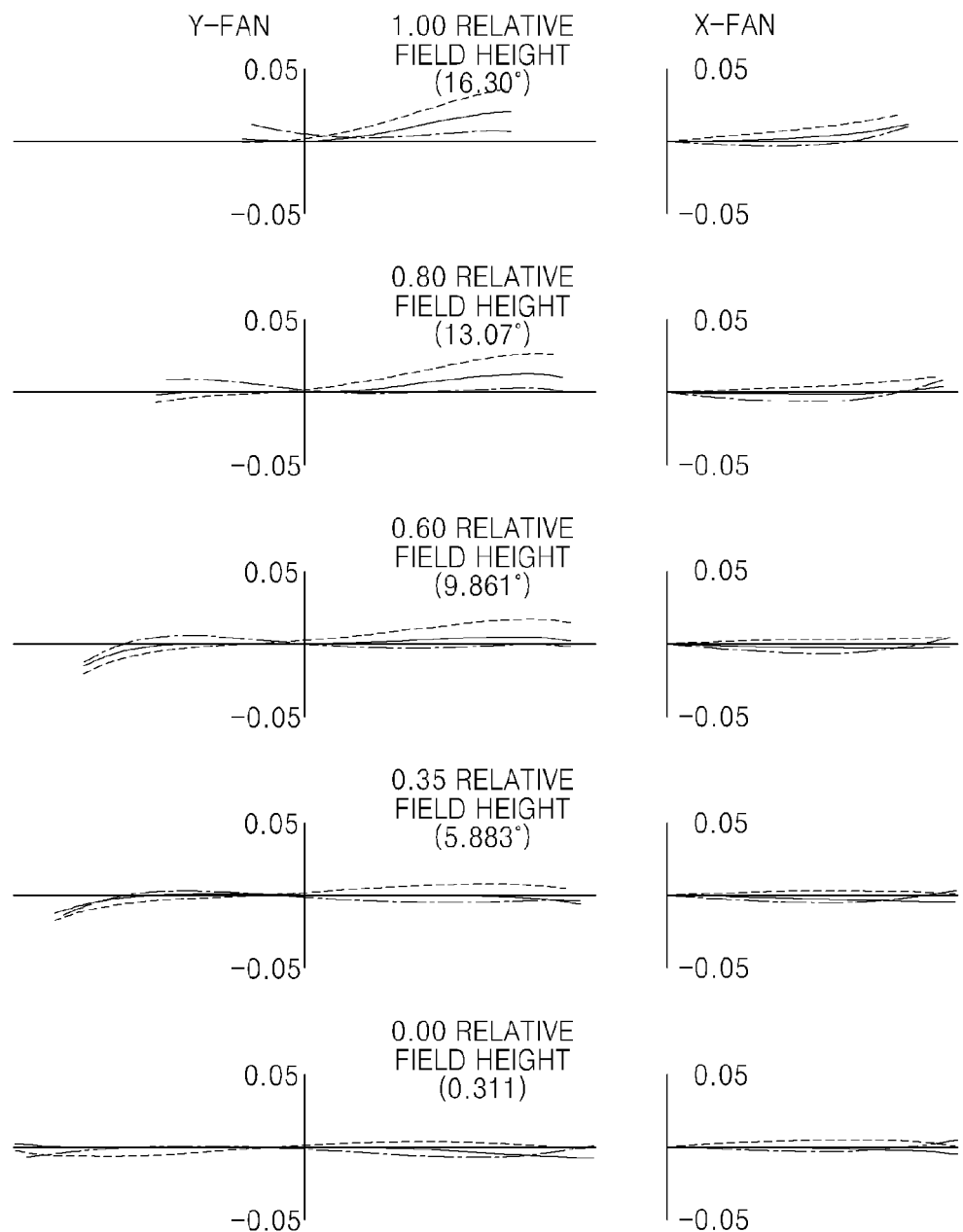
FIG. 18C is a diagram illustrating lateral aberration of the zoom lens system of FIG. 17 at the wide-angle position, in which the image stabilization lens group moves vertically downward with respect to the optical axis.

FIGS. 18A to 18C are diagrams illustrating lateral aberration of the telephoto zoom lens system 100-5 at the wide-angle position. FIG. 18A illustrates a case in which a first sub lens group G6-1, which is an image stabilization lens group, moves vertically upward by 0.23 mm with respect to the optical axis. FIG. 18B illustrates a case in which the first sub lens group G6-1 is located on the optical axis. FIG. 18C illustrates a case in which the first sub lens group G6-1 moves vertically downward by 0.23 mm with respect to the optical axis.

Figure 19A:
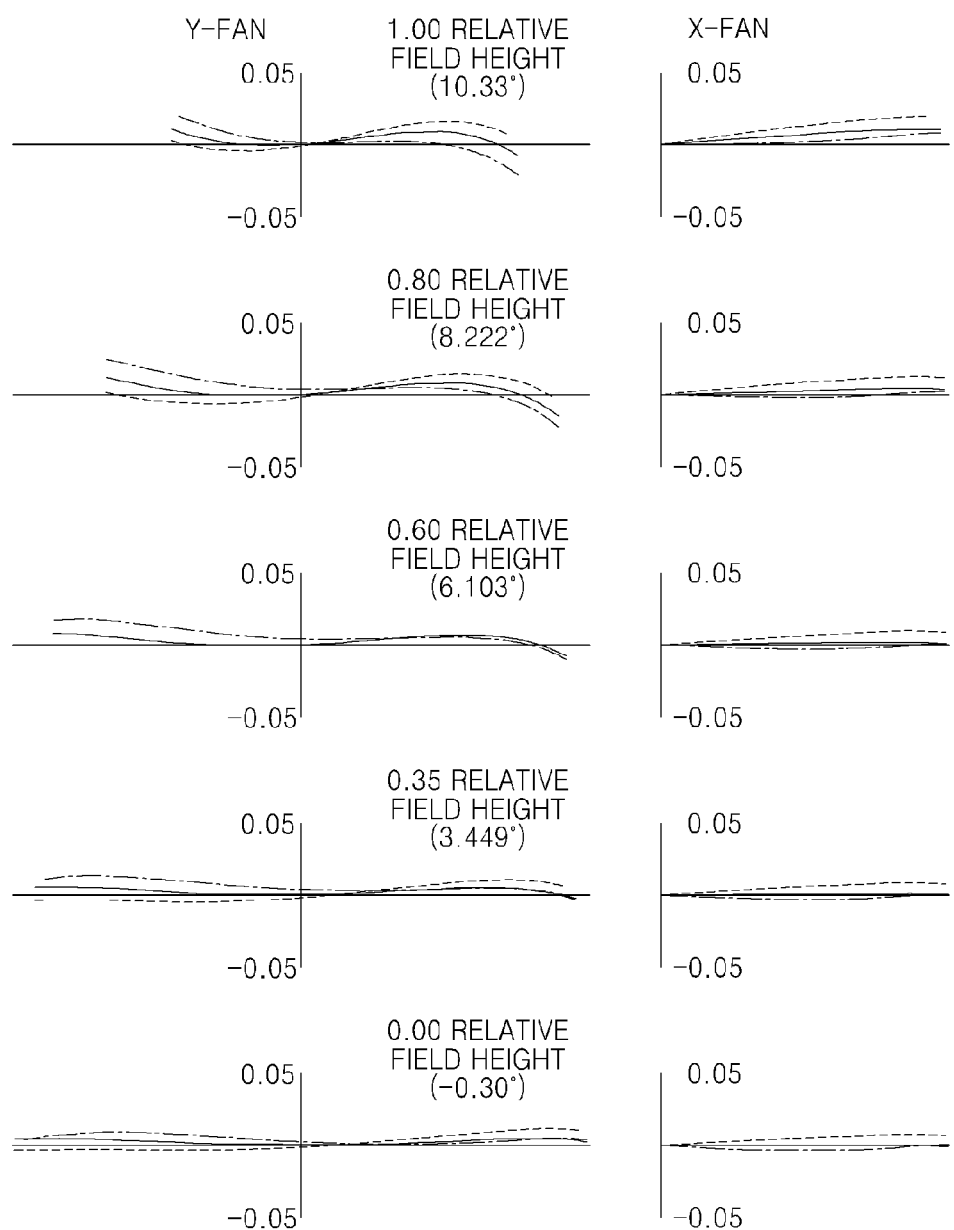
FIG. 19A is a diagram illustrating lateral aberration of the zoom lens system of FIG. 17 at the middle position, in which an image stabilization lens group moves vertically upward with respect to an optical axis.
Figure 19B:
FIG. 19B is a diagram illustrating lateral aberration of the zoom lens system of FIG. 17 at the middle position, in which the image stabilization lens group is located on the optical axis.
Figure 19C:
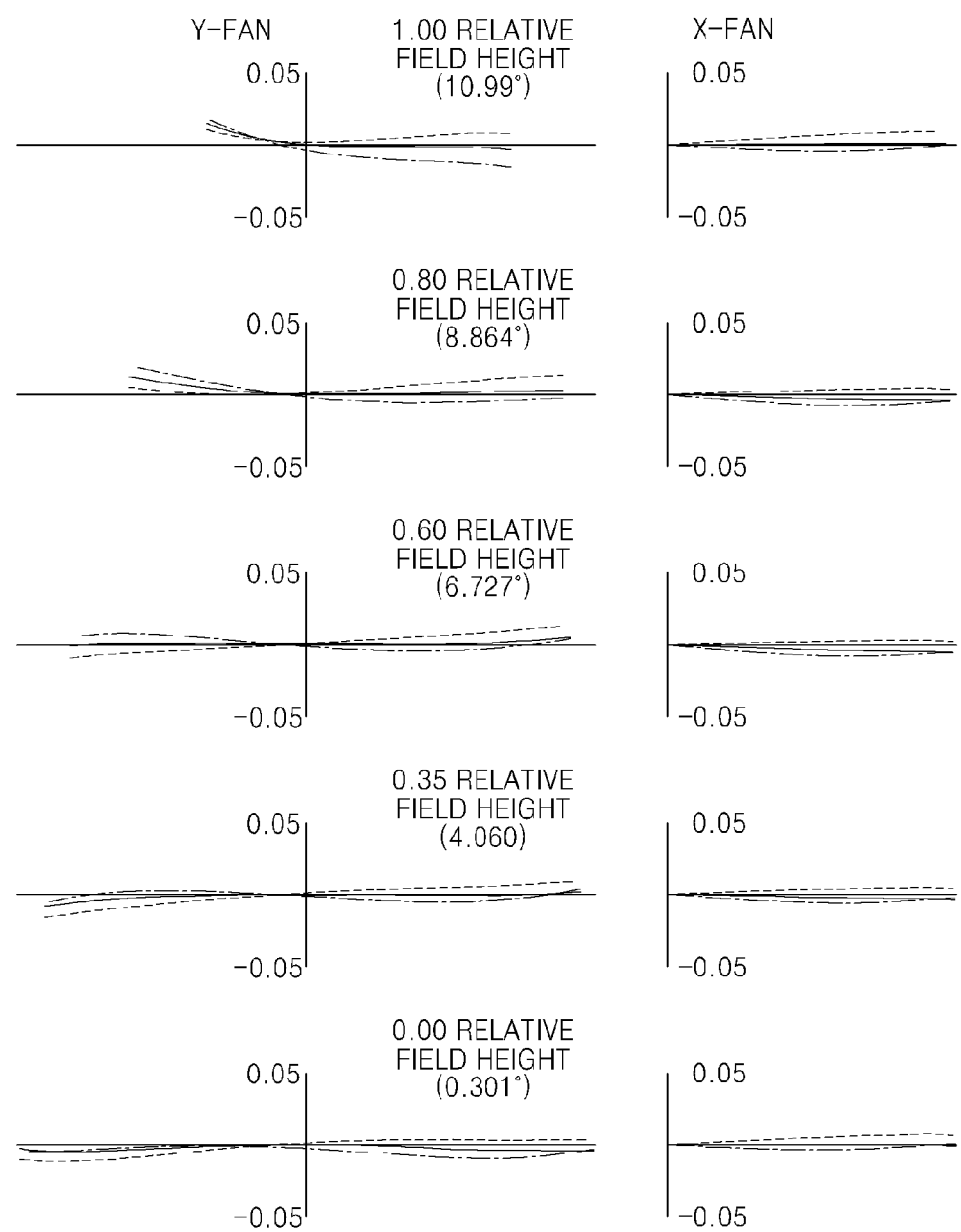
FIG. 19C is a diagram illustrating lateral aberration of the zoom lens system of FIG. 17 at the middle position, in which the image stabilization lens group moves vertically downward with respect to the optical axis.

FIGS. 19A to 19C are diagrams illustrating lateral aberration of the telephoto zoom lens system 100-5 at the middle position. FIG. 19A illustrates a case in which the first sub lens group G6-1 moves vertically upward by 0.33 mm with respect to the optical axis. FIG. 19B illustrates a case in which the first sub lens group G6-1 is located on the optical axis. FIG. 19C illustrates a case in which the first sub lens group G6-1 moves vertically downward by 0.33 mm with respect to the optical axis.

Figure 20A:
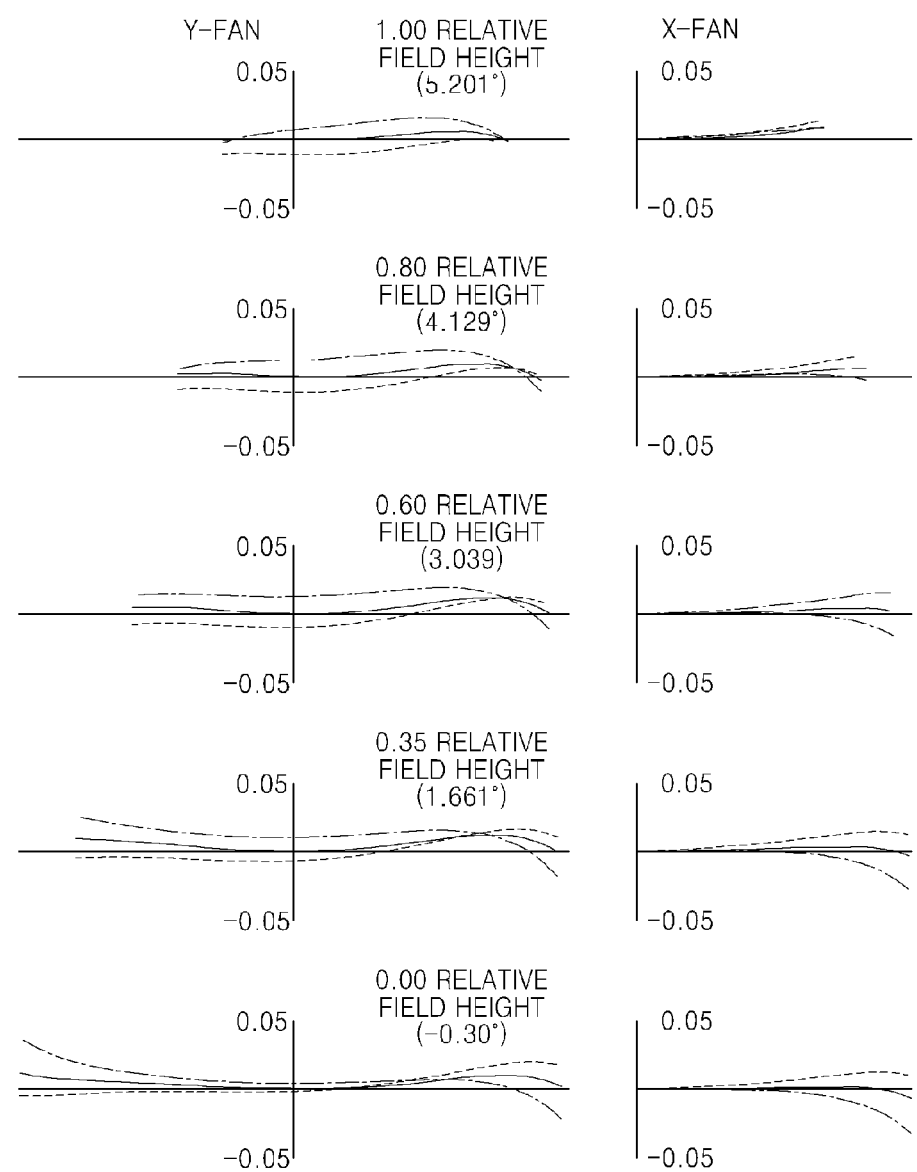
FIG. 20A is a diagram illustrating lateral aberration of the zoom lens system of FIG. 17 at the telephoto position, in which an image stabilization lens group moves vertically upward with respect to an optical axis.
Figure 20B:
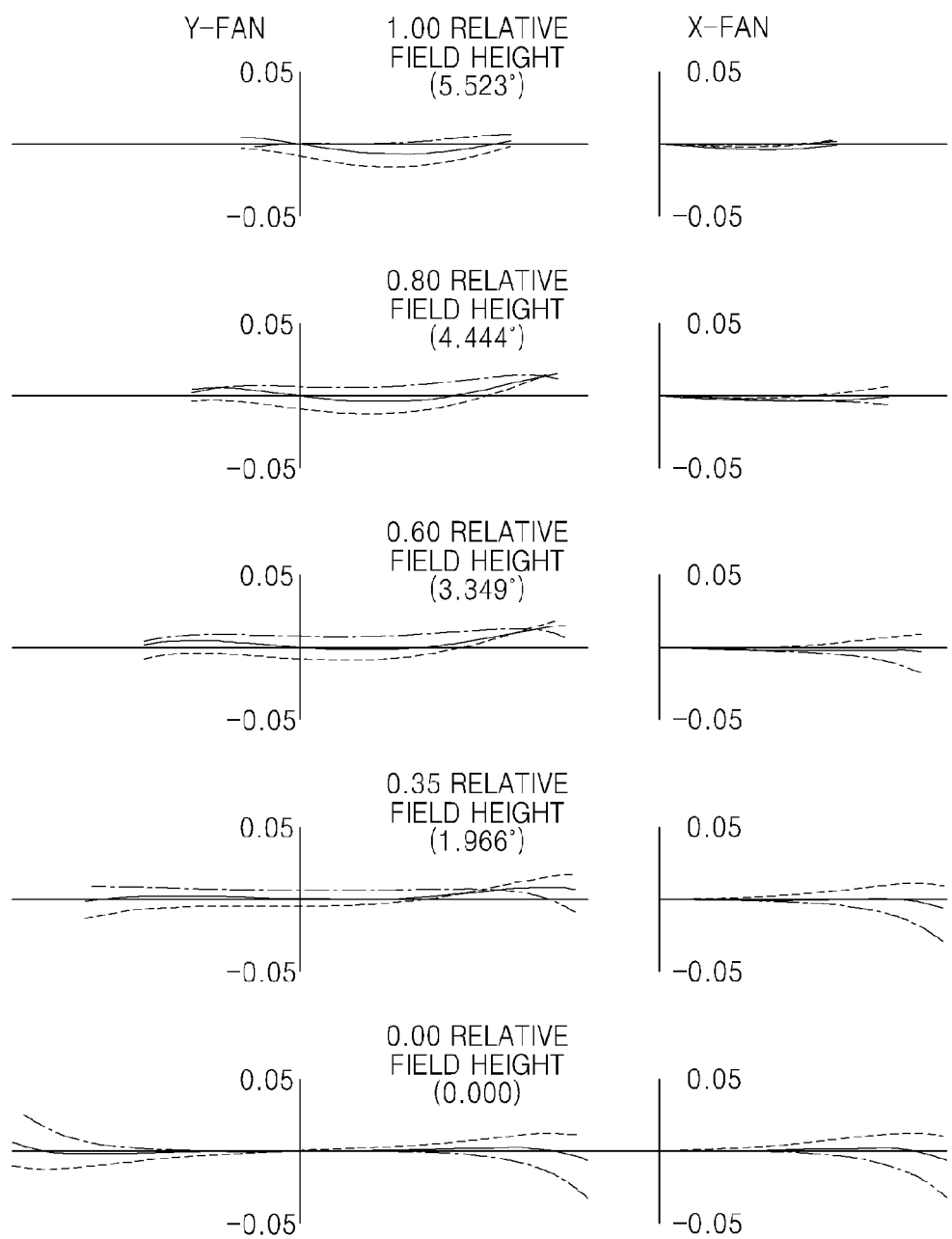
FIG. 20B is a diagram illustrating lateral aberration of the zoom lens system of FIG. 17 at the telephoto position, in which the image stabilization lens group is located on the optical axis.
Figure 20C:
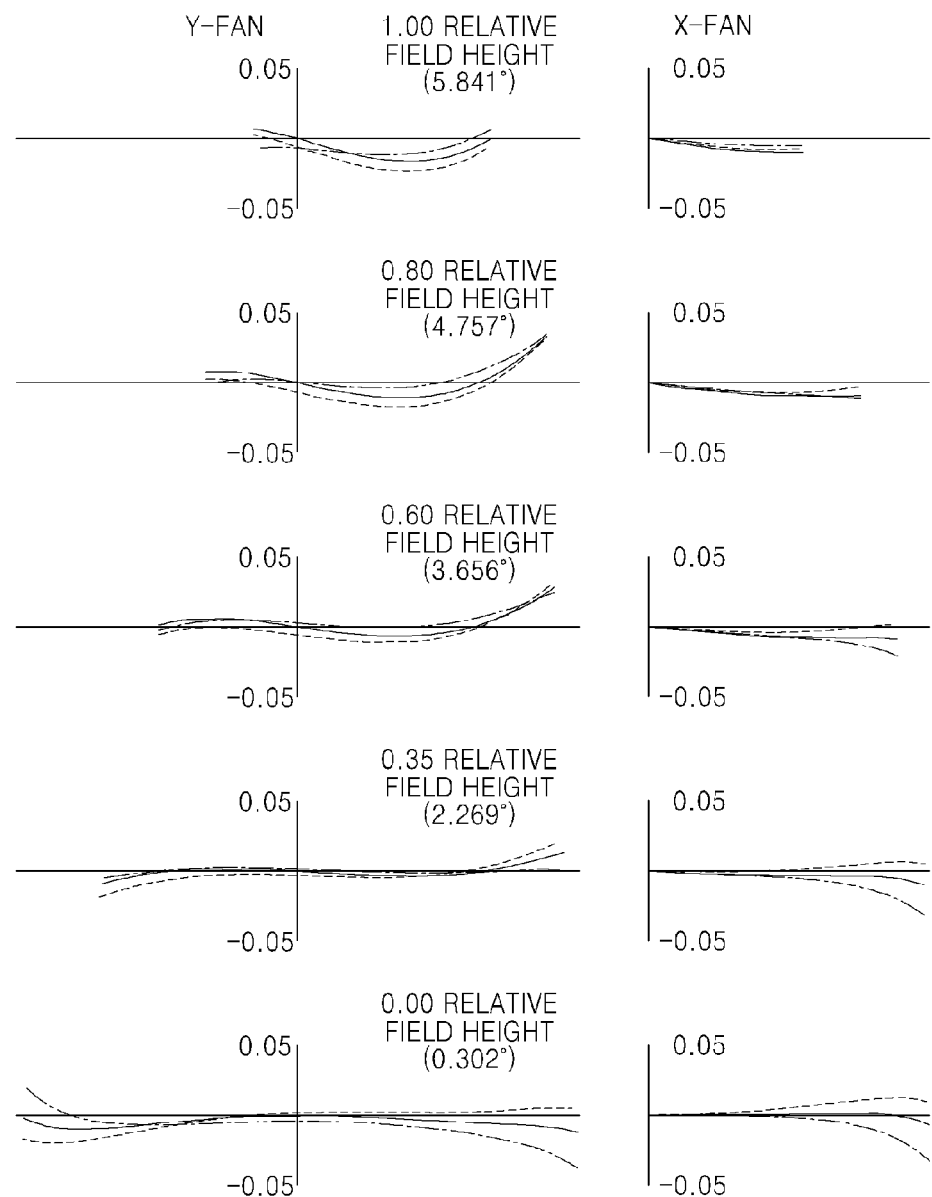
FIG. 20C is a diagram illustrating lateral aberration of the zoom lens system of FIG. 17 at the telephoto position, in which the image stabilization lens group moves vertically downward with respect to the optical axis.

FIGS. 20A to 20C are diagrams illustrating lateral aberration of the telephoto zoom lens system 100-5 at the telephoto position. FIG. 20A illustrates a case in which the first sub lens group G6-1 moves vertically upward by 0.63 mm with respect to the optical axis. FIG. 20B illustrates a case in which the first sub lens group G6-1 is located on the optical axis. FIG. 20C illustrates a case in which the first sub lens group G6-1 moves vertically downward by 0.63 mm with respect to the optical axis.

Movement amounts of the image stabilization lens groups according to the angles of view in the respective embodiments are shown as follows.

TABLE 11

|  | Wide-angle position | Middle position | Telephoto position |
| --- | --- | --- | --- |
| 100-1 | 0.24 | 0.34 | 0.66 |
| 100-2 | 0.21 | 0.31 | 0.59 |
| 100-3 | 0.23 | 0.33 | 0.63 |
| 100-4 | 0.24 | 0.35 | 0.66 |
| 100-5 | 0.23 | 0.33 | 0.63 |

The telephoto zoom lens systems 100-1, 100-2, 100-3, 100-4, and 100-5 satisfy Equations 1, 2, and 3 as follows.

TABLE 12

|  | 100-1 | 100-2 | 100-3 | 100-4 | 100-5 |
| --- | --- | --- | --- | --- | --- |
| Equation 1 | −3.37 | −3.52 | −5.95 | −3.30 | −2.86 |
| Equation 2 | 1.92 | 1.63 | 2.10 | 2.00 | 2.02 |
| Equation 3 | 0.975 | 1.011 | 0.965 | 0.912 | 1.081 |

On the other hand, apertures of the aperture stops ST in the telephoto zoom lens systems 100-1, 100-2, 100-3, 100-4, and 100-5 are uniform regardless of focal lengths. Radii of the aperture stops ST are 13.4 mm, 14.4 mm, 13.5 mm, 13.5 mm, and 13.9 mm in the telephoto zoom lens systems 100-1, 100-2, 100-3, 100-4, and 100-5, respectively, and the sizes of the apertures of the aperture stops of the telephoto zoom lens systems 100-1, 100-2, 100-3, 100-4, and 100-5 are not changed while zooming.

The telephoto zoom lens systems according to the embodiments of the invention may be applied to electronic apparatuses using imaging devices such as photographing apparatuses, interchangeable lens cameras, digital cameras, and camcorders.

Figure 21:
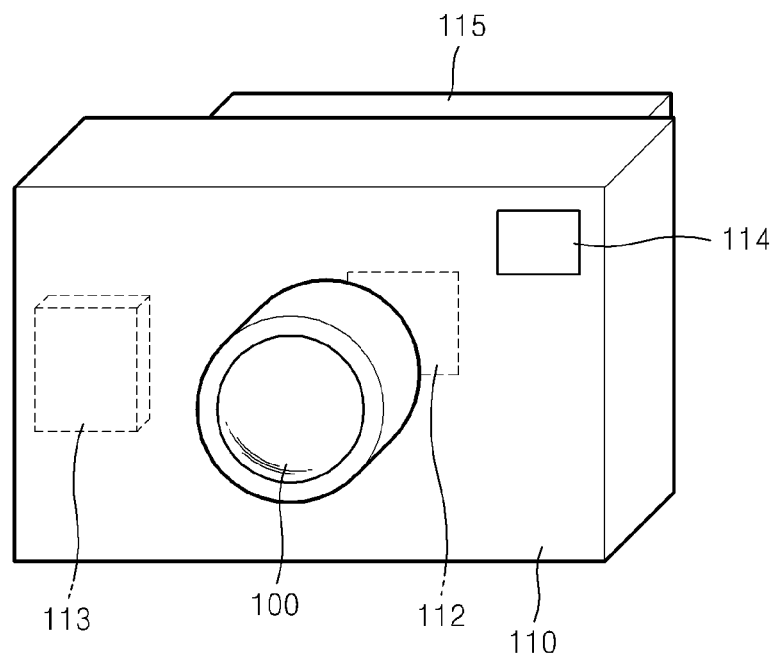
FIG. 21 is a diagram illustrating a photographing apparatus, according to an embodiment.

FIG. 21 is a view illustrating a photographing apparatus including a telephoto zoom lens system 100, according to an embodiment. The telephoto zoom lens system 100 may include the telephoto zoom lens systems 100-1, 100-2, 100-3, 100-4, and 100-5, which are described above. Also, the photographing apparatus includes a housing 110, and an imaging device 112 disposed in the housing 110 and receives light from the telephoto zoom lens system 100. The photographing apparatus may include a recording unit 113 (e.g., memory) disposed in the housing 110 and in which information corresponding to an image of an object photo-electrically converted by the imaging device 112 is recorded. The photographing apparatus may include a view finder 114 for observing the image of the object. Also, a display unit 115 displaying the image of the object may be included. In this case, the view finder 114 and the display unit 115 are provided separately, but in other embodiments, only a display unit may be included with no additional view finder. The photographing apparatus shown in FIG. 21 is just an example and not limited thereto and may be applied to various optical and electronic devices in addition to cameras. As described above, it is possible to create optical and electronic devices capable of performing automatically focusing quickly by applying the telephoto zoom lens systems according to the embodiments of the invention to electronic apparatuses such as digital cameras.

The telephoto zoom lens systems according to the embodiments of the invention may be miniaturized by using an inner zoom method. Also, since the telephoto zoom lens system has a long focal length and a smaller angle of view, there are more effects due to hand shake. However, it is possible to prevent deterioration of performance due to the hand shake by including an image stabilization lens group. Also, the image stabilization lens group does not move while zooming, thereby simplifying a configuration of a driver for moving the image stabilization lens group.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A telephoto zoom lens system comprising:
   a first lens group having a positive refractive power and is fixed while zooming and focusing;
   a second lens group having a negative refractive power;
   a third lens group having a negative refractive power and performs focusing;
   a fourth lens group having a positive refractive power; and
   a rear lens group comprising one or more lens groups located at an image side of the fourth lens group,
   wherein at least one lens group of the rear lens group is fixed while zooming, and a total distance of the telephoto zoom lens system is unchanged while zooming.

2. The telephoto zoom lens system of claim 1, wherein a distance between the second lens group and the third lens group is unchanged while zooming.

3. The telephoto zoom lens system of claim 1, wherein the third lens group comprises a lens that satisfies the following Equation:

$$-5.0 \leq \frac{R_{rear}}{R_{front}} \leq 0.0,$$

wherein $R_{front}$ denotes the radius of curvature of an object side surface of the lens of the third lens group, $R_{rear}$ denotes the radius of curvature of an image side surface of the lens of the third lens group.

4. The telephoto zoom lens system of claim 1, wherein the third lens group satisfies the following Equation:

$$1.4 \leq (1 - m_{focus,W}^2) \cdot m_{rear,W}^2 \leq 2.5$$

wherein $m_{focus,W}$ denotes a magnification of the third lens group at a wide-angle position, and $m_{rear,W}$ denotes a total magnification of lens groups located at the image side of the third lens group at the wide-angle position.

5. The telephoto zoom lens system of claim 1, wherein the third lens group satisfies the following Equation:

$$0.7 \leq \frac{(1 - m_{focus,T}^2) \cdot m_{rear,T}^2}{(1 - m_{focus,W}^2) \cdot m_{rear,W}^2} \leq 1.2,$$

wherein $m_{focus,W}$ denotes a magnification of the third lens group at a wide-angle position, $m_{rear,W}$ denotes a total magnification of lens groups located at the image side of the third lens group at the wide-angle position, $m_{focus,T}$ denotes a magnification of the third lens group at a telephoto position, and $m_{rear,T}$ denotes a total magnification of the lens groups located at the image side of the third lens group at the telephoto position.

6. The telephoto zoom lens system of claim 1, wherein the third lens group comprises one lens.

7. The telephoto zoom lens system of claim 1, wherein the third lens group comprises a lens selected from the group consisting of a biconcave lens or a plano-concave lens.

8. The telephoto zoom lens system of claim 1, wherein one of the lens groups included in the rear lens group comprises an aperture stop.

9. The telephoto zoom lens system of claim 8, wherein a size of an aperture of the aperture stop is maintained to be uniform while zooming.

10. The telephoto zoom lens system of claim 1, wherein the rear lens group comprises a lens group for image stabilization.

11. The telephoto zoom lens system of claim 10, wherein the lens group for image stabilization has a negative refractive power.

12. The telephoto zoom lens system of claim 1, wherein the rear lens group comprises:
    a fifth lens group having a positive refractive power and moves while zooming; and
    a sixth lens group provided between the fifth lens group and the image side, and comprises a first sub lens group having a negative refractive power and a second sub lens group having a positive refractive power.

13. The telephoto zoom lens system of claim 12, wherein the first sub lens group performs image stabilization.

14. The telephoto zoom lens system of claim 12, wherein the second lens group, the third lens group, the fourth lens group, and the fifth lens group move while zooming.

15. The system of claim 14, wherein while zooming, the second lens group, the third lens group, the fourth lens group, and the fifth lens group move from an object side to the image side with no inflection point.

16. The telephoto zoom lens system of claim 1, wherein the rear lens group has a positive refractive power and comprises a fifth lens group that is fixed while zooming.

17. The telephoto zoom lens system of claim 16, wherein the second lens group, the third lens group, and the fourth lens group move while zooming.

18. The telephoto zoom lens system of claim 17, wherein while zooming, the second lens group, the third lens group, and the fourth lens group move from an object side to the image side with no inflection point.

19. An electronic apparatus comprising:
    a telephoto zoom lens system; and
    an imaging device that receives light from the telephoto zoom lens system,
    wherein the telephoto zoom lens system comprises:
    a first lens group having a positive refractive power and is fixed while zooming and focusing;

a second lens group having a negative refractive power;
a third lens group having a negative refractive power and performs focusing;
a fourth lens group having a positive refractive power; and
a rear lens group comprising one or more lens groups located at an object side of the fourth lens group,
wherein at least one lens group of the rear lens group is fixed while zooming, and a total distance of the telephoto zoom lens system is unchanged while zooming.

20. The electronic apparatus of claim 19, wherein the third lens group comprises a lens that satisfies the following Equation:

$$-5.0 \leq \frac{R_{rear}}{R_{front}} \leq 0.0,$$

wherein $R_{front}$ denotes the radius of curvature of an object side surface of the lens of the third lens group, $R_{rear}$ denotes the radius of curvature of an image side surface of the lens of the third lens group.

21. The photographing apparatus of claim 19, wherein the third lens group satisfies the following Equation:

$$1.4 \leq (1 - m_{focus,W}^2) \cdot m_{rear,W}^2 \leq 2.5$$

wherein $m_{focus,W}$ denotes a magnification of the third lens group at a wide-angle position, and $m_{rear,W}$ denotes a total magnification of lens groups located at the image side of the third lens group at the wide-angle position.

* * * * *